United States Patent
Chari et al.

(10) Patent No.: US 11,237,937 B1
(45) Date of Patent: *Feb. 1, 2022

(54) INTERMEDIATE CHECK POINTS AND CONTROLLABLE PARAMETERS FOR ADDRESSING PROCESS DEFICIENCIES

(71) Applicant: C/HCA, Inc., Nashville, TN (US)

(72) Inventors: Ravi S. Chari, Nashville, TN (US); Jenny F. Barber, Franklin, TN (US); Dawn A. Winans, Brentwood, TN (US)

(73) Assignee: C/HCA, Inc., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/061,850

(22) Filed: Oct. 2, 2020

Related U.S. Application Data

(63) Continuation of application No. 16/510,674, filed on Jul. 12, 2019, now Pat. No. 10,795,795, which is a
(Continued)

(51) Int. Cl.
  *G06F 11/34* (2006.01)
  *G06F 11/30* (2006.01)
(52) U.S. Cl.
  CPC ...... *G06F 11/3419* (2013.01); *G06F 11/3006* (2013.01); *G06F 11/3495* (2013.01)
(58) Field of Classification Search
  None
  See application file for complete search history.

(56) References Cited

U.S. PATENT DOCUMENTS

| | | | | | |
|---|---|---|---|---|---|
| 5,913,197 | A | * | 6/1999 | Kameda | G16H 40/63 705/3 |
| 5,937,387 | A | * | 8/1999 | Summerell | G16H 15/00 705/2 |

(Continued)

OTHER PUBLICATIONS

Author Unknown, "About Crimson Continuum of Care", The Advisory Board Company, retrieved from http://www.advisory.com/technology/crimson-continuumof-care/about-crimson-continuum-of-care on Jul. 7, 2014, 2 pages.
(Continued)

*Primary Examiner* — Backhean Tiv
(74) *Attorney, Agent, or Firm* — Kilpatrick Townsend & Stockton, LLP

(57) ABSTRACT

Systems, methods, and machine-readable media are provided to facilitate controllable parameter modification of system components based on monitoring indicators of a caliber of process performance. A set of cases is identified from amongst the plurality of cases, the set of cases having similar temporal identifiers and a same type of process performance. A population check-point statistic is generated based on the check-point indicators identified in the set of cases. A first result that indicates whether a first criterion is met is determined based on the population check-point statistic. A second result that indicates whether a second criterion is met is determined based on a check-point indicator. When the first criterion or the second criterion is not met, one or more transmissions are to alert a remote device and to facilitate causing a system component to make a change to a controllable parameter to influence a corresponding check-point.

20 Claims, 24 Drawing Sheets

Related U.S. Application Data continuation of application No. 16/041,578, filed on Jul. 20, 2018, now Pat. No. 10,379,987, which is a continuation-in-part of application No. 14/304,604, filed on Jun. 13, 2014, now Pat. No. 10,055,547.

(60) Provisional application No. 61/835,139, filed on Jun. 14, 2013.

(56) References Cited

U.S. PATENT DOCUMENTS

| | | | | |
|---|---|---|---|---|
| 7,721,300 | B2* | 5/2010 | Tipton | H04L 43/0817 719/321 |
| 10,055,547 | B2* | 8/2018 | Chari | G16Z 99/00 |
| 10,379,987 | B1* | 8/2019 | Chari | G06F 11/3495 |
| 10,795,795 | B1 | 10/2020 | Chari et al. | |
| 2002/0032583 | A1* | 3/2002 | Joao | G16H 10/60 705/2 |
| 2004/0254763 | A1* | 12/2004 | Sakai | H04L 67/12 702/184 |
| 2006/0036729 | A1* | 2/2006 | Sakaguchi | H04L 43/02 709/224 |
| 2006/0067343 | A1* | 3/2006 | Tagawa | H04L 41/22 370/401 |
| 2006/0182324 | A1* | 8/2006 | Motoki | G16H 30/20 382/128 |
| 2006/0282302 | A1* | 12/2006 | Hussain | G06Q 10/06 705/2 |
| 2007/0143149 | A1* | 6/2007 | Buttner | G16H 10/60 705/3 |
| 2007/0150314 | A1* | 6/2007 | Abraham-Fuchs | G16H 10/60 705/3 |
| 2008/0147829 | A1* | 6/2008 | Chang | H04L 41/0816 709/221 |
| 2008/0319271 | A1* | 12/2008 | Barnowski | G16H 50/20 600/300 |
| 2009/0097623 | A1* | 4/2009 | Bharadwaj | H04M 11/027 379/106.02 |
| 2009/0125348 | A1* | 5/2009 | Rastogi | G06Q 40/08 705/7.32 |
| 2009/0327689 | A1* | 12/2009 | Lazar | G06F 9/44505 713/100 |
| 2011/0153344 | A1* | 6/2011 | Vesto | G06Q 10/10 705/2 |
| 2012/0078656 | A1* | 3/2012 | Wennberg | G16H 50/30 705/2 |
| 2012/0096065 | A1* | 4/2012 | Suit | H04L 41/0853 709/202 |
| 2012/0157795 | A1* | 6/2012 | Chiu | G16H 40/67 600/301 |
| 2012/0239671 | A1* | 9/2012 | Chaudhri | G16H 20/00 707/756 |
| 2013/0231956 | A1* | 9/2013 | Chaudhri | G16H 70/20 705/3 |
| 2014/0025809 | A1* | 1/2014 | Steuperaert | H04L 43/06 709/224 |
| 2014/0068728 | A1* | 3/2014 | Kim | H04L 67/12 726/5 |
| 2014/0282257 | A1* | 9/2014 | Nixon | G06F 3/04842 715/835 |
| 2014/0304545 | A1* | 10/2014 | Chen | G06F 9/46 714/4.3 |
| 2014/0372138 | A1* | 12/2014 | Chari | G16Z 99/00 705/2 |
| 2015/0227714 | A1* | 8/2015 | Hayakawa | G16H 50/70 705/3 |
| 2017/0103181 | A1* | 4/2017 | Czerska | G06Q 40/08 |
| 2018/0219842 | A1* | 8/2018 | Bellala | H04W 12/02 |

OTHER PUBLICATIONS

First Action Interview Pilot Program Pre-Interview Communication, dated Sep. 28, 2018, in U.S. Appl. No. 16/041,578, all pgs.
First Action Interview Office Action Summary, dated Nov. 23, 2018, in U.S. Appl. No. 16/041,578, all pgs.
Notice of Allowance dated Mar. 28, 2019, in U.S. Appl. No. 16/041,578, all pgs.
First Action Interview Pilot Program Pre-Interview Communication dated Jul. 30, 2014 in U.S. Appl. No. 14/304,604, all pgs.
Final Office Action dated Nov. 16, 2017, in U.S. Appl. No. 14/304,604, all pgs.
Notice of Allowance dated Apr. 17, 2018, in U.S. Appl. No. 14/304,604, all pgs.
First Action Interview Pilot Program Pre-Interview Communication dated Dec. 20, 2016, in U.S. Appl. No. 14/304,604, all pgs.
Advisory Action dated Aug. 30, 2016, in U.S. Appl. No. 14/304,604, all pgs.
Final Office Action dated May 12, 2016, in U.S. Appl. No. 14/304,604, all pgs.
Non-Final Office Action dated Sep. 14, 2015, in U.S. Appl. No. 14/304,604, all pgs.
Final Office Action dated Mar. 3, 2015, in U.S. Appl. No. 14/304,604, all pgs.
First Action Interview Pilot Program Pre-Interview Communication dated Apr. 8, 2020, in U.S. Appl. No. 16/510,674, all pgs.
Notice of Allowance dated May 20, 2020, in U.S. Appl. No. 16/510,674, all pgs.

* cited by examiner

APPLICATION/DEVICE LAYER 1920

INTERFACE LAYER 1916

AGENCY LAYER 1914

ACCESS CONTROL LAYER 1910

AUDIT/COMPLIANCE LAYER 1912

ACTIVE UNIFIED DATA LAYER 1908

AGGREGATION LAYER 1904

AGGREGATION LAYER 1906

RECEIVING LAYER 1902

*FIG. 19*

INTERMEDIATE CHECK POINTS AND CONTROLLABLE PARAMETERS FOR ADDRESSING PROCESS DEFICIENCIES

CROSS-REFERENCES TO RELATED APPLICATIONS

The present application is a continuation of U.S. patent application Ser. No. 16/510,674 filed on Jul. 12, 2019, which is a continuation application of U.S. patent application Ser. No. 16/041,578, filed on Jul. 20, 2018, and issued as U.S. Pat. No. 10,379,987, which is a continuation-in-part application of U.S. patent application Ser. No. 14/304,604, filed on Jun. 13, 2014, and issued as U.S. Pat. No. 10,055,547, which claims priority to U.S. Provisional Application No. 61/835,139, filed Jun. 14, 2013. The entire disclosures of the above applications are hereby incorporated by reference, for all purposes, as if fully set forth herein.

BACKGROUND

This disclosure relates in general to methods and systems for identifying and utilizing check points during medical care (e.g., to automatically predict other care-quality metrics and/or to offer care improvement plans).

Medical institutions provide medical care to a large number of people. Even for a particular type of care, the care may include many different elements, many of which may be performed by different actors. Poor medical care has serious consequences, and can unfortunately even lead to unnecessary death. However, identifying care problems can be difficult. Results such as death and maintained illness can occur even without poor medical care, such that parties can be reluctant to blame medical care for such a result. Further, as noted, medical care includes many elements. Patients, care providers and supervisors may be unaware of all of the care elements and can be oblivious to particular reasons for concern pertaining to specific elements. Thus, a party can have difficulty attributing a negative consequence to a particular care element. Finally, even if a negative health consequence is attributed to a care element, the seemingly avoidable health consequence would have already occurred.

BRIEF SUMMARY

In one aspect, a system to facilitate controllable parameter modification of system components based on monitoring indicators of a caliber of process performance is disclosed. The system may include one or a combination of the following. A data storage may include data sets for a plurality of cases. Each data set for each case of the plurality of cases may include identification data for the case, a type of a process performance executed, a check-point indicator, and a temporal identifier. The check-point indicator may indicate an attribute of the process performance executed or an attribute pertaining to a checkpoint during the process performance. An aggregator may identify a set of cases from amongst the plurality of cases, the set of cases having similar temporal identifiers and a same type of process performance. A population quantifier may generate a population check-point statistic based on the check-point indicators identified in the set of cases. A first engine may a first criterion pertaining to the check-point indicator and corresponding to a target value or range of values. A first result that indicates whether the first criterion is met may be determined based on the population check-point statistic. A second criterion pertaining to the check-point indicator may be accessed, the first criterion being different from the second criterion. A second result that indicates whether the second criterion is met may be determined based on a check-point indicator identified in a case. A second engine may facilitate transmission of the first result and the second result. When the first criterion or the second criterion is not met, one or more transmissions may be sent, the one or more transmission comprising an alert to alert a remote device and a transmission to facilitate causing at least one system component to automatically make a change to a controllable parameter to influence a corresponding check-point.

In another aspect, one or more non-transitory, machine-readable media having instructions stored thereon, which, when executed by one or more processing devices of a system, may cause the system to perform actions including one or a combination of the following. Data sets for a plurality of cases may be stored. Each data set for each case of the plurality of cases may include identification data for the case, a type of a process performance executed, a check-point indicator, and a temporal identifier. The check-point indicator may indicate an attribute of the process performance executed or an attribute pertaining to a check-point during the process performance. A set of cases may be identified from amongst the plurality of cases, the set of cases having similar temporal identifiers and a same type of process performance. A population check-point statistic may be generated based on the check-point indicators identified in the set of cases. A first criterion pertaining to the check-point indicator and corresponding to a target value or range of values may be accessed. A first result that indicates whether the first criterion is met may be determined based on the population check-point statistic. A second criterion pertaining to the check-point indicator may be accessed, the first criterion being different from the second criterion. A second result that indicates whether the second criterion is met may be determined based on a check-point indicator identified in a case. Transmission of the first result and the second result may be facilitated. When the first criterion or the second criterion is not met, one or more transmissions may be sent. The one or more transmissions may include an alert to alert a remote device and a transmission to facilitate causing at least one system component to automatically make a change to a controllable parameter to influence a corresponding check-point.

In yet another aspect, a method to facilitate controllable parameter modification of system components based on monitoring indicators of a caliber of process performance is disclosed. The method may include one or a combination of the following. Data sets for a plurality of cases may be stored. Each data set for each case of the plurality of cases may include identification data for the case, a type of a process performance executed, a check-point indicator, and a temporal identifier. The check-point indicator may indicate an attribute of the process performance executed or an attribute pertaining to a checkpoint during the process performance. A set of cases may be identified from amongst the plurality of cases, the set of cases having similar temporal identifiers and a same type of process performance. A population check-point statistic may be generated based on the check-point indicators identified in the set of cases. A first criterion pertaining to the check-point indicator and corresponding to a target value or range of values may be accessed. A first result that indicates whether the first criterion is met may be determined based on the population check-point statistic. A second criterion pertaining to the check-point indicator may be accessed, the first criterion being different from the second criterion. A second result that indicates whether the second criterion is met may be determined based on a check-point indicator identified in a case. Transmission of the first result and the second result may be facilitated. When the first criterion or the second criterion is not met, one or more transmissions may be sent. The one or more transmissions may include an alert to alert a remote device and a transmission to facilitate causing at least one system component to automatically make a change to a controllable parameter to influence a corresponding check-point.

In various embodiments, each of the check-point indicators cannot practically be directly controlled by a provider. In various embodiments, the population quantifier may determine that each of the check-point indicators is predictive of one or more process results. In various embodiments, the transmission of the first result and the second result may correspond to transmitting the first result at a first time and transmitting the second result at a second time that is different from the first time. In various embodiments, the set of cases may be identified from amongst the plurality of cases in real time. In various embodiments, the set of cases may involve instances of process performance within a recent time period.

In various embodiments, the controllable parameter may be identified as controllable to influence the check-point indicator of the corresponding checkpoint. In various embodiments, the identification of the controllable parameter may include selecting the controllable parameter from amongst a set of controllable parameter. Each controllable parameter in the set of controllable parameter may be identified as controllable to influence the check-point indicator. The selection may be based on the population check-point statistic.

In one embodiment, the present disclosure provides a method and system for tracking medical-care results and identifying check points within the medical care where assessments can be made that are indicative of a quality of care. Specifically, data are aggregated across a set of patients having received a type of care. Care results (e.g., mortality, complications, length of stay at a hospital, etc.) are tracked and are analyzed with respect to a set of potential check-point indicators. The potential check-point indicators can include variables which themselves are results of care actions; for example, the potential indicators can include surgery durations, strengths of post-surgery pain medication taken by patients, a post-surgery patient-reported nausea rating, post-procedure platelet counts, administration of an appropriate medication (or dosage), appropriate timing of medication administration, etc.

A subset of check-point indicators is determined to be predictive of one or more care results. This determination can account for the fact that care results are not to be analyzed in isolation (e.g., not wanting to prioritize short hospital stays if the consequence is increased readmissions). For each check-point indicator, a goal is set, which can include a value or range of values that correlates with positive care results. In some instances, the goal is relative, such as a goal directed to improving a performance within an institution or performing comparably to other institutions providing similar care.

Once check-point indicators are identified (e.g., for a particular care line, which can relate to a patient condition, treatment type, surgery type, etc.), the check-point indicators can then be automatically monitored. The monitoring can occur promptly and/or in real-time, such that (for example) case data (e.g., medical-record data, patient notes and/or medical-equipment outputs) is processed within days, hours, minutes or even seconds from time of receipt and/or such that check-point indicators (e.g., associated with each working entity, patient or patient group) are updated at least once a week, day, hour, minute or ten seconds.

In one instance, multiple check-point indicators are identified to correspond to a care line. A combination function can be used to combine the check-point indicators to produce an overall score for the care line. In one instance, each check-point indicator is first assessed (e.g., to determine whether and/or where it falls within an acceptable range, to determine whether a change of the indicator is acceptable, to determine an extent to which it exceeds a value, etc.) to produce a processed indicator value. Multiple processed indicator values can be weighted and combined to produce a care score (or net care result).

Each of one, more or all check-point indicators and/or a care score can be generated for a variety of entities and/or levels (e.g., at a region, institution, department, physician group, physician or patient group level). Each of one, more or all check-point indicators and/or a care score can be evaluated based on a goal and/or criterion, which can depend on (for example), comparing absolute values to a threshold, comparing values to individual or aggregated values corresponding other entities and/or levels, comparing changes in values (or a second derivative of values) to a threshold, etc. A report can reflect individual check-point indicators, an evaluation of individual check-point indictors, a care score and/or an evaluation of a care score. In one instance, a report is routinely generated, transmitted and/or presented. In one instance, a report is generated upon request. The report can allow a reviewer to quickly assess an overall performance of a care line and to further identify one or more particular check points with sub-optimal performance.

In one instance, if a performance criterion (for a check-point indicator or care score) is not satisfied, an alert and/or a proposed action plan can be presented or transmitted. For example, if it is determined that an above-threshold percentage of patients are not receiving a recommended medication, a plan can include requiring a supervisor to follow-up with a group of patients within a time period in which the medication is to be received. As another example, if it is determined that an increasing number of patients are reported as having a post-operative infectious complication, a plan can include increasing frequency of using particular sterility procedures.

In some embodiments, systems and/or methods can be provided for providing presentations to monitor a quality of care being provided to patients. A case data store that includes a plurality of cases is accessed. Each case of the plurality of cases identifies a patient, a type of a medical care received by the patient, an entity (e.g., hospital, physician, nurse, technician or team of medical professionals) that provided the medical care, a set of check-point indicators, and a care result variable. Each check-point indicator of the set of potential check-point indicators characterizes a feature of the medical care received by the patient (e.g., an operation performed, treatment administered, medication administered, medical test provided, duration of an operation, etc.) or a health characteristic of the patient during a provision of the medical care (e.g., a condition stage, a vital sign, a subjective pain level, etc.). The care result variable identifies whether an event occurred after or during the provision of the medical care, the event relating to the patient's health and being indicative of a quality of the medical care. For example, the care result variable could indication whether the patient experienced a complication, was readmitted, whether an existing condition improved, and/or a length of stay at a hospital.

A first set of cases is identified from amongst the plurality of cases. Each case of the first set of cases is associated with a same type of medical care (e.g., a same care line), a same entity and medical care occurring at least partly within a first time period. A second set of cases is identified from amongst the plurality of cases. Each case of the second set of cases is associated with the same type of medical care, the entity and medical care occurring at least partly within a second time period.

For each set of the first set of cases and the second set of cases, a population care-result statistic is generated that corresponds to the time period for the set based on the care-result variable in at least some of the set of cases. For each set of the first set of cases and the second set of cases, a set of population check-point statistics is generated that corresponds to the time period for the set. Each population check-point statistic in the set of check-point statistics is based on a check-point indicator in the set of check-point indicators in at least some of the set of cases.

A first presentation that includes the population care-result statistic and the set of population check-point statistics for the first set of cases is presented. A second presentation is presented that includes the population care-result statistic and the set of population check-point statistics for the second set of cases.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

Figure 15:
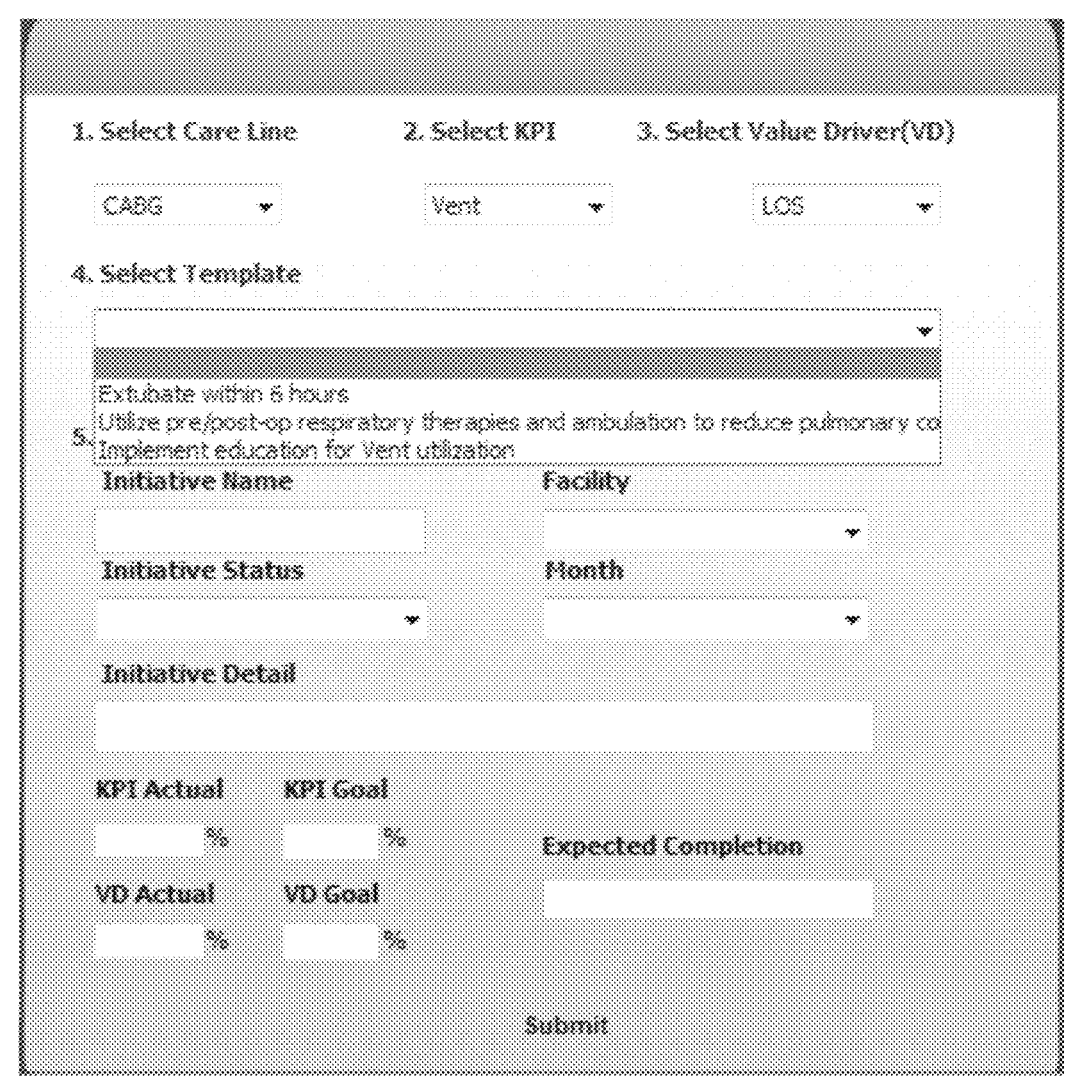

FIGS. 11-16 each show at least a portion of an interactive presentation for reviewing care data and/or specifying presentation characteristics and/or care recommendations.

FIG. 19 illustrates a block diagram of an architecture stack, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Figure 1:
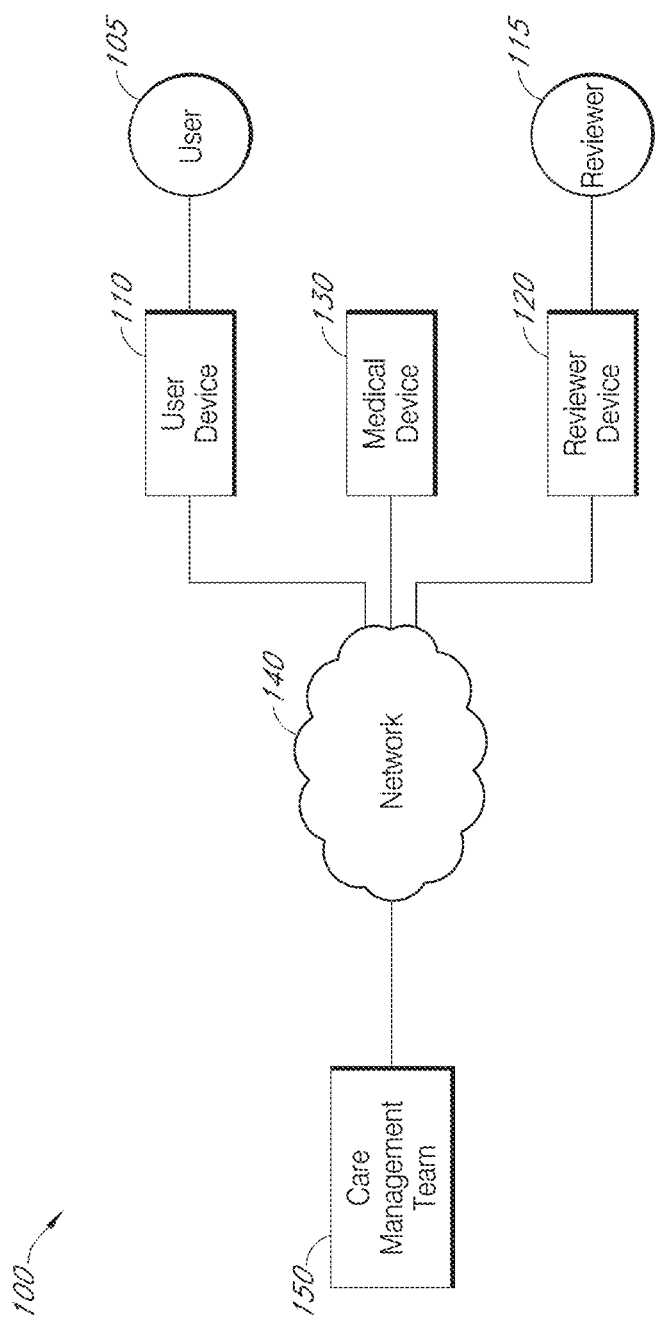
FIG. 1 depicts a block diagram of an embodiment of a medical-care interaction system.

Referring first to FIG. 1, a block diagram of an embodiment of a medical-care interaction system 100 is shown. Users 105 and reviewers 115 can interact with a care management system 150 via respective devices 110 and 120 and a network 140, such as the Internet, a wide area network (WAN), local area network (LAN) 114 or other backbone. Further, medical devices 130 can provide or receive data from care management system 150 from a same or different network 140. In some embodiments, care management system 150 is made available to one or more of users 105 and/or reviewers 115 via an app (that can be downloaded to and executed on a portable electronic device) or a website. It will be understood that, although only one user 105, user device 110, reviewer 115, reviewer device and medical device 130 are shown, system 100 can include multiple users 105, user devices 110, reviewers 115, reviewer devices and/or medical devices 130.

Users 105 can include parties with access to pre-, intra-, or post-care medical data, such as recent medical records, current vital signs, current procedure characteristics, etc.

These users 105 can be parties collecting such data or parties who receive the data after it has been collected. Examples of users 105 include care providers (e.g., physicians, nurses, surgeons, assistants), and medical-institution administrators. Reviewers 115 can include parties with access to high-level care information and/or with the ability to institute changes in the provision of care. For example, reviewers 115 can include supervisors, board directors, managers, and institution operators. In some instances, a reviewer 115 can also be a user 105. For example, a physician may both be able to enter data about his patients and view reports pertaining to his performance. Reviewers 115 can include parties within an institution at issue (e.g., a chief medical operator or hospital CEO) or outside of the institution (e.g., being associated with an insurance company or accreditation counsels).

Reviewers 115 can have unlimited or limited reviewing access. For example, a reviewer 115 can be allowed to access data or reports for particular levels or entities. For example, for a reviewer 115 can be granted selective access to access performance indicators and care scores for a care line in a single hospital and for all personnel involved with the care line. In some instances, a reviewer 115 can be granted access to view anonymized data (e.g., for all or select levels and/or entities), which can aid reviewer 115 in, e.g., comparing data.

Users 105 can enter input to care management system 150 pertaining to medical care. As will be described in further detail below, user 105 can cause a case to be generated or updated to include care-independent case characteristics (e.g., a patient's ailments, past procedures, current medications, weight, etc.), care characteristics (e.g., pre-operation preparations, type of procedure performed, procedure time duration, length of stay within a ward or unit, etc.), and/or care-result characteristic (e.g., any readmission, complication, death, etc.). In some instances, medical data (which can include care characteristics) is provided by medical devices 130. Medical devices 130 can be programmed to periodically, routine or continuously collect medical data from a patient. In some instances, medical devices 130 themselves identify the patient associated with the data (e.g., based on prior user entries into the device). In some instances, a user 105 identifies via user device 110 that a medical device 130 is or will be collecting data from a particular patient. Medical data can be pushed from medical device 130, or care management system 150 can pull such data.

In some instances, some or all input received by users 105 and/or medical devices 130 can be locally stored at user devices 110 and/or medical devices 130 and/or stored at an intermediate system and can be periodically or routinely uploaded to care management system 150. For example, upload can occur at routine time intervals, upon receiving a threshold quantity of data, upon receiving an instruction from a user 105 to upload the data, etc.

Care management system 150 can use population data to identify one or more check-point indicators correlated with care results and to identify recommended values for the indicators. The check-point indicators can correspond to or be care characteristics entered by users 105. Each check-point indicator can be estimated to be influenced by one or more controllable parameters (e.g., preparatory pre-procedure tests performed, patient education provided, a number of procedures performed by a physician within a time interval, etc.).

Values of the indicators can be monitored. The values can be summarized, for example, for a particular institution, actor, time period, procedure type and/or patient group. The summarized values and/or values for particular cases can be presented to a reviewer 115. If, for a given check-point indicator, the values for a specific case or for a population do not meet the recommended value(s), an alert can be generated and presented to reviewer 115 and information about controllable parameters that influence the check-point indicator can also be presented.

User device 110, reviewer device 120 and/or medical device 130 can each be a single electronic device, such as a hand-held electronic device (e.g., a smartphone). It will be understood that user device 110, reviewer device 120 and/or medical device 130 can also include a system that includes multiple devices and/or components. The device(s) 110, 120 and/or 130 can include a computer, such as the desktop computer, a laptop computer or a tablet. Medical device 130 can include a monitor, such as a heart-rate monitor, oxygen monitor, blood-pressure monitor, etc. In some instances, a party 105 and/or 115 uses different devices at different times to interact with care management system 150. For example, user 105 can use a tablet to enter a patient's care-independent characteristics and can subsequently use a smartphone to enter intra-care characteristics.

Figure 2:
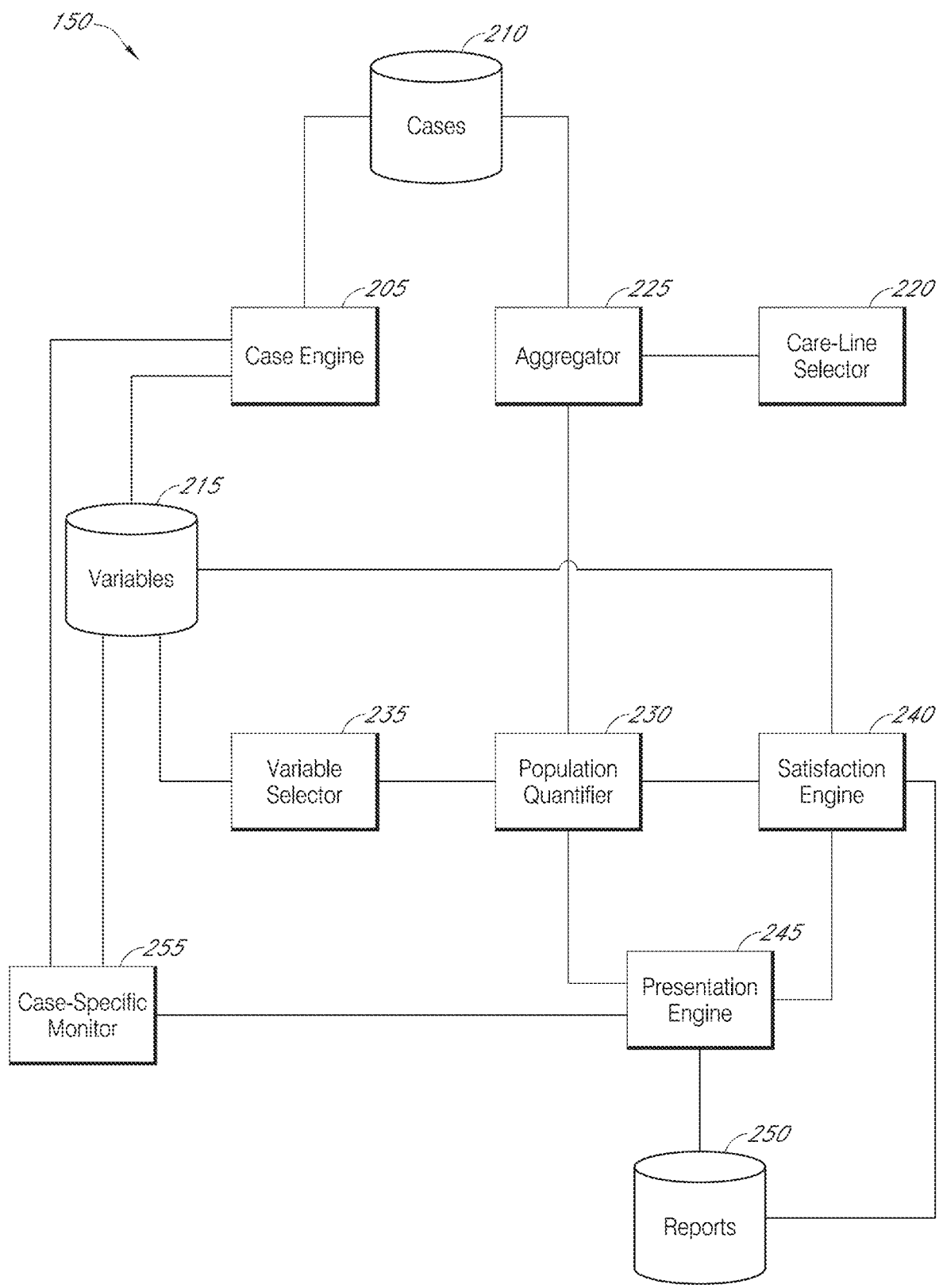
FIG. 2 depicts a block diagram of an embodiment of care management system.

Referring next to FIG. 2, a block diagram of an embodiment of care management system 150 is shown. Care management system 150 can be, in part or in its entirety, in a cloud. In some instances, at least part of care management system 150 is present on a device, such as a user device 110 and/or reviewer device 120. For example, a case engine 205 can be on user device 105, a presentation engine 245 can be on a reviewer device 120, and population quantifier 230 can be in a cloud. In some instances, part of a component (e.g., part of presentation engine 245 or population quantifier 230) resides in a cloud and another part of the component resides in a device. Thus, care management system 150 can include a distributed system.

Care management system 150 includes a case engine 205, which generates and updates cases. Each case can correspond to a patient and/or a particular instance of care (e.g., a surgery). The cases are stored in a case data store 210. A case can be generated upon, for example, receiving an indication that a patient has been schedule for care, has been admitted to an institution, has arrived at an institution for care and/or has begun to receive care. A case can include information (which can include data) sent from a data-collecting medical device 130. The case can further or alternatively include information (which can include data) received from a user device 110, the information having been entered into device 110 by a user 105 (e.g., in response to collecting medical data, receiving written or oral query responses from patient, characterizing a situation or receiving hand-written records). As described further below, a case can include care-independent case characteristics, care characteristics and/or care-result characteristics. A variables data store 215 can define which characteristics must or can be collected for case generation or at later time periods (e.g., following a scheduled procedure).

A case can include care-independent case characteristics, such as a patient's identifying information (e.g., name, social-security number, demographic characteristics (e.g., age, race, sex), physical characteristics (e.g., height, weight), correspondence information (e.g., home address, telephone number, email address), billing information (e.g., billing address, insurance company, insurance member ID), and/or general medical information (e.g., identifications of past surgeries, previous diagnoses, current symptoms, current medications, allergies, family medical history, primary physician).

A case can include care characteristics, which can include detail a type of care (e.g., identification of a care line, such as a line for acute myocardial infarction response, hip replacement, knee replacement, spinal surgery, sepsis response, coronary artery bypass grafting, or stroke response), features of the care provision (date(s) of the care, physicians/nurses providing care, an institution providing care), care details (e.g., a surgery duration, anesthesia used, blood loss, incision length, type of hip or knee replacement, which medications were administered, a time of medication administration, a dosage of medication administration, etc.), the preparation provided for a procedure and/or care provided following a procedure. For example, if a patient is to receive a surgery, the preparation can include: providing education to the patient about how to facilitate rehabilitation, hydrating the patient and/or performing screens to localize areas of interest (e.g., a clot). Recovery for the care can include replacing bandages, routine visual monitoring for signs of infection, providing pain medication, and providing rehabilitory-exercise training. Pre-care and/or post-care characteristics can identify any respective efforts provided, dates of such provision and/or individuals providing the preparation.

Care characteristics can also or alternatively characterize the patient during periods immediately preceding, during or immediately following the care. For example, a care characteristic can include a patient's (instantaneous or time-averaged) blood pressure, temperature, heart rate, pulse rate, oxygen level, or subjective pain level.

A case can include a care-result characteristic, which identifies and characterizes any health events following the care provision that may be attributable to the care. Such events can include, e.g., a death, complication (e.g., infection or blood clot following a surgery), readmission to a same or different hospital, length of stay at an institution, hospital-acquired condition, and/or cost of providing care (and/or post- and/or pre-care). Any such event can be accompanied by an indication as to whether it is likely that the event was attributable to the care. For example, a post-care death can be identified as being due to a vehicular accident such that it can be determined that care improvements would likely have been un-influential in the death.

Information in a case can be gradually built based on various inputs from users 105 and/or data from medical devices 130. In some instances, case engine 205 generates and presents forms to users 105 to collect pertinent information and/or pulls data from medical devices 130. Cases can include a standard format. Case data store 210 can be secured such that, for example, cases can be edited only in response to authorized events (e.g., receiving uploads from a secure channel or receiving inputs from an authorized user 105) and/or can only be released for access to authorized reviewers 115.

Cases can pertain to different types of care, such as different procedures (e.g., hip, back or knee surgery), different responses (e.g., responses to a heart attack, stroke or sepsis) or other medical events (e.g., childbirth, poison treatment, or abrasion/gun-shot repair). Care can then be evaluated and improved in a care-specific manner.

A care-line selector 220 can identify a type of care (i.e., a care-line) of interest. The care-line can be identified based on input from a reviewer 115. In some instances, care lines are selected in a routine manner (e.g., to analyze and/or improve care of each line).

Once care-line selector 220 has selected a care-line, an aggregator 225 accesses case data store 210 and identifies a set of cases pertaining to the selected care-line. Additional restrictions can be imposed to, e.g., require that the cases be ones identifying medical care having been provided within a specified time period, performed at a specified institution, performed for a specified patient group (e.g., within an age range without other health conditions).

The aggregated cases can then be analyzed by a population quantifier 230. In some instances, population quantifier 230 determines relationships between variables. For example, population quantifier 230 can identify care characteristics correlated with one or more care results (e.g., a lack of negative care results). This analysis can involve considering a plurality of care results (e.g., mortality, occurrence of complications, contraction of hospital-acquired conditions, readmission to an institution, cost of care, and/or length of admission). The care results can be results that occur during care (e.g., a surgery complication) of subsequent to care (e.g., a readmission). The care results can be numeric (e.g., identifying a number of days of a hospital stay or a severity of a complication) or binary (e.g., identifying that "No" complications occurred). A simplistic correlation can be inadequate to capture whether a particular characteristic is predictive of a net positive care result. Population quantifier 230 can thus employ multi-dimensional correlation techniques, modeling techniques and/or multi-dimension statistical techniques. The analysis can further account for intervening variables that are not a consequence of any care but can also influence a health result. For example, older patients can be more likely to experience care complications.

In some instances, the analysis includes determining (e.g., for each case) a net care-result metric or score determined based on multiple care results. The metric determination can include weighting, step-functions and/or normalizing. For example, a metric can begin as being equal to 1, can be decreased for any complication (e.g., by an amount depending on a severity), can be set equal to zero if a patient died, and normalized based on a patient's age. The metric can then be used as a dependent variable to determine which characteristics are most predictive of a strong metric.

Based on the analysis, a variable selector 235 can select a subset of characteristics to monitor during care, which can be identified as being check-point indicators. Same or different check-point indicators can apply to assess an individual case as compared to an assessment of a group of cases (e.g., all relating to an institution or physician). The subset can include one or more characteristics that are correlated with a positive individual or combined care result. Exemplary check-point indicators include when an antibiotic was discontinued, a regularity of antibiotic administration, appropriate selection of an antibiotic, whether and/or an extent to which atrial fibrillation occurred, whether a ventilator was used, a consistency and/or an extent to which blood glucose is managed, whether and which blood products were used, and whether a Foley catheter was timely and appropriately removed.

Variable selector 235 can select characteristics by analyzing significance values, correlation strengths, model weights and/or data availability. Variable selector 235 can identify a set number of characteristics (e.g., a two characteristics most predictive of an overall care-result metric) or a flexible number of characteristics (e.g., all characteristics having an assigned weight in a model above a threshold). This identification can include weighting the identified check-point indicators, where high weightings can indicate that undesired values of the indicator are strongly correlated with negative care results and/or are correlated with dramatic negative care results. The categorization of a particular characteristic being a check-point indicator and/or any weight with the indicator can be expressed in variables data store 215.

In some instances, at least some of the selected characteristic(s) can be ones which themselves are results of care provision and not easily individually controlled. For example, a surgery duration can be a result of a surgeon's skill, a surgeon's workload, amount of human assistance during the surgery, pre-surgery scans to understand the surgical area, etc. Despite these dependencies, a surgery duration can be indicative as to whether optimal care during and before the surgery was provided. The selected characteristic(s) can also or alternatively be ones which are too pre-mature to be classified as care results. Instead, the characteristics can be ones measureable or observable during care provision (e.g., during a procedure or immediately following the procedure). In some instances, at least some of the selected characteristic(s) can be ones which can be easily individually controlled. For example, a characteristic can include medication administration, a frequency of checking a vital sign, a shift duration of a medical professional and/or a number and/or experience of medical professionals working.

In addition to selecting the check-point indicators to monitor, variable selector 235 can identify a recommended value or range of values for each indicator. These value(s) can be defined as part of an indicator satisfaction criterion. An indicator satisfaction criterion can be set to be one which is empirically associated with one or more absolute or relative positive care results. In some instances, such association is balanced with practicality and/or cost. For example, a correlation analysis can indicate that optimal post-spinal-surgery care results occur following spinal surgeries lasting less than 30 minutes. However, it may be recognized that it would be difficult to impossible to consistently achieve such short surgery durations, so a surgery-duration check-point indicator can be associated with an 'under-120-minutes satisfaction criterion. An indicator satisfaction criterion can be absolutely set (e.g., based on modeling or correlation analyses), set as one which would indicate that a particular entity (e.g., institution, physician, surgery team, etc.) is improving in providing care (over time), or set as one which would indicate that a particular entity is providing care at a specific level (e.g., within a top 70%) relative to other entities. Variable selector 235 can store the indicator satisfaction criteria in variables data store 215. Satisfaction criteria can be the same for population and case-specific analyses or they can differ. For example, as individual case characteristics may be noisier than population case characteristics, population criteria can be more stringent than case-specific criteria.

Population quantifier 230 can also identify one or more controllable parameters associated with a check-point indicator underlying a population statistic. This identification can be performed once or multiple times (e.g., at routine intervals, upon identifying a check-point indicator not passing a satisfaction criterion, etc.). The associations can be stored in variables data store 215. The associations can also be global or non-global (e.g., applying to specific institutions and/or care-lines).

The controllable parameters can be ones thought to be directly controllable by users or other actors in an institution and ones that influence one or more check-point indicators. In some instances, a controllable parameter is directly related to a check-point indicator (e.g., a frequency of monitoring a patient's blood pressure may be both a controllable parameter and a check-point indicator); in some instances, they are different (e.g., changing requisite pharmacy approval of medication dispersal may be a controllable parameter related to administration of an appropriate medication). Exemplary controllable parameters can include changing a timing, frequency or type of monitoring; changing a number of actors interacting with a patient (e.g., reducing nurse changes or increasing nurse changes to allow shorter shifts); changing oversight on medication use; changing a type, timing or frequency of education provided to a patient; changing a type, timing of frequency of education provided to a physician or nurse; or changing a management structure in charge of part or all of a care line. Multiple controllable parameters can be associated with a single check-point indicator and/or a single controllable parameter can be associated with multiple check-point indicators.

A controllable parameter can be associated with a check-point indicator based on manual user input or based on an automatic population analysis. For example, cases can identify parameter values and indicator values, and population quantifier 230 can then identify which parameters influence which check-point indicators. As another example, a user can identify parameter values in effect for particular periods of time at an institution. Population quantifier 230 can then assess how check-point indicators for cases with an event (e.g., admission, pre-procedure, procedure or post-procedure) in one period of time compare to check-point indicators for cases with an event in another period of time. For example, population quantifier 230 can associate each case with a parameter value (based on a case event time) and can then use a correlation or modeling technique to identify influential parameters.

It will be appreciated that an identity of a check-point indicator, a satisfaction criterion, and/or a controllable-parameter association can be globally determined or can be separately determined for population analyses and for case-specific analyses. The latter approach can, e.g., set satisfaction criteria that recognize that a high value may be within an appropriate noise variation for case-specific analyses but that the same value, if it is common throughout an entire population is reason for concern. Further, the latter approach can benefit from a reality that case-specific monitoring more often provides for an opportunity for measures to be taken to "fix" a concerning indicator and not let it lead to a negative care result. Thus, e.g., a check-point indicator can have a first controllable-parameter association for a population-analysis instance and a second association for a case-specific instance. For example, supposing that an indicator characterizes an amount of pain medication requested by patients. If this is too high on a population level, it may be advantageous to consider changing incision techniques. If the indicator is high for a particular case, is may be advantageous to take precautions against narcotic addiction.

It will further be appreciated that an identity of a check-point indicator, a satisfaction criterion, and/or a controllable-parameter association can be globally determined or can vary across levels and/or entities. For example, a surgery duration of under 120 minutes may be associated with positive care results at a first hospital, while a surgery duration of under 180 minutes may be associated with positive care results at a second hospital.

In addition to identifying check-point indicators and controllable-parameter associations based on empirical analyses, population quantifier 230 can also monitor indicators at a population level. Specifically, aggregator 225 can repeatedly collect cases, which can (in some instances) include newer cases for which care is not yet complete and/or insufficient opportunity to assess any care results. Each collection can pertain to a different time period. For example, the collection may always include cases for which a surgery or other procedure was performed within the last 30 days or for which a patient was released from an institution within the last 3 months. In some instances, aggregator 225 collects cases for different or sequential (e.g., non-overlapping) time periods. For example, a first group could include cases having a surgery within the last 30 days, a second group could include cases having a surgery within the last 60-30 days, etc. Again, the aggregation can include other restrictions, such as requiring a procedure (e.g., surgery) to have been provided by a specified institution.

Aggregation can also or alternatively be performed according to reviewer input. For example, a reviewer 115 can request a report or population statistic pertaining to a particular care line, a particular institution, a particular physician (e.g., surgeon) and/or a particular time period (e.g., during which a procedure was performed or a patient was discharged). Aggregator 225 can then aggregate the cases accordingly.

Population quantifier 230 can, in some instances, generate a population statistic characterizing each, one, some or all check-point indicators. The statistic can include a mean, median, mode, range, maximum, minimum, variance, etc. The statistic can include a normalized or un-normalized score where, e.g., a maximum score would indicate optimal or acceptable check-point values. The statistic can include a comparative statistic, such as one expressing a change in an absolute indicator statistic relative to a comparable absolute indicator statistic from a past time period or relative to a comparable absolute indicator statistic from other institutions. A comparative statistic can include a percentage, ranking or binary indicator (e.g., indicating improvement/worsening relative to an older comparable statistic). For example, population quantifier 230 can determine that, for a particular check-point indicator, an average value for cases pertaining to having a procedure in the last month was 30% higher than an average value for cases having a procedure two months ago, 25% lower than a minimum value set forth in a satisfaction indicator, and better than 10% of comparable indicators from other institutions.

A satisfaction engine 240 can assess the population statistic in view of one or more satisfaction criteria (stored in variables data store 215). A result of the assessment can be identified as a satisfaction result, which can include a score. A scale for the score can be binary, non-binary, discrete or continuous. The scale can be bounded or unbounded. The scale can be numeric and/or non-numeric. In some instances, a numeric score is initially calculated and then equated to a non-numeric score (e.g., "Satisfactory", "Good", "Needs Improvement", "Concerning", etc.). The criteria can include a range, an upper threshold, a lower threshold, a set of ranges or thresholds, or a function. For example, one criterion can specify that a "Satisfactory" rating will be assigned either if a population statistic is above a threshold or if the population statistic has improved by at least 20% relative to a comparable population statistic pertaining to less recent care.

In some instances, satisfaction engine 240 evaluates a set of check-point indicators in view of one or more satisfaction criteria. For example, satisfaction engine 240 can determine whether at least a threshold percentage of the indicators exceed (e.g., which, in various embodiments, can include exceeding in a positive or negative direction) a threshold.

In one instance, population quantifier 230 generates a score based on multiple check-point indicators, statistics, assessment of one or more check-point indicators and/or assessments of one or more statistics. For example, population quantifier 230 can generate a normalized statistic for each of a group of check-point indicators. A score can be a weighted sum of the normalized statistics. As another example, satisfaction engine 240 can produce a binary output, for each statistic related to each of a group of check-point indicators, indicating whether the statistic passes a satisfaction criterion. A score can be a weighted sum of the binary outputs.

After assessing satisfaction criteria, satisfaction engine 240 can identify one or more controllable parameters pertaining to a check-point indicator underlying the assessment. Satisfaction engine 240 can identify suggested changes to the controllable parameter(s) based on a satisfaction result. For example, a below-threshold result or unsatisfactory result can result in satisfaction engine 240 recommending a change to a controllable parameter in a first direction and an above-threshold result or satisfactory result can result in satisfaction engine 240 not recommending any change. In another example, a recommendation analysis extends beyond a binary assessment. For example, a satisfaction score in a first range can result in a recommendation to change a parameter in a first direction (e.g., to improve care), a score in a second range can result in no change recommendation, and a score in a third range can result in a recommendation to change a parameter in a second direction (e.g., to save costs).

A presentation engine 245 can present a population statistic, satisfaction criterion feature (e.g., threshold), satisfaction result, pertinent controllable parameter and/or suggested change to the pertinent controllable parameter to a reviewer 115. Presentation engine 245 can require authentication and/or a login before any such presentation. The presentation can include transmission of data to another device (e.g., a reviewer device 120), such that pertinent information can be presented at the other device.

In some instances, presentation engine 245 generates a report, the report including the statistic, satisfaction criterion feature, result, parameter and/or suggested change. The report can be stored in a reports data store 250 and presented to reviewer 115 (e.g., by presenting it on a page of an app or webpage, by presenting reviewer 115 with a link to download the report, or by emailing it to reviewer 115). The report can be presented routinely, upon a satisfaction analysis or upon determining that a satisfaction criterion was not met. In some instances, the report is dynamically (e.g., routinely being updated to show recent data) and can be presented substantially continuously.

The report can include graphs, tables, graphics and/or texts. In some instances, a population statistic is associated with a time period, such as a period during which a procedure was performed or a patient was released. A graph can then show how the statistic changes as the time period changes, to suggest, e.g., whether an institution is improving in its care. In some instances, a population statistic associated with a recent time period is presented, along with a satisfaction criterion feature (e.g., a target value) and a comparison statistic (e.g., to show any improvement within an institution and/or to show how an institution compares to other institutions). A report can further indicate how a population statistic was calculated or what it means. For example, it can describe a check-point indicator, indicate which types of cases were aggregated to calculate the statistic, identify a number of cases aggregated, include labels, etc. In one instance, the report identifies a current value for a check-point indicator, a target value for the check-point indicator, an indication as to whether the current value meets the target value and a suggested change to a controllable parameter if the target value is not met.

Thus, population quantifier 230 and satisfaction engine 240 provide the ability to monitor overall care (which can pertain to a specific time period, care line, institution, and/or patient group). Care management system 200 can also include a case-specific monitor 255 that monitors care on a case-specific basis. Specifically, case-specific monitor 255 can detect when a new value for a check-point indicator appears within a case. The value can then be assessed (e.g., immediately or within a short time window) in view of a satisfaction criterion. Case-specific monitor 255 can then (e.g., always or upon an unsatisfactory comparison) identify a pertinent controllable parameter and recommended changes to the parameter. Presentation engine 245 can generate a report identifying the case, the indicator and any recommended change to the controllable parameter. This report can be stored in report data store 250 and/or presented to a reviewer.

In some instances, case-specific details can also be presented to explain a population statistic or to detail a population. For example, a population statistic can indicate that 35% of cases having discharge dates within a time period at an institution had an unsatisfactory satisfaction result pertaining to a particular check-point indicator. A summary of each of all of the cases or some of the cases (e.g., those with unsatisfactory results or a random sampling) can simultaneously or subsequently (following a request for the summaries from a reviewer 115) can be presented. The summary can include value for variables, such as controllable parameters, check-point indicators and/or outcome results. The summary can further include characteristics of the patient and/or care (e.g., a date of the care, admission and/or discharge). In some instances, a summary of each case meeting a reviewer's query is presented (with or without a population statistic).

In one instance, a report is interactive, such that a reviewer can iteratively view information pertaining to various levels. For example, a report can initially show population statistics pertaining to a care line in a hospital. Upon receiving a corresponding reviewer request, population statistics can then be separately provided for one or each of a set of medical provider teams operating within the hospital. Upon receiving a corresponding reviewer request, population statistics can then be separately provided for one or each of a set of individual medical providers within a team. Check-point indicators supporting statistics can be presented alongside any presentation or, for example, upon receiving a corresponding request for such.

In one instances, population quantifier 230 performs a cross-level analysis to estimate which entity (and at which level) is likely responsible for one or more unsatisfactory or concerning population statistics or check-point indicators. For example, multiple doctors, nurses and departments may be associated with unsatisfactory population statistics. Population quantifier 230 can estimate that a medical-team-level problem is likely at the center of such statistics rather than any particular individual. The estimation can be performed by, for example, identifying a level with high cross-entity variability, identifying a level with a high cross-level value (e.g., population statistic), comparing variability amongst a set of entities at a lower level each of which corresponds to a single entity at a higher level, etc.

In some instances, presentation engine 245 can then present an identification of an entity (e.g., and a level of the entity) estimated to be responsible for unsatisfactory performance. The presentation can further include identifying population statistics and/or check-point indicators associated with the entity (e.g., and other entities at the level for comparison purposes) and/or associated with other related entities. For example, entities can be arranged in a hierarchy along various levels. Each entity can be connected to one or more other entities in other levels. Determining of population statistics for a higher level entity can involve aggregating check-point indicators associated with each of multiple lower level entities that are connected to the higher level entity. Thus, unsatisfactory indicators associated with one entity may result in degraded population statistics associated, not only with the entity, but also for other connected entities. Presentation engine 245 can identify information pertaining to the connected entities, such that a reviewer can see how a problem at one level corresponds to problems at other levels.

In some instances, presentation engine 245 can present reports and/or data to reflect substantially current data. For example, new case data can be represented in, presented and/or reported within a week, day, twelve hours, six hours, two hours, hour, fifteen minutes, minute, twenty second, five seconds or one second. In one instance, reports and/or data are updated in a real-time manner, such that presented reports and/or data relate to current operations of an entity. It will be appreciated that what constitutes real time can vary depending on a care line. For example, to characterize real-time operations of an operating room, data may need to be current within a five-minute window. Meanwhile, for a behavioral-health care line, less frequent updates (e.g., once a day) may sufficiently capture a current performance.

To timely update reports and/or data, various update-preparation actions can be performed. For example, at times corresponding to appropriate update times, case engine 205 can request case data from user devices, aggregator 225 can re-aggregate data (e.g., to include new data and/or to not include sufficiently old data), population quantifier 230 can generate one or more new population statistics or care score, satisfaction engine 240 can assess a new population statistic or care score, case-specific monitor 255 can analyze new case-specific data, population quantifier 230 and/or satisfaction engine 240 can identify any entities performing unsatisfactorily, and/or presentation engine 245 can update a report or generate a new report.

Figure 3:
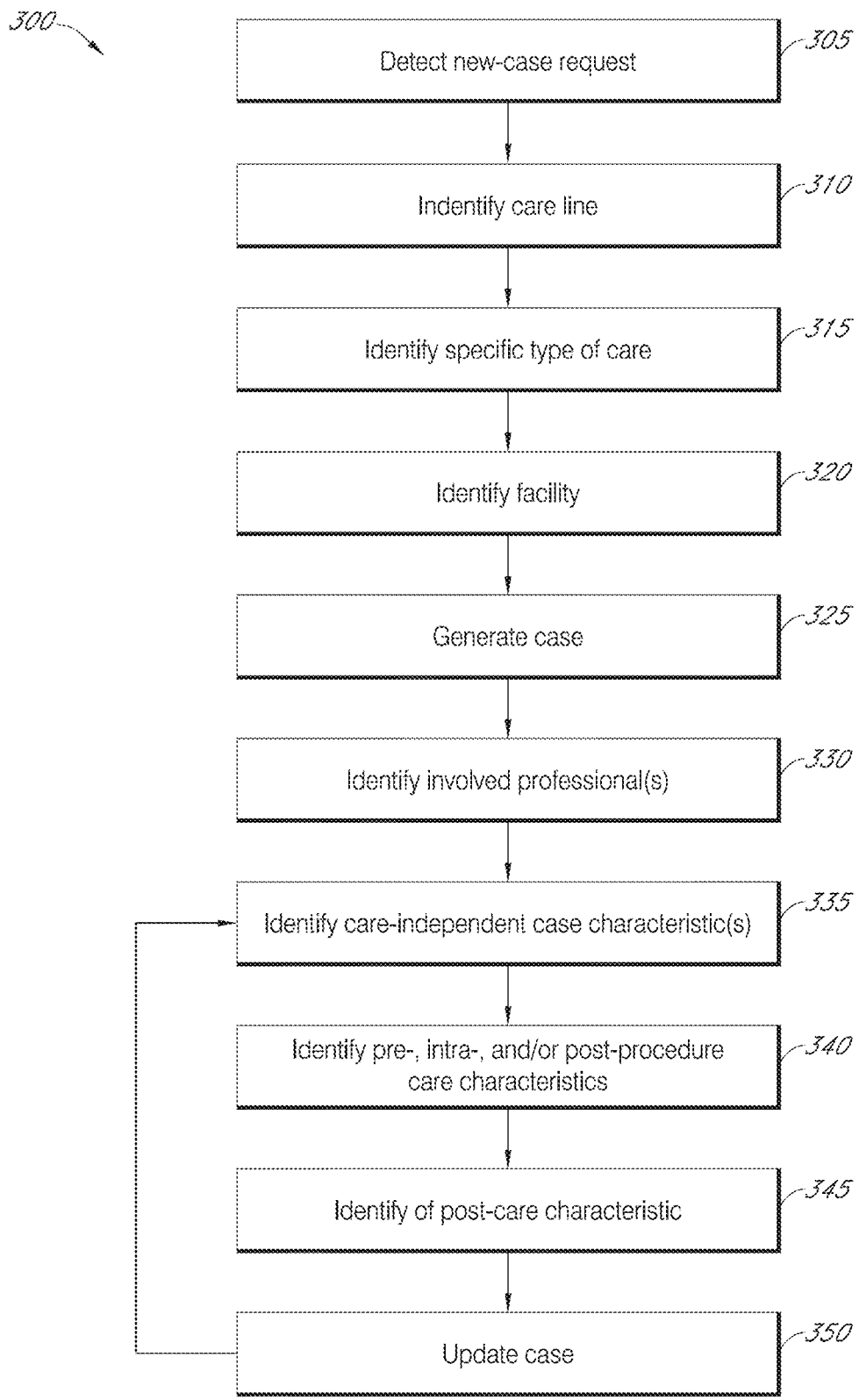
FIG. 3 illustrates a flowchart of an embodiment of a process for generating a medical-care case.

FIG. 3 illustrates a flowchart of an embodiment of a process 300 for generating a medical-care case. Process 300 begins at block 305, where case engine 205 detects a request from a user (e.g., via a website or app) for a new case to be generated. The request can include an express request (e.g., a selection of a 'new-case' button) or an implicit request (e.g., via a user uploading a file or beginning to enter information about a new patient or procedure).

Case engine 205 identifies a car line at block 310, a specific type of care (e.g., a specific procedure) at block 315 and a facility (e.g., one in which a patient is or will be admitted or one where care is being or will be provided) at block 320. The identifications can be based on, for example, user input (e.g., entering information or selecting from amongst a set of options), detecting corresponding information in an uploaded or received document (e.g., transmitted from a user device), and/or detecting information about a user device providing information and/or uploading documents (e.g., to identify an IP address to be associated with a particular facility).

Case engine 205 generates a case at block 325. Certain data may be required before a case will be generated, such as the data collected at one, more or all of blocks 310-320 and/or other data (e.g., date(s) of care, pre-care symptoms, patient-identifying information, etc.).

Case engine 205 identifies (e.g., via analysis of an uploaded or received document or user input) one or more professionals involved in the case's care (e.g., performing a procedure or providing pre- and/or post-procedure care) at block 330. The professionals can include physicians, surgeons, assistances, nurses, supervisors, and/or managers. Block 330 can further include an identification of how and/or when the identified professional(s) were, are or will be involved in the care.

Case engine 205 identifies (e.g., via analysis of an uploaded or received document or user input) a care-independent case characteristic (e.g., a patient's ailments, past procedures, current medications, weight, etc.) at block 335. Case engine 205 identifies (e.g., via analysis of uploaded documents, user input or data received from a medical device 130) a pre-, intra- and/or post-procedure care characteristic at block 340. Case engine 205 identifies (e.g., via analysis of an uploaded or received document or user input) a care-result characteristic at block 345.

One, more or all of the characteristics received at blocks 335-345 can be defined based on variables in variable data store 215. The characteristics can be received at substantially the same time (e.g., if a user is inputting data from a medical record or if they are included in a single document) or at various time points (e.g., as care progresses). The characteristics can be received from one or more user devices 110 and/or medical devices 130. Case engine 205 updates the case to include the received characteristic(s) at block 350. The update can occur as characteristics are received or at discrete time points (e.g., at regular intervals or prior to generating a report for a reviewer).

Figure 4:
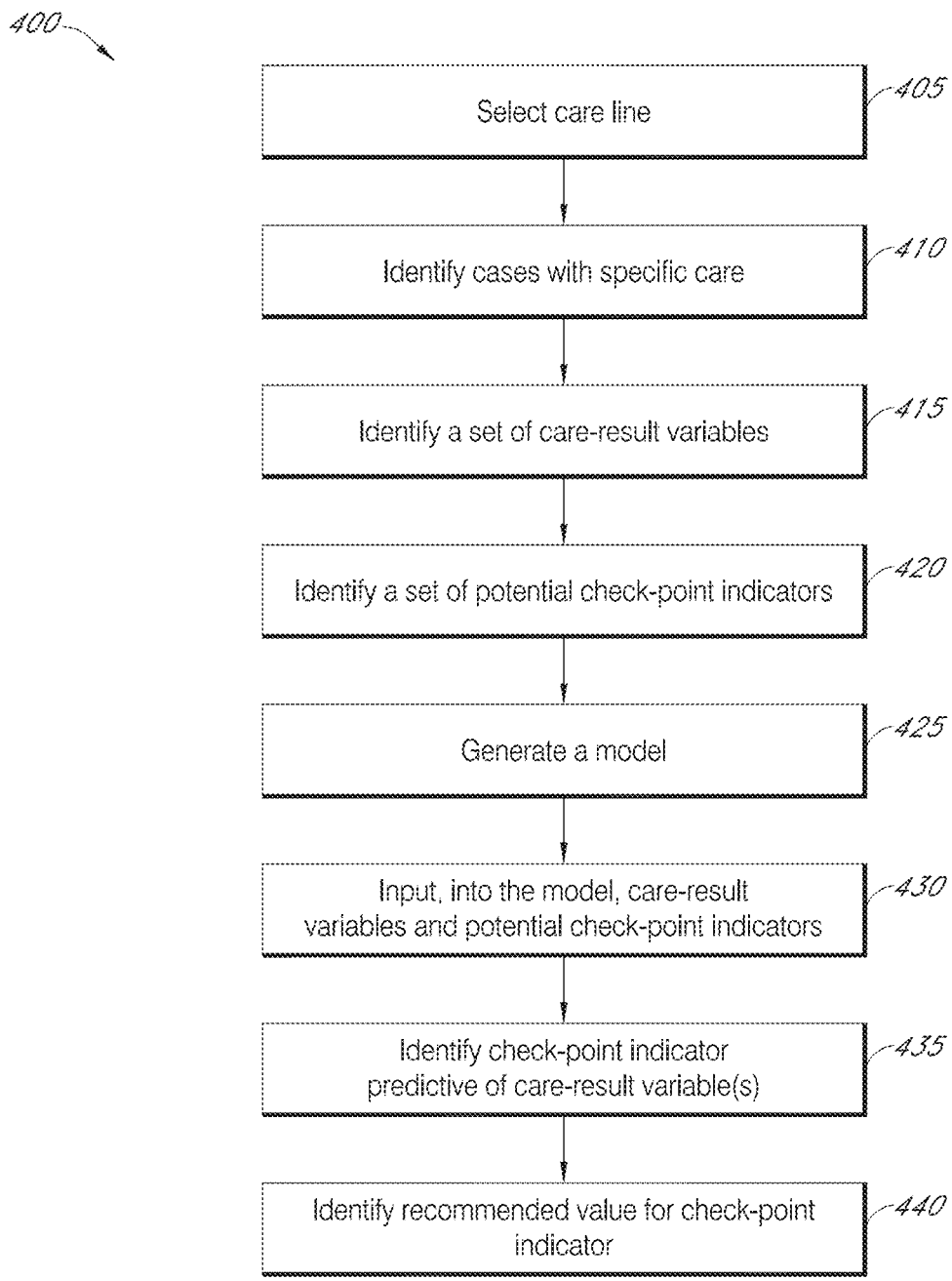
FIG. 4 illustrates a flowchart of an embodiment of a process for identifying check-point indicators to monitor.

FIG. 4 illustrates a flowchart of an embodiment of a process 400 for identifying check-point indicators to monitor. Process 400 begins at block 405, where care-line selector 220 selects a care line. Aggregator 225 identifies cases with specific care at block 410. Additional restrictions (e.g., identifying an institution, time period, type of procedure and/or patient characteristic) can also constrain which cases are identified at block 410. The identified cases can include those which are associated with dates sufficiently long ago to allow most subsequent care results caused by the care to have occurred. Population quantifier 230 identifies a set of care-result variables at block 415. The care result variables can be ones defined in variable data store 215 and/or identified by a user or reviewer. Population quantifier 230 identifies a set of potential check-point indicators at block 420. The potential check-point indicators can include some or all pre-, intra- and/or post-care characteristics. In some instances, the potential check-point indicators are characteristics defined by a user or reviewer as being a potential check-point indicator.

Population quantifier 230 generates a model at block 425. The model can be designed to identify which of a set of first variables are predictive (and a strength of any such prediction) of one or more second variables. The model can include, e.g., a learning algorithm, neural-net technique, and/or regression analysis. Population quantifier 230 inputs, into the model, the care result variables and the potential check-point indicators at block 430. In some instances, multiple care result variables are collapsed into a single metric, which is input into the model. The model can then produce output indicating which of the potential check-point indicators were correlated with or predictive of the care result variables and can, in some instances, further identify a significance and/or strength (or weight) of the correlation.

Variable selector 235 identifies a check-point indicator predictive of care result variable(s) at block 435. The indicator can be identified based on a weight or significance produced by the model. Variable selector 235 identifies a recommended value for the check-point indicator at block 440. The recommended value can include a threshold, a range bound, or a target. It can pertain to a population statistic. For example, if a check-point indicator is a surgery duration, the recommended value can include a case-specific duration threshold (e.g., "20 min") or a population statistic type and a range (e.g., "average weekly duration of 1-2 hours +/−30 minutes"). The value can be determined based on a sign of a relationship (e.g., correlation) between the indicator and one or more care-results. In some instances, recommended care result variable values are identified and a value of an indicator is back-calculated given model parameters. In some instances, simulations are run using a random or systematic array of possible indicator values to identify the value. Any of these processes can further consider practical constraints on the value and/or costs of extreme values (e.g., financial costs or time costs). Variables data store 215 can be updated to reflect the identified check-point indicator(s) and value(s).

It will be appreciated that part or all of process 400 can be periodically or routinely repeated. Thus, check-point indicators can be dynamic in their identity and can include those characteristics most predictive of quality-of-care results during recent time periods. It will be appreciated that, while process 400 includes one technique for identifying check-point indicators and recommended values in an at least partly automated manner, check-point indicators and recommended values can be defined using any of a variety of techniques and/or information. For example, a user can identify one or more check-point indicators for each of one or more care lines, and recommended values can be identified based on population statistics (e.g., to identify typical values or values associated with positive care-result variables) and/or based on user input.

Figure 5:
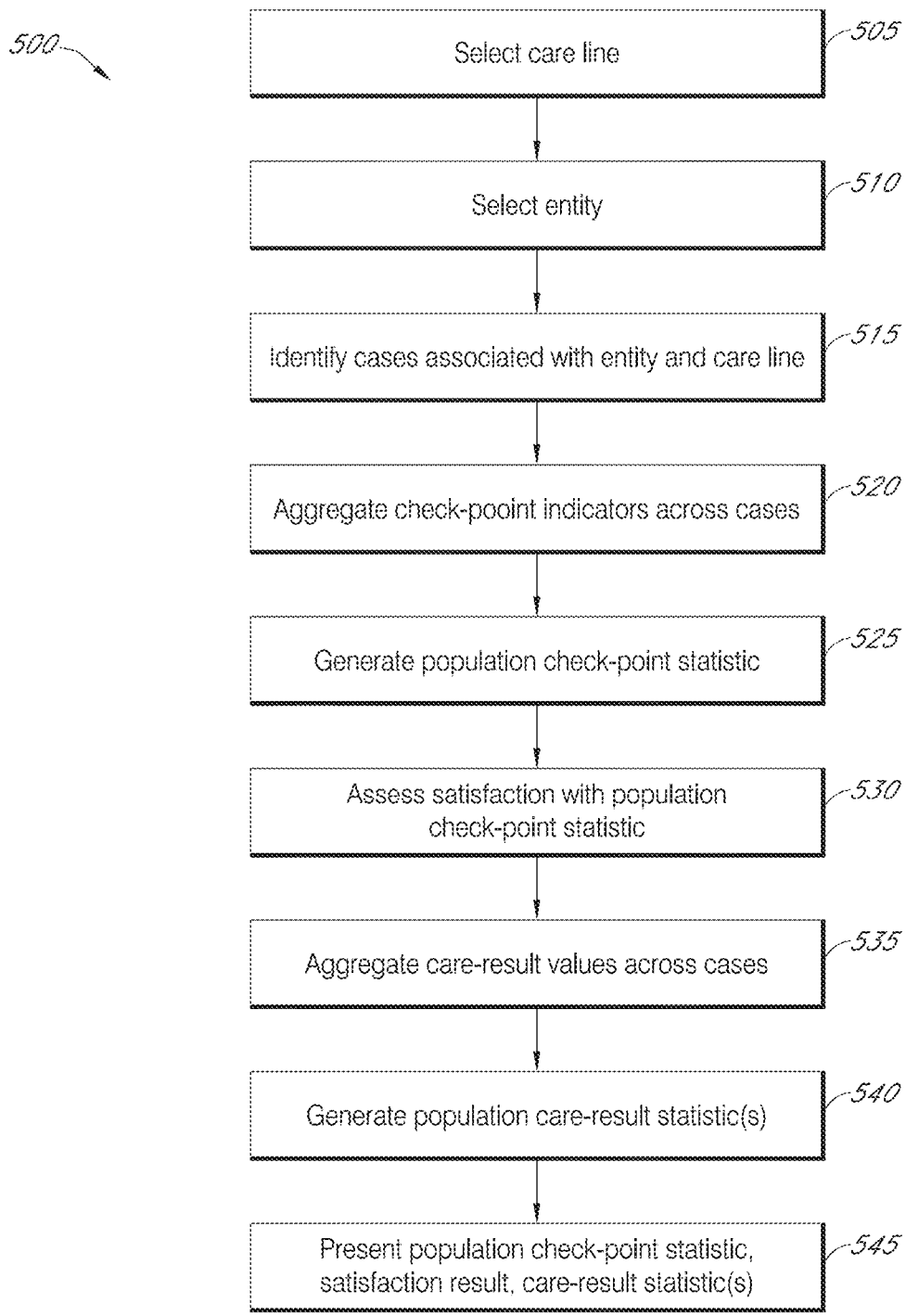
FIG. 5 illustrates a flowchart of an embodiment of a process for assessing medical care at a population level using check-point indicators.

FIG. 5 illustrates a flowchart of an embodiment of a process 500 for assessing medical care for a set of cases (e.g., applying to a particular entity) using check-point indicators. Process 500 begins at block 505, where care-line selector 220 selects a care line. Care-line selector 200 further selects an entity at block 510. The entity can include, for example, a facility (e.g., medical institution or hospital), a medical provider (e.g., a physician, technician or nurse), or a combination thereof. In some instances, block 510 includes selecting a group of entities (of same or different types), such as entities associated with a same or similar geographical region, supervising agency, insurance plan, owner, position, etc. The selections at blocks 505-510 can be based on, for example, input from a user or reviewer, automatically determined based on which reviewer is accessing a system, or determined based on data associated with a request (e.g., for a report) from a reviewer (e.g., identifying an entity associated with the reviewer or an entity identified in the request).

Aggregator 225 identifies cases associated with the care line and entity at block 515. Once again, the aggregation can be responsive to additional search constraints, such as time periods. For example, aggregator 225 can identify cases associated with an intensive-care unit at a specific hospital but can require that each case correspond to an instance where a patient was in the intensive-care ward within a previous week. As another example, aggregator 225 can identify cases, each corresponding to an instance where a patient was admitted to an emergency room on a current day and assigned to a particular physician.

Aggregator 225 aggregates check-point indicators across the identified cases at block 520. For example, aggregator 225 can generate a vector or matrix including the indicators. In some instances, aggregating the indicators can include aggregating each of multiple different check-point indicators (e.g., to produce a set of intake-time values and a set of times until physician evaluation values). In some instances, a check-point indicator may be unavailable for one or more cases. In one instance, such unavailability can be noted in an aggregated data structure. In one instance, the case can then be omitted from a present analysis pertaining to the care line and entity (e.g., though it may later be included upon availability of such indicator) or selectively from a present analysis pertaining only to the unavailable check-point indicator(s) (e.g., though it may contribute to one or more statistics corresponding to other check-point indicators).

Population quantifier 230 generates one or more population check-point statistics at block 525. Each population check-point statistic can correspond to a check-point indicator. When multiple population check-point statistics are generated, they may, or may not, include statistics of different types. For example, generated statistics can include an average and a maximum or a percentage (e.g., with above-threshold values) and a standard deviation.

Satisfaction engine 240 accesses variables data store 215 to identify a satisfaction criterion pertaining to the population check-point statistic. At block 530, satisfaction engine 240 assesses whether the criterion is met based on one or more population check-point statistics. In one instance, determining whether the satisfaction criterion is met corresponds to determining whether the population statistic matches a recommended value or range of values. The assessment can produce a satisfaction result, which can include, e.g., a numeric or textual result. In some instances, assessing satisfaction includes comparing one or more statistics to one or more thresholds (e.g., to determine whether a statistic exceeds a threshold or an extent to which a statistic does (or does not) exceed a threshold), comparing a statistic to one or more corresponding statistics (e.g., associated with other care lines), and/or comparing a statistic to a corresponding past statistic (e.g., to identify a change or acceleration in the statistic).

Aggregator 225 aggregates each of one or more care-result values (e.g., a value reflecting a prevalence (e.g., count or percentage) and/or severity of a complication, prevalence of readmission, prevalence and/or severity of readmission, etc.) across the identified cases at block 535. For example, aggregator 225 can generate a vector or matrix including the values. In some instances, a care-result value may be unavailable for one or more cases. In one instance, such unavailability can be noted in an aggregated data structure. In one instance, the case can then be omitted from a present analysis pertaining to the care line and entity (e.g., though it may later be included upon availability of such indicator) or selectively from a present analysis pertaining only to the unavailable care-result value(s) (e.g., though it may contribute to one or more statistics corresponding to other care-result values. In some instances, the cases used for the block 535 aggregation differ from those used for the block 520 aggregation (e.g., where cases for the block 535 aggregation may be associated with an over-lapping or non-overlapping later care time period). In some instances, the cases used for the block 535 aggregation differ from those used for the block 520 aggregation.

Population quantifier 230 generates one or more care-result statistics at block 540. Each generated population care-result statistic can correspond to a care result. When multiple population care-result statistics are generated, they may, or may not, include statistics of different types. For example, generated statistics can include an average and a maximum of a variable cost of care result for a care line and a percentage (e.g., with above-threshold values) and a standard deviation (e.g., for a same or different care result) for a length of stay care result for the care line.

In one instance, a care-result statistic includes a care score, which can be generated based on one or more of the generated population check-point statistics and/or based on one or more satisfaction assessments. In one instance, the care score is generated based on (or can include) a change in a population check-point statistic and/or satisfaction assessment. The care score can include, for example, a weighted (or unweighted) sum or average of a set of population check-point statistics or satisfaction results. Population quantifier 230 can further determine how the care score compares to care scores of other entities and/or time periods.

Presentation engine 245 presents one or more population check-point statistics, satisfaction results and/or care-result statistics at block 545. In some instances, presentation engine 245 generates a report to include the statistic(s), satisfaction result(s) and care-result statistic(s). In one instance, the report is configured to be interactive and may allow for the user to interact with the report to view various levels of detail (e.g., zeroing down on care provided by a particular institution, then a particular team, then a particular professional, then constraining a time period) or to understand different types of care. In one instance, the report is dynamic, such that presented values are periodically or continuously updated to reflect new cases and case updates.

In one instance, a report is structured to allow for a comparison between entities and/or care lines. For example, a population statistic for one entity can be represented amongst a distribution of corresponding statistics from other entities. As another example, a report can include care scores for a set of care lines for an entity. In one instance, a report is structured to allow for a temporal comparison. For example, a first background color of a care score can indicate that the care score is worse than one from a previous time period by a threshold amount, a second background color of a care score can indicate that the care score is better than one from a previous time period by a threshold amount, and a third (or no) background color can represent that the care score is the same as a previous care score (within a threshold amount). As another example, a line graph can show a time-series for each of one or more (e.g., normalized) population statistics for an entity over time (e.g., and can further identify recommended value thresholds for the statistics).

It will be appreciated that process 500 can (like all processes disclosed herein) be modified to include fewer, more or different blocks. For example, process 500 can further include assessing a satisfaction of one or more care results, population care-result statistics (e.g., pertaining to particular care results or an overall care score) and presenting a result of each of one or more of the assessments.

Figure 6:
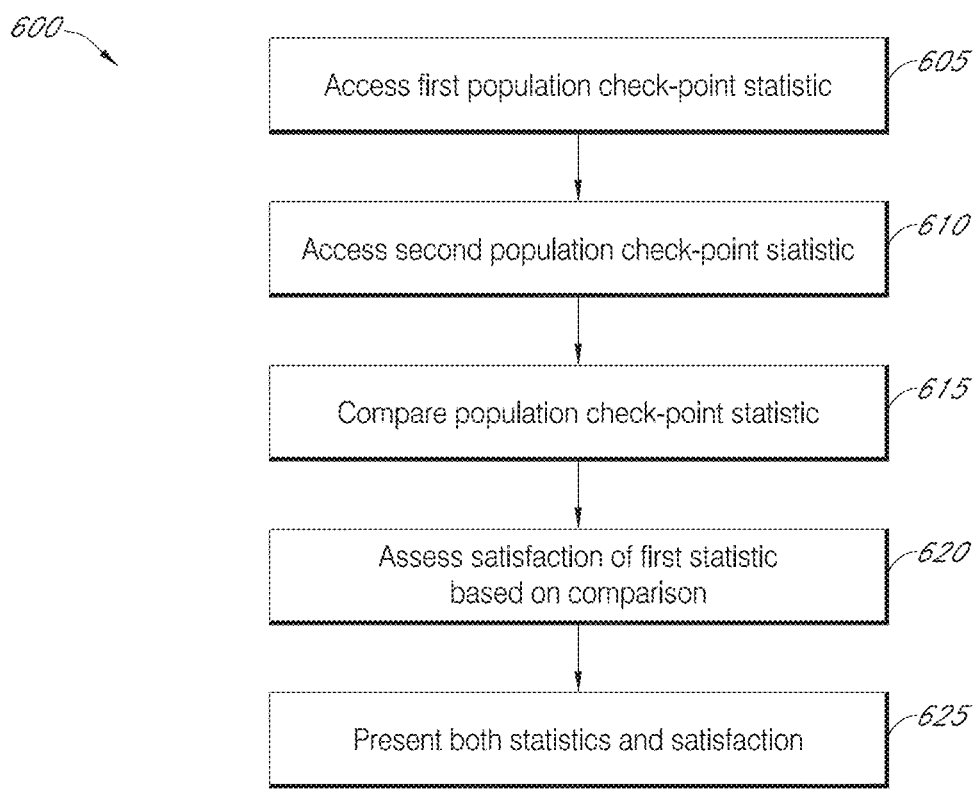
FIG. 6 illustrates a flowchart of an embodiment of a process for assessing medical care at a population level using check-point indicators.

FIG. 6 illustrates a flowchart of an embodiment of a process 600 for assessing medical care at a population level using check-point indicators. Process 600 begins at block 605, where satisfaction engine 240 accesses a first population check-point statistic at block 610. Satisfaction engine 240 accesses a second population check-point statistic at block 615. The first population check-point statistic can be one determined by population quantifier based on a first population of cases. The second population check-point statistic can be one determined by population quantifier based on a second population of cases. The two populations can be comparable but can vary in one respect, such as a time period (during which an institution admission occurred or procedure was performed), an institution, an involved professional, a patient characteristic (e.g., an age or weight) or a type of care provided within a care-line (e.g., an anesthesia used or a surgery-preparation measure). In some instances, the second population is larger than the first population. For example, the first population can be restricted to a single institution/professionals while the second can include all institutions/professionals. The statistics can be of a same type or similar types. In one instance, a statistic for the first population includes a single value and a statistic for the second population includes a range or variance (e.g., and potentially also a mean).

Satisfaction engine 240 compares the population check-point statistics to each other at block 620. The comparison can include a mathematical comparison, such as identifying which statistic is larger, an extent to which one statistic is larger than another, or whether the first statistic falls within a variance or range identified in the second statistic. Thus, this comparison can indicated how cases in the first population (e.g., relating to care provided by a particular institution or provided during a particular time period) fared relative to those in the second population (e.g., relating to a larger case dataset). Satisfaction engine 240 assesses satisfaction of first statistic based on the comparison at block 625. For example, it can be determined whether the first statistic is within a range or variance of the second statistic. Satisfaction engine 240 presents both statistics and a satisfaction result at block 630. The presentation can include presenting numbers, graphs and/or graphics.

It will be appreciated that process 600 can be modified to, for example, relate to care-result statistics and/or care scores instead of or in addition to check-point statistics.

Figure 7:
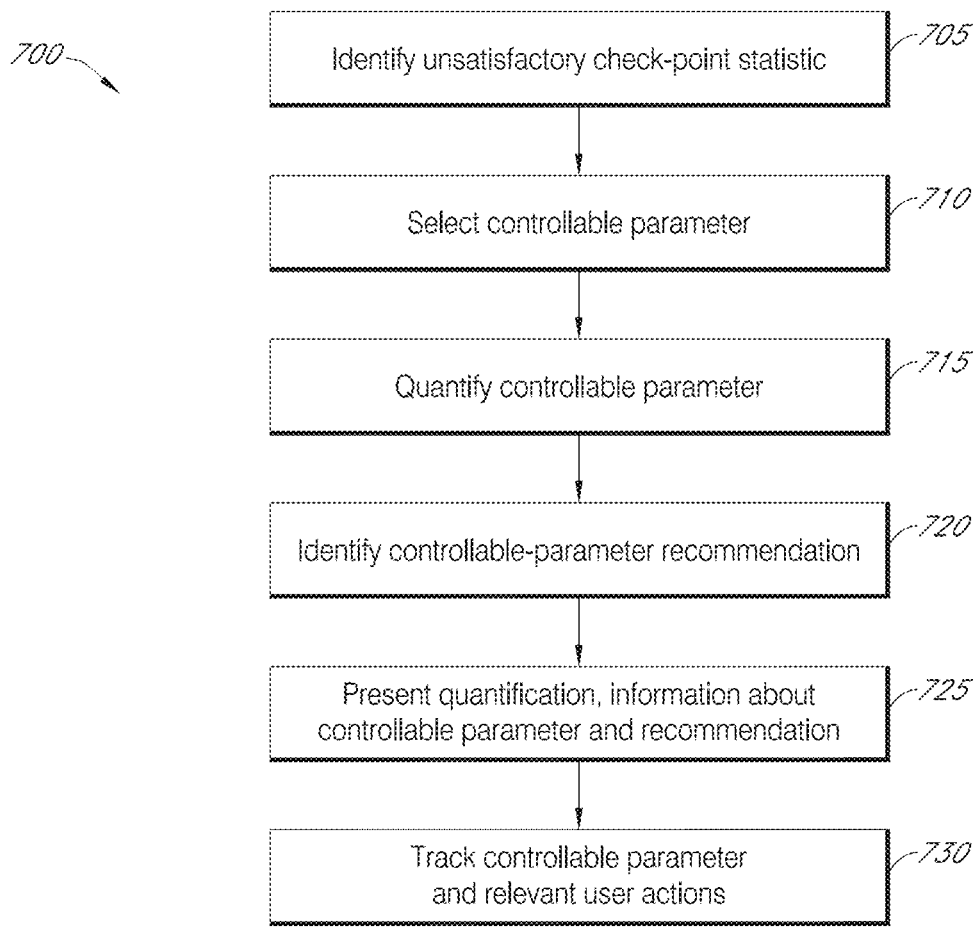
FIG. 7 illustrates a flowchart of an embodiment of a process for identifying controllable parameters pertaining to a check-point statistic of interest.

FIG. 7 illustrates a flowchart of an embodiment of a process 700 for identifying controllable parameters pertaining to a check-point statistic of interest. Process 700 begins at block 705, where satisfaction engine 240 identifies an unsatisfactory check-point statistic. The check-point statistic can include, for example, a value of a check-point indicator for a particular case or a value of a population statistic based on one or more check-point statistics. The statistic can correspond to one for which a corresponding satisfaction criterion was not satisfied and/or exceeded a threshold value. In some instances, the check-point statistic is determined to be unsatisfactory based on an analysis of the statistic absolutely. In some instances, the designation of the statistic being unsatisfactory results from an analysis comparing the statistic to one or more other statistics (e.g., one for a different time period and/or entity).

Satisfaction engine 240 selects a controllable parameter pertaining to the check-point statistic at block 710. This selection can be based on associations between check-point indicators and controllable parameters stored in variables data store 215. The associations can include automatically detected associations (e.g., identifying a correlation or other relationship between a number of nurses involved in an operation and a time of the operation) and/or associations identified by a user or reviewer. A controllable parameter can directly or indirectly influence a check-point indicator. For example, a controllable parameter can be proper administration of a blood-thinning medication, which could directly influence a check-point indicator indicating whether a blood-thinning medication was administered.

In some instances, population quantifier 230 quantifies the selected controllable parameter at block 715. The quantification can be performed using a same set of cases as those giving rise to the unsatisfactory check-point statistic or based on similar but more recent cases. For example, the quantification can include identifying a statistic for the controllable parameter that corresponds to the check-point statistic.

Satisfaction engine 240 identifies a recommendation pertaining to the controllable parameter at block 720. The recommendation can be based on the unsatisfactory statistic, the quantified parameter and/or the association. In some instances, the recommendation is based on a model relating controllable parameters to check-point indicators. Such a model can have properties similar to the model described in relation to FIG. 4. In some instances, a single model relates controllable parameters, check-point indicators and care results.

In one instance, identifying a recommendation includes selecting from amongst a set of recommendations. The selection can be based on which check-point statistic was identified at block 705, which controllable parameter was selected at block 710 and/or the quantification at block 715.

In one instance, a recommendation can relate to data availability, which can include (for example) changing monitoring (e.g., to increase frequency or change times of monitoring particular health data), changing data presentation (e.g., to ensure that particular reviewers quickly receive data) and/or changing a statistic calculation technique (e.g., to use smaller time windows to calculate statistics and/or to increase a weight for recent data). In one instance, a recommendation can relate to a management structure, which can include (for example) changing who is in charge of making particular decisions, a quantity of work or decisions assigned to one or more particular individuals or types of individuals or an authority given to one or more individuals (e.g., to be able to contribute to or individually make particular types of health decisions).

In one instance, a recommendation can relate changing an aspect of care development, such as a protocol for providing care to a given patient group (e.g., a type of post-operative care provided or a length of an in-hospital monitoring period). In one instance, a recommendation can relate to changing an aspect of care delivery (e.g., changing who is assigned to provide particular types of care, changing a number of people assigned to assist in a type of care or changing whether a type of care is to be delivered as in- or out-patient care). In one instance, a recommendation can relate to changing an aspect of a supply chain (e.g., changing a protocol for requesting a medication from a pharmacy or routing a medication from a pharmacy to an administer of the medication). In one instance, a recommendation can relate to changing an aspect of education (e.g., providing education pertaining to post-operative limitations or medication limitations to a patient, providing information pertaining to appropriate medication-dosage determinations to nurses or providing information about patient-group definitions to a physician).

Presentation engine 245 presents the controllable-parameter quantification, information about the controllable parameter and/or the recommendation to a reviewer 115 at block 725. This presentation can be via a report, email, webpage, app page, text message, etc. Reviewer 115 can include on who initiated a reviewing process and/or one associated with the recommendation. In one instance, a communication is sent to a system automatically effect the recommendation (e.g., to change a frequency of monitoring a health variable or to change a number of health professionals assigned to an event). In one instance, presenting a recommendation includes presenting a one- or multi-step action plan.

Satisfaction engine 240 tracks values for the controllable parameter, whether the recommendation was seemingly or known to have been effected (and, potentially, an extent or type of the recommendation implementation) and relevant user actions at block 730.

It will be appreciated that process 700 can be modified to, for example, identify an unsatisfactory care-result value instead off an unsatisfactory check-point statistic at block 705. The controllable parameter selected at block 710 can then be one associated with the care result.

Figure 8:
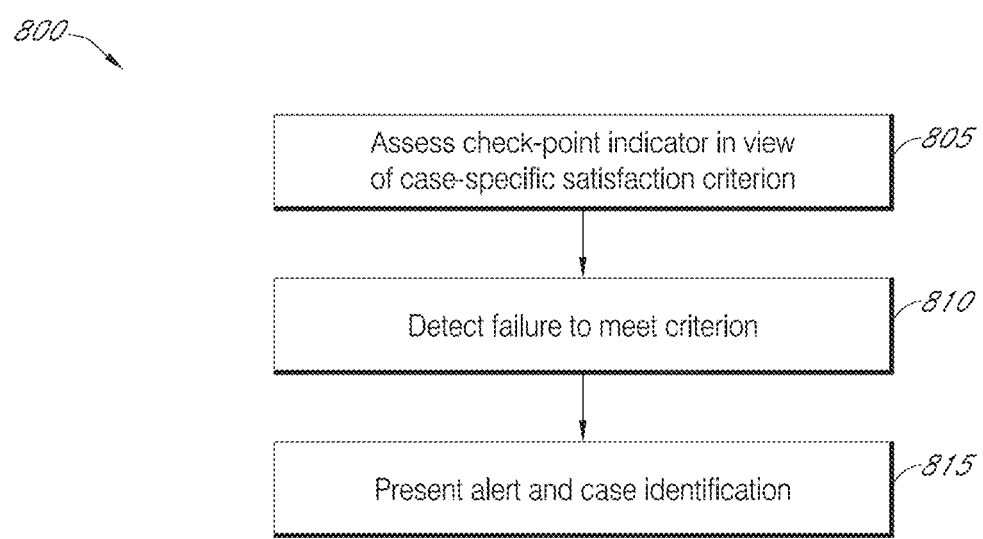
FIG. 8 illustrates a flowchart of an embodiment of a process for assessing medical care at a case-specific level.

FIG. 8 illustrates a flowchart of an embodiment of a process 800 for assessing medical care at a case-specific level. Process 800 begins at block 805, where case-specific monitor 255 assesses a check-point indicator for a case in view of a case-specific satisfaction criterion. The assessment can occur substantially continuously, at routine intervals or upon detecting a change (e.g., detecting entry of a value of a case characteristic by a user). It will be appreciated that a check-point indicator monitored and/or assessed for individual cases and/or a case-specific satisfaction criterion can be the same as or different from a check-point indicator and/or satisfaction criterion used for population analysis. The assessment can include, e.g., comparing the indicator to one or more thresholds, quantifying a change (e.g., temporal derivative) in the indicator, and/or calculating a satisfaction score. In one instance, the assessment can include comparing the indicator to one or more other indicators, such as a corresponding indicator associated with a different entity and/or time period.

Case-specific monitor 255 detects a failure to meet the criterion at block 810. For example, the detection can include detecting an unsatisfactory rating, determining that a satisfaction score is below a threshold, and/or detecting a negative change in a satisfaction rating.

Presentation engine 245 generates an alert and presents the alert (e.g., to a reviewer 115) at block 815. The alert can be presented by, e.g., presenting the alert on a webpage or app page, emailing the alert, paging a reviewer, texting the alert, etc. The alert can identify the case at issue (e.g., including a name of a patient), the check-point indicator assessed, an indication of the failure to meet the criterion, a proposed change in an indicator-related controllable feature, and/or an identification of the indicator-related controllable feature.

In some embodiments, a care management system is provided for identifying intra-care characteristics indicative of a caliber of medical care being provided to patients. A case data store includes a plurality of cases. Each case of the plurality of cases identifies a patient, a type of a medical care received by the patient, a set of potential check-point indicators, and a care result variable. Each potential check-point indicator of the set of potential check-point indicators characterizes a feature of the medical care received by the patient or a health characteristic of the patient during a provision of the medical care. (In some instances, one, more of each potential check-point indicator of the set of potential check-point indicators cannot practically be directly controlled by a provider of the medical care.) The care result variable identifies whether an event occurred after or during the provision of the medical care, the event relating to the patient's health and being indicative of a quality of the medical care. An aggregator identifies a set of cases from amongst the plurality of cases. Each case of the set of cases identifies a same type of medical care. A population quantifier accesses, from each case in the set of cases, the set of potential check-point indicators and the care result variable. The population quantifier further inputs the sets of potential check-point indicators and the care result variables from the set of cases into a model. The population quantifier further executes the model. Execution of the model produces an output indicating, for each of the potential check-point indicators from the set of potential check-point indicators, whether the potential check-point indicator is predictive of the care result variable. A variable selector identifies a potential check-point indicator of the set of potential check-point indicators as being a check-point indicator based on the determination of the model. In some instances, the variable selector further identifies a satisfaction criterion for the check-point indicator, and the satisfaction criterion includes a value.

In some embodiments, a care management system is provided for identifying intra-care characteristics indicative of a caliber of medical care being provided to patients. A case data store includes a plurality of cases. Each case of the plurality of cases identifies a patient, a type of a medical care received by the patient, an entity that provided the medical care, a set of potential check-point indicators, and a care result variable. Each potential check-point indicator of the set of potential check-point indicators characterizes a feature of the medical care received by the patient or a health characteristic of the patient during a provision of the medical care. (In some instances, one, more of each potential check-point indicator of the set of potential check-point indicators cannot practically be directly controlled by a provider of the medical care.) The care result variable identifies whether an event occurred after or during the provision of the medical care. The event relates to the patient's health and being indicative of a quality of the medical care. An aggregator identifies a first set of cases from amongst the plurality of cases. Each case of the first set of cases identifies a same type of medical care and a first entity. The aggregator also identifies a second set of cases from amongst the plurality of cases. Each case of the second set of cases identifies a same type of medical care and a second entity. A population quantifier, for each set of the first set of cases and the second set of cases: accesses, from each case in the set of cases (the set of potential check-point indicators and the care result variable), inputs the sets of potential check-point indicators and the care result variables from the set of cases into a model, and executes the model. Execution of the model produces an output indicating, for each of the potential check-point indicators from the set of potential check-point indicators, whether the potential check-point indicator is predictive of the care result variable. A variable selector identifies, for each set of the first set of cases and the second set of cases, a potential check-point indicator of the set of potential check-point indicators as being a check-point indicator based on the determination of the model. A first check-point indicator identified by the population quantifier using the first set of cases differs from a second check-point indicator identified by the population quantifier using the second set of cases. In some instances, the variable selector further determines a first satisfaction criterion for the first check-point indicator. The first satisfaction criterion includes a first value. The variable selector can also determine a second satisfaction criterion for the second check-point indicator, the second satisfaction criterion including a second value.

In some embodiments, a care management system is provided for identifying intra-care characteristics indicative of a caliber of medical care being provided to patients. A case data store includes a plurality of cases. Each case of the plurality of cases identifies a patient, a type of a medical care received by the patient, a set of potential check-point indicators, and a set of care result variables. Each potential check-point indicator of the set of potential check-point indicators characterizes a feature of the medical care received by the patient or a health characteristic of the patient during a provision of the medical care. (In some instances, one, more of each potential check-point indicator of the set of potential check-point indicators cannot practically be directly controlled by a provider of the medical care.) Each care result variable of the set of care result variables identifies whether an event occurred after or during the provision of the medical care, the event relating to the patient's health and being indicative of a quality of the medical care. An aggregator identifies a set of cases from amongst the plurality of cases. A population quantifier accesses, from each case in the set of cases, the set of potential check-point indicators and the set of care result variables and inputs the sets of potential check-point indicators and the sets of care result variables from the set of cases into a model. The population quantifier further executes the model. Execution of the model produces an output indicating, for each of the potential check-point indicators from the set of potential check-point indicators, whether the potential check-point indicator is predictive of a net care result. The net care result depends on each care result variable of the set of care result variables. A variable selector identifies a potential check-point indicator of the set of potential check-point indicators as being a check-point indicator based on the determination of the model. In some instances, the variable selector further identifies a satisfaction criterion for the check-point indicator, the satisfaction criterion including a value.

In some embodiments, a care management system is provided for monitoring a caliber of medical care being provided to patients. A case data store includes a plurality of cases. Each case of the plurality of cases identifies a patient, a type of a medical care received by the patient, a check-point indicator and an entity that provided the medical care. The check-point indicator characterizes a feature of the medical care received by the patient or a health characteristic of the patient during a provision of the medical care. (In some instances, the check-point indicator of the set of potential check-point indicators cannot practically be directly controlled by a provider of the medical care.) The check-point indicator is predictive of a care result variable. An aggregator identifies a first set of cases and a second set of cases from amongst the plurality of cases. For each case in the first set of cases, a first entity provided the medical care. For at least one case in the second set of cases, a second entity provided the medical care. The cases in both the first and second sets identify a same type of medical care. A population quantifier generates a first population check-point statistic based on the check-point indicators identified in the first set of cases and generates a second population check-point statistic based on the check-point indicators identified in the second set of cases. A presentation engine simultaneously presents the first population check-point statistic and the second population check-point statistic. In some instance, for at least a second case in the second set of cases, the first entity provided the medical care. In some instances, the first entity comprises a first medical institution and the second entity comprises a second medical institution.

In some embodiments, a care management system is provided for monitoring a caliber of medical care being provided to patients. A case data store includes a plurality of cases. Each case of the plurality of cases identifies a patient, a type of a medical care received by the patient, a check-point indicator and a time identifier. The check-point indicator characterizes a feature of the medical care received by the patient or a health characteristic of the patient during a provision of the medical care. (In some instances, the check-point indicator of the set of potential check-point indicators cannot practically be directly controlled by a provider of the medical care.) An aggregator identifies a set of cases from amongst the plurality of cases, the set of cases having similar time identifiers and a same type of medical care. A population quantifier generates a population check-point statistic based on the check-point indicators identified in the set of cases. A satisfaction engine accesses a satisfaction criterion pertaining to the check-point indicator, and determines that the satisfaction criterion is not met based on the population check-point statistic. A presentation engine presents an indication that the satisfaction criterion is not met.

In some embodiments, a care management system is provided for monitoring a caliber of medical care being provided to patients. A case data store includes a plurality of cases. Each case of the plurality of cases identifies a patient, a type of a medical care received by the patient, a check-point indicator and a time identifier. The check-point indicator characterizes a feature of the medical care received by the patient or a health characteristic of the patient during a provision of the medical care. (In some instances, the check-point indicator of the set of potential check-point indicators cannot practically be directly controlled by a provider of the medical care.) An aggregator identifies a set of cases from amongst the plurality of cases. The set of cases have similar time identifiers and a same type of medical care. A population quantifier generates a population check-point statistic based on the check-point indicators identified in the set of cases. A satisfaction engine accesses a first satisfaction criterion pertaining to the check-point indicator and determines a first satisfaction result that indicates whether the first satisfaction criterion is met based on the population check-point statistic. A satisfaction engine further accesses a second satisfaction criterion pertaining to the check-point indicator, the first satisfaction criterion being different from the second satisfaction criterion and determines a second satisfaction result that indicates whether the second satisfaction criterion is met based on a check-point indicator identified in a case. A presentation engine presents the first satisfaction result and the second satisfaction result. In some instances, the presentation engine presents the first satisfaction result and the second satisfaction result at different times.

In some embodiments, a care management system is provided for monitoring a caliber of medical care being provided to patients. A case data store includes a plurality of cases. Each case of the plurality of cases identifies a patient, a type of a medical care received by the patient and a check-point indicator. The check-point indicator characterizes a feature of the medical care received by the patient or a health characteristic of the patient during a provision of the medical care. An aggregator identifies a set of cases from amongst the plurality of cases. Each of the set of cases are associated with a similar time and a same type of medical care. A population quantifier generates a population check-point statistic based on the check-point indicators identified in the set of cases. A satisfaction engine accesses a satisfaction criterion pertaining to the check-point indicator and determines that the satisfaction criterion is not met based on the population check-point statistic. The satisfaction engine further identifies a controllable parameter that is known or estimated to have influence over the check-point indicator and identifies a suggested modification pertaining to the controllable parameter to improve the check-point indicator. A presentation engine presents the suggested modification to the controllable parameter. In some instances, the identification of the controllable parameter includes selecting the controllable parameter from amongst a set of controllable parameter, where each controllable parameter in the set of controllable parameter is known or estimated to have influence on the check-point indicator, and the selection being based on the population check-point statistic.

Figure 9:
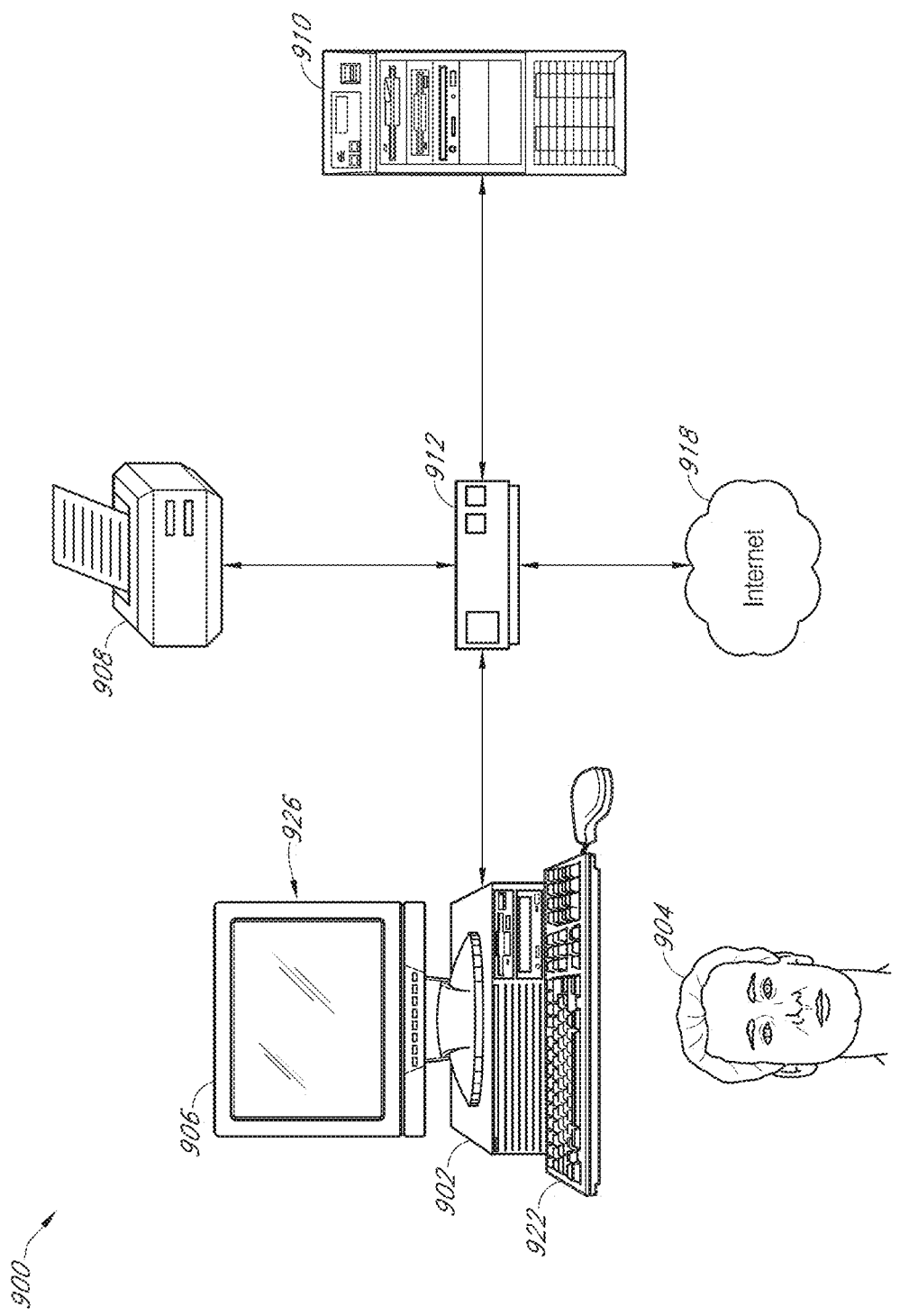
FIG. 9 depicts a block diagram of an embodiment of a computer system.

Referring next to FIG. 9, an exemplary environment with which embodiments can be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. Monitor 906 can be a CRT, flat screen, etc.

A designer 904 can input commands into computer 902 using various input devices, such as a mouse, keyboard 922, track ball, touch screen, etc. If the computer system 900 comprises a mainframe, a designer 904 can access computer 902 using, for example, a terminal or terminal interface. Additionally, computer system 926 can be connected to a printer 908 and a server 910 using a network router 912, which can connect to the Internet 918 or a WAN.

Server 910 can, for example, be used to store additional software programs and data. In one embodiment, software implementing the systems and methods described herein can be stored on a storage medium in server 910. Thus, the software can be run from the storage medium in server 910. In another embodiment, software implementing the systems and methods described herein can be stored on a storage medium in computer 902. Thus, the software can be run from the storage medium in computer system 926. Therefore, in this embodiment, the software can be used whether or not computer 902 is connected to network router 912. Printer 908 can be connected directly to computer 902, in which case, computer system 926 can print whether or not it is connected to network router 912.

Figure 10:
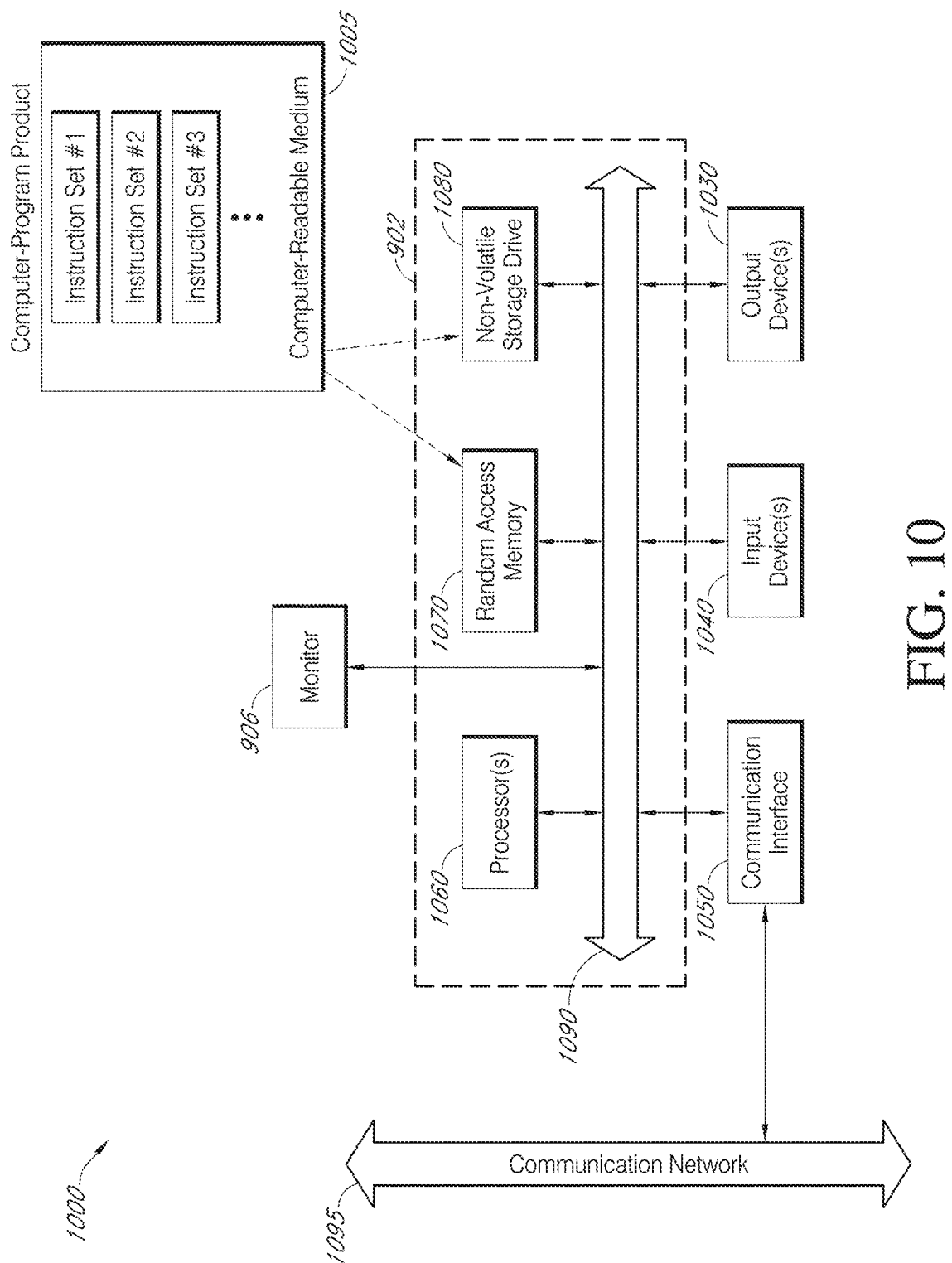
FIG. 10 depicts a block diagram of an embodiment of a special-purpose computer system.

With reference to FIG. 10, an embodiment of a special-purpose computer system 1000 is shown. Care management system 150 and/or any components thereof are examples of a special-purpose computer system 1000. Thus, for example, one or more special-purpose computer systems 1000 can be used to provide the function of care management system 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1000 to perform the above-described methods. Computer 902 can include one or more processors 1060 that communicate with a number of peripheral devices via a bus subsystem 1090. These peripheral devices can include user output device(s) 1030, user input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 can be stored in non-volatile storage drive 1090 or another computer-readable medium accessible to computer 902 and loaded into memory 1070. Each processor 1060 can comprise a microprocessor, such as a microprocessor from Intel® or Advanced Micro Devices, Inc®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

User input devices 1040 include all possible types of devices and mechanisms to input information to computer system 902. These can include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These can include a display (e.g., monitor 906), printers, non-visual displays such as audio output devices, etc.

Communications interface 1050 provides an interface to other communication networks and devices and can serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 can be coupled to a computer network, to a FireWire® bus, or the like. In other embodiments, communications interface 1050 can be physically integrated on the motherboard of computer 902, and/or can be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 can be configured to store the basic programming and data constructs that provide the functionality of various embodiments of the present invention, as described above.

Software instruction sets that provide the functionality of the present invention can be stored in RAM 1070 and non-volatile storage drive 1080. These instruction sets or code can be executed by processor(s) 1060. RAM 1070 and non-volatile storage drive 1080 can also provide a repository to store data and data structures used in accordance with the present invention. RAM 1070 and non-volatile storage drive 1080 can include a number of memories including a main random access memory (RAM) to store of instructions and data during program execution and a read-only memory (ROM) in which fixed instructions are stored. RAM 1070 and non-volatile storage drive 1080 can include a file storage subsystem providing persistent (non-volatile) storage of program and/or data files. RAM 1070 and non-volatile storage drive 1080 can also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem can utilize multiple busses or communication paths within computer 902.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium.

While the principles of the disclosure have been described above in connection with specific apparatuses and methods, it is to be clearly understood that this description is made only by way of example and not as limitation on the scope of the disclosure. Similarly, select examples are provided below, and it will be appreciated that the examples are illustration of select embodiments of the disclosures presented herein.

EXAMPLES

Examples below relate to potential exemplary care-related monitoring techniques. FIGS. 11-16 show interactive presentations, which include monitored care data, analysis of care data and options for reviewers to specify presentation characteristics and/or recommendations to implement.

Example 1

A set of care lines are defined to include: acute myocardial infarction response, hip replacement, knee replacement, spinal surgery, sepsis response, coronary artery bypass grafting (CABG), and stroke response. Further, a set of care results are identified to include an incidence of mortality, occurrence of complications, contraction of hospital-acquired conditions, readmission to an institution, cost of care, variance of cost of care, and/or length of admission. For each of the care lines, a set of check-point indicators are identified as well as a target for the indicator.

A dynamic presentation is generated. A first presentation component identifies each care line and shows a numeric care score for each care line. A reviewer selects the CABG care line by clicking on a representation of the care line. A graph shows a time-series for the CABG care line, where each point corresponds to a score for the care line corresponding to a particular month in the last year. Overlaid with the time-series curve is another curse for the previous year. The presentation component further includes an indication (e.g., an arrow and color) indicting that a current care score for the CABG care line is lower than a care score from a previous time point and for a corresponding time period within a previous year.

A second presentation component identifies each of the care results and shows a numeric value for each care result. A reviewer selects the hospital-acquired condition (HAC) result. In response, a time-series graph is shown. A first curve shows a median value at each month for the HAC result, a second curve shows a maximum value, a third curve shows a minimum and a fourth shows a median value from a previous year. The presentation further includes an indication (e.g., an arrow and color) indicting that a current care-result value for the HAC result is lower than a care score from a previous time point and is the same as that for a corresponding time period within a previous year.

A third presentation component identifies each of a set of check-point indicators (a value relating to each of when an antibiotic was discontinued, a regularity of antibiotic administration, appropriate selection of an antibiotic, whether and/or an extent to which atrial fibrillation occurred, whether a ventilator was used, a consistency and/or an extent to which blood glucose is managed, whether and which blood products were used, and whether a Foley catheter was timely and appropriately removed). Each of the indicators correspond to a selected care line and/or care result. A reviewer selects the ventilator indicator, and a graph and comparative indicators are shown (e.g., with similar line graphs and comparative indications).

Figure 11:
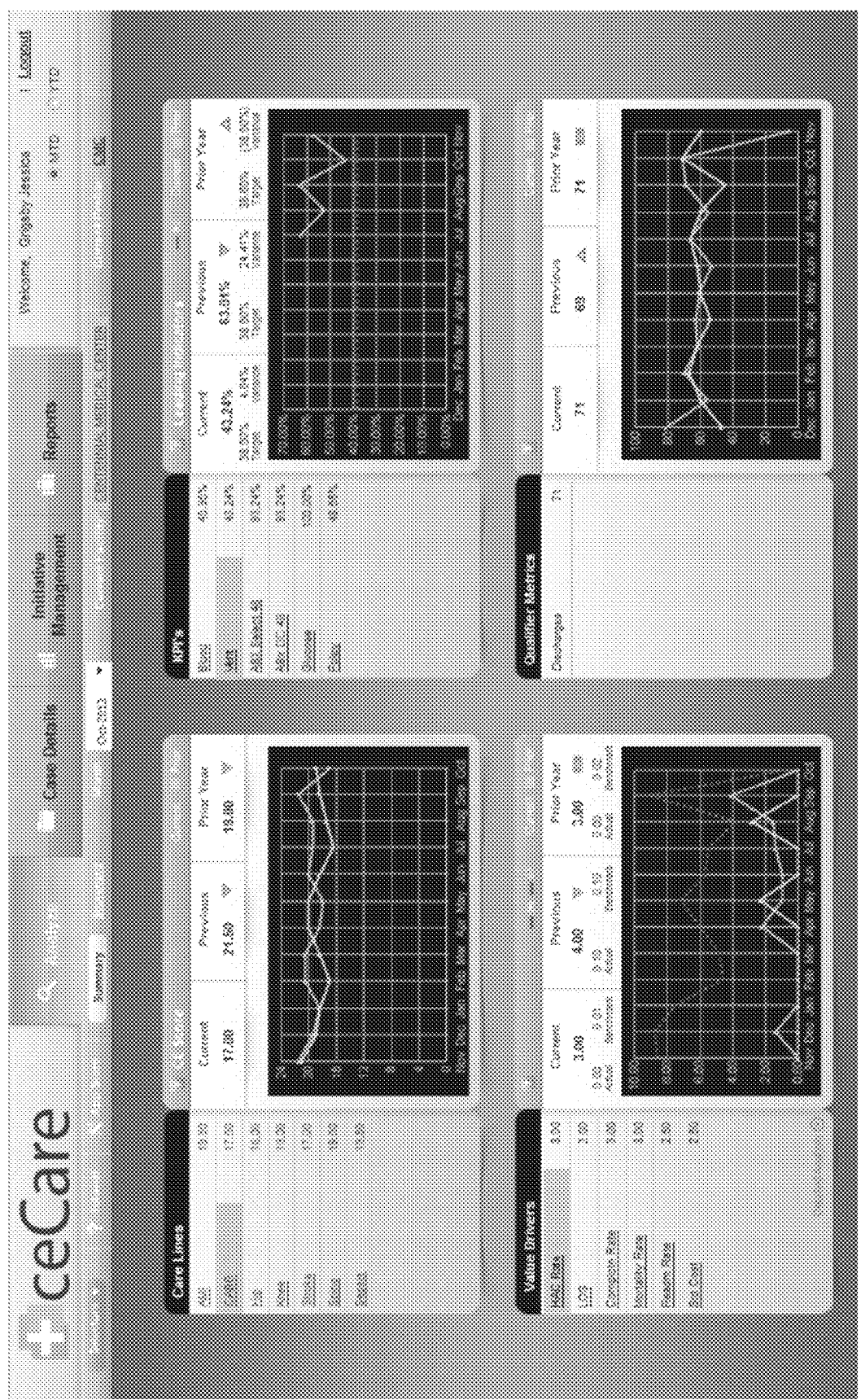

The presentation components can be presented simultaneously or sequentially. FIG. 11 shows an example of a presentation with the exemplary presentation components for an exemplary hospital.

Example 2

A reviewer changes a view to a comparative view. A first presentation component identifies each of a set of care lines. For each care line, a line graph is presented to show how a care score for the care line changed over time. Further, a current value for the care score is shown, along with a care score from a previous month, a care score from a previous year (in a corresponding month) and a current patient count associated with the line. A reviewer has an option of viewing similar data for each check-point indicator associated with a single care line.

A reviewer selects the CABG care line from the first component. A second presentation component includes a bar graph that compares the care score for the line for the relevant entity to a corresponding care score based on different cases. For example, the care score for a hospital can be compared to that from a group of hospitals, a division of hospitals and all hospitals with a particular owner.

A third presentation component identifies each of a set of care results for a selected line and a value for each result. A reviewer selects one result, and a line graph shows how the result has progressed throughout a past year. A reviewer has an option to instead view how a value for the care result compares to corresponding values from other entities.

A fourth presentation component includes a bar graph that shows values for the care result for each of a set of diagnosis-related groups. A superimposed line graph further identifies a patient count in each group. A reviewer has an option of selecting an option to change the break-down to, rather than being based on the diagnosis-related groups, be based on another variable, such as physician, procedure and/or service line.

Figure 12:
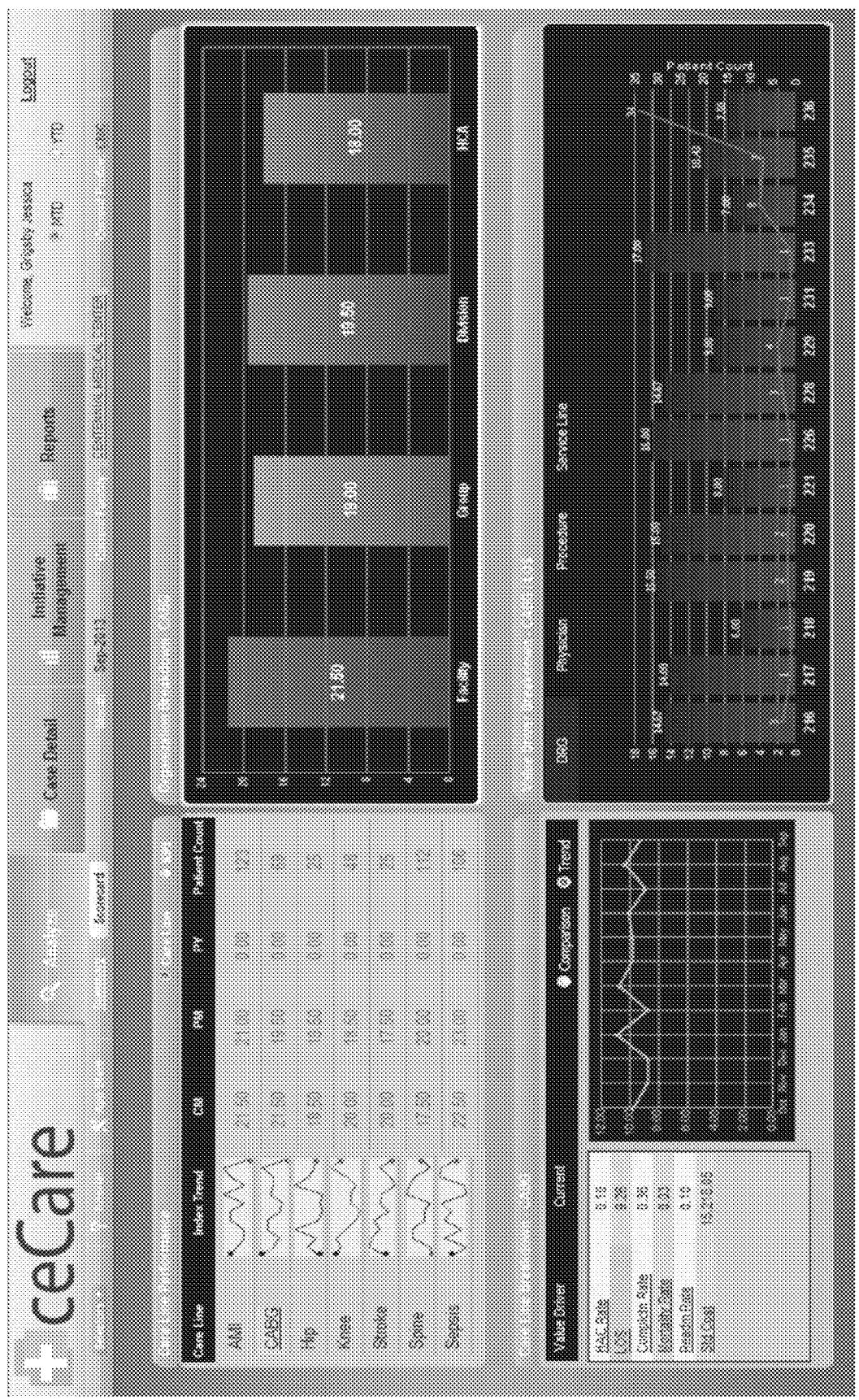

The presentation components can be presented simultaneously or sequentially. FIG. 12 shows an example of a presentation with the exemplary presentation components for an exemplary hospital.

Example 3

Figure 13:
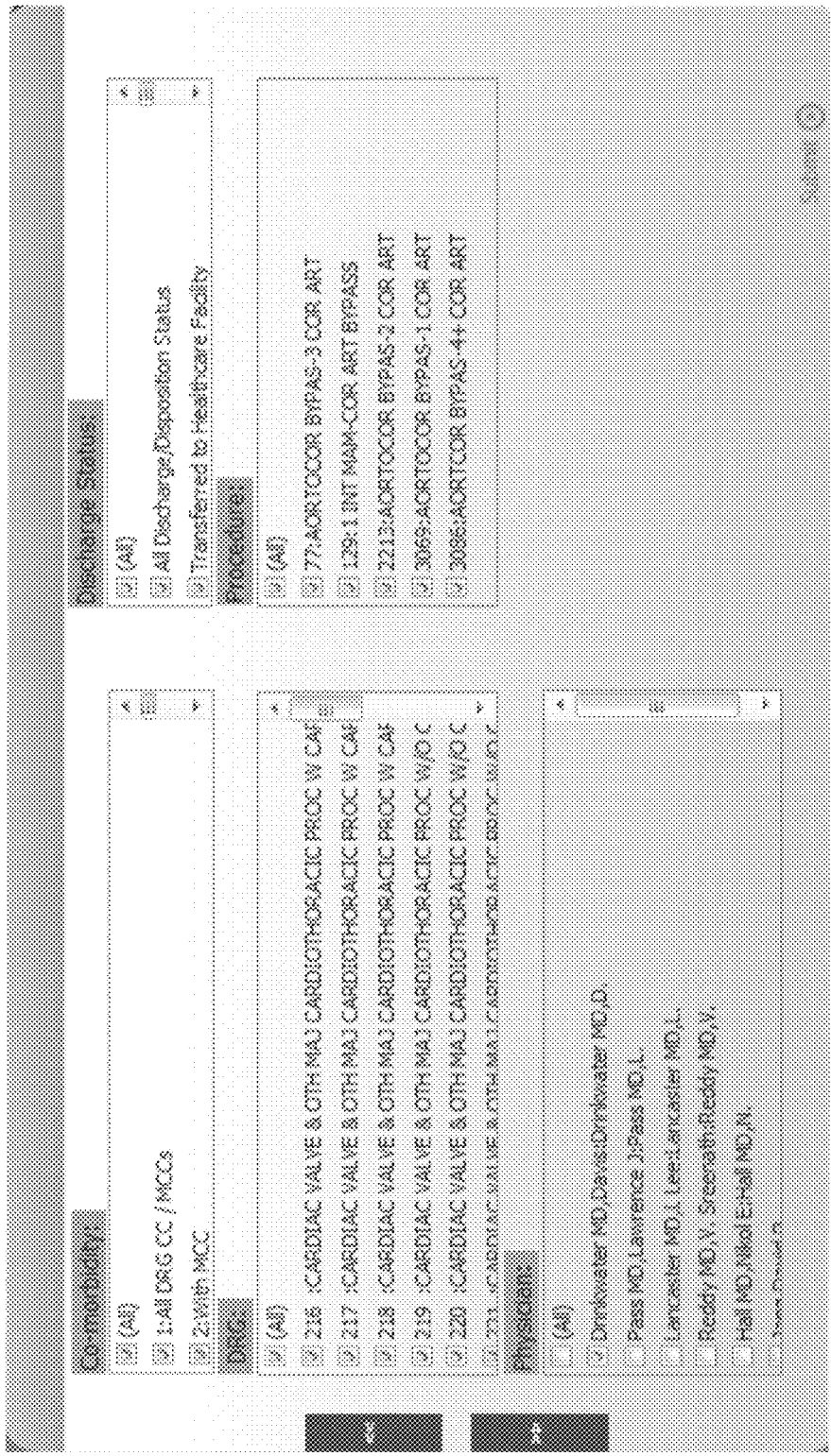
Figure 14:
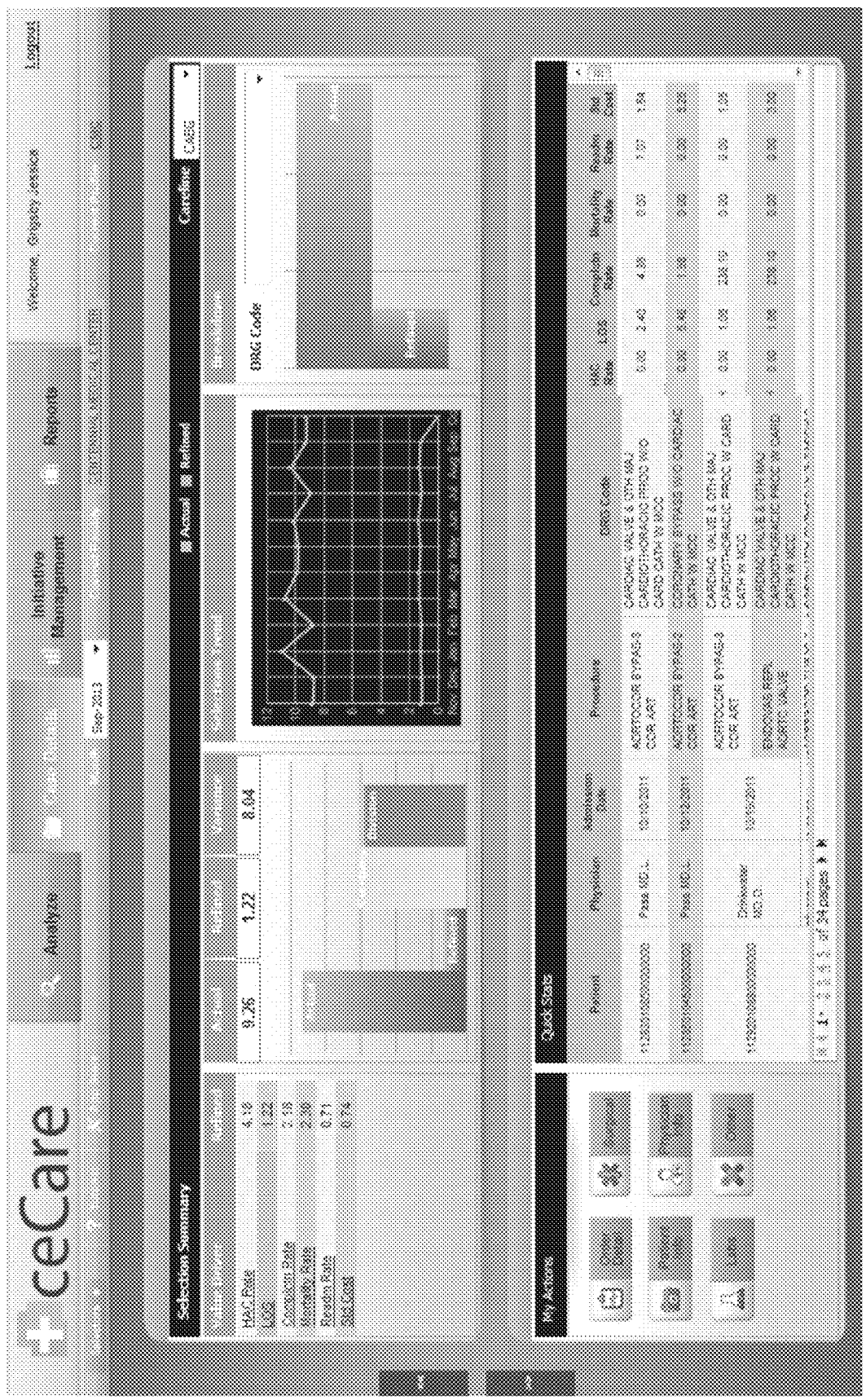
Figure 16:
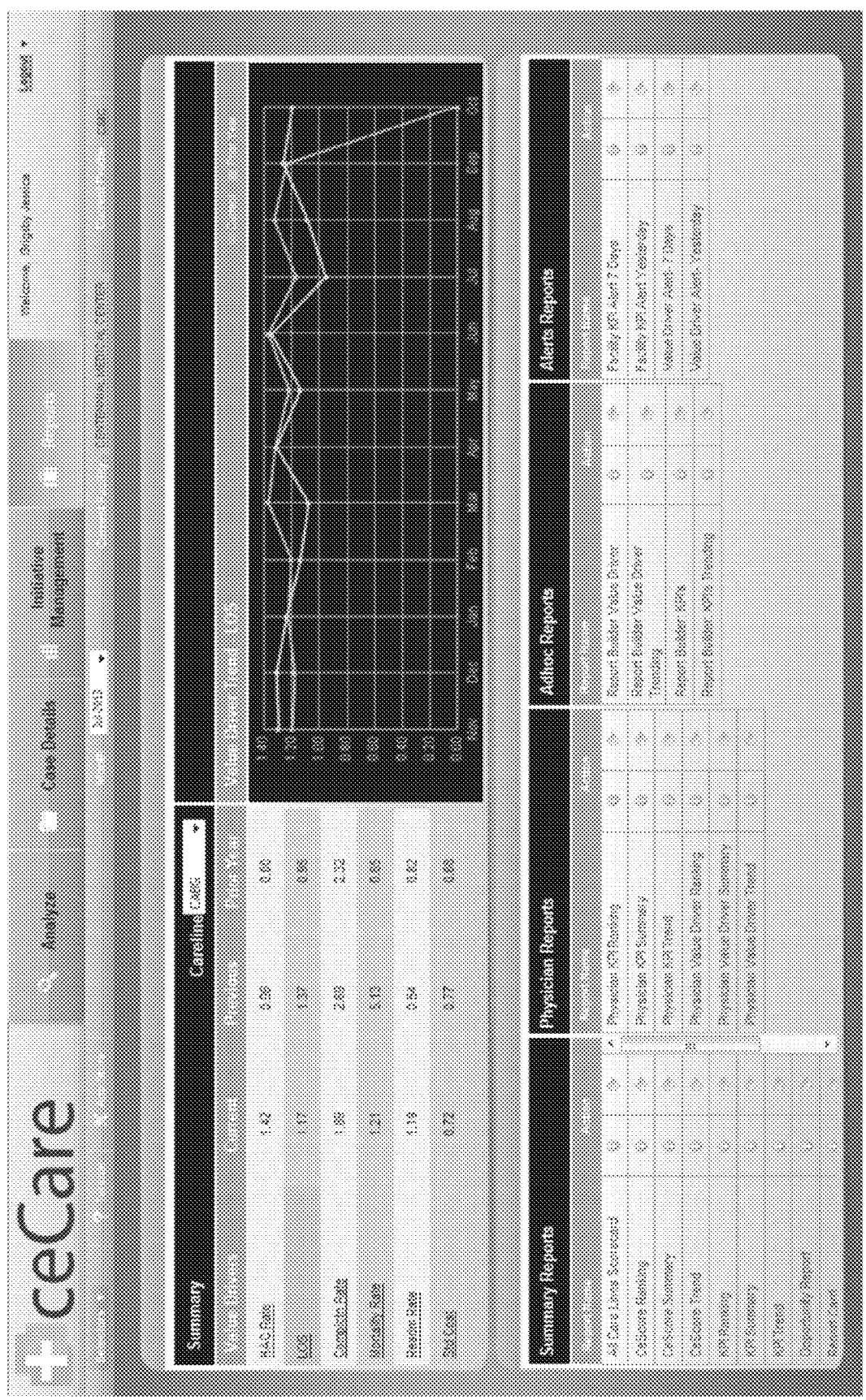

A reviewer can select case parameters of interest using a selection interface, such as one shown in FIG. 13 of interest using a selection interface, such as one shown in FIG. 13. Selections can correspond to selecting or deselecting particular involved entities, procedure types, case statuses, time periods, patient characteristics, etc. Cases corresponding to the selection(s) are identified, and statistics are generated based on the cases. One or more first presentation components show at least some of the generated statistics. A second presentation component shows data pertaining to each of the identified cases. A reviewer can identify one or more cases to exclude for generation of refined statistics. Statistics can then be generated based on remaining cases, and the first presentation component can be updated to further reflect refined statistics. FIG. 14 shows an example of a presentation with the exemplary presentation components for an exemplary hospital.

Example 4

A reviewer can select one or more variables for improvement. In the example shown in FIG. 15, a reviewer selected the CABG care line, a ventilation check-point indicator and a length-of-stay care result. A presentation can auto-populate with various recommendation plans to improve one, more or all of the selected variables. A reviewer can select a template, select an entity at which the recommendation is to be implemented and a month at which it is to begin. The reviewer can set a goal for one or more of the variables and track the entity's progress from a starting point and towards the goals.

Example 5

A presentation (e.g., such as one shown in FIG. 16) can allow a reviewer to view and/or manage various reports pertaining to care assessment. The presentation can list a variety of report names. Clicking on a representation of a report name can cause a presentation to be presented that shows one or more current values associated with the reports, along with historical and/or comparative data. A report can further include an alert history, which can identify data pertaining to various alerts issued within a time period. For example, a report can include data pertaining to all alerts generated in responsive to a satisfaction criterion not being satisfied when evaluated using a value for a care result or check-point indicator. A reviewer can further enter input indicating when a report is to be updated, when a report is to be transmitted or presented, to whom a report is to be transmitted or presented and/or what information is to be presented in a (new or existing) report.

Figure 17:
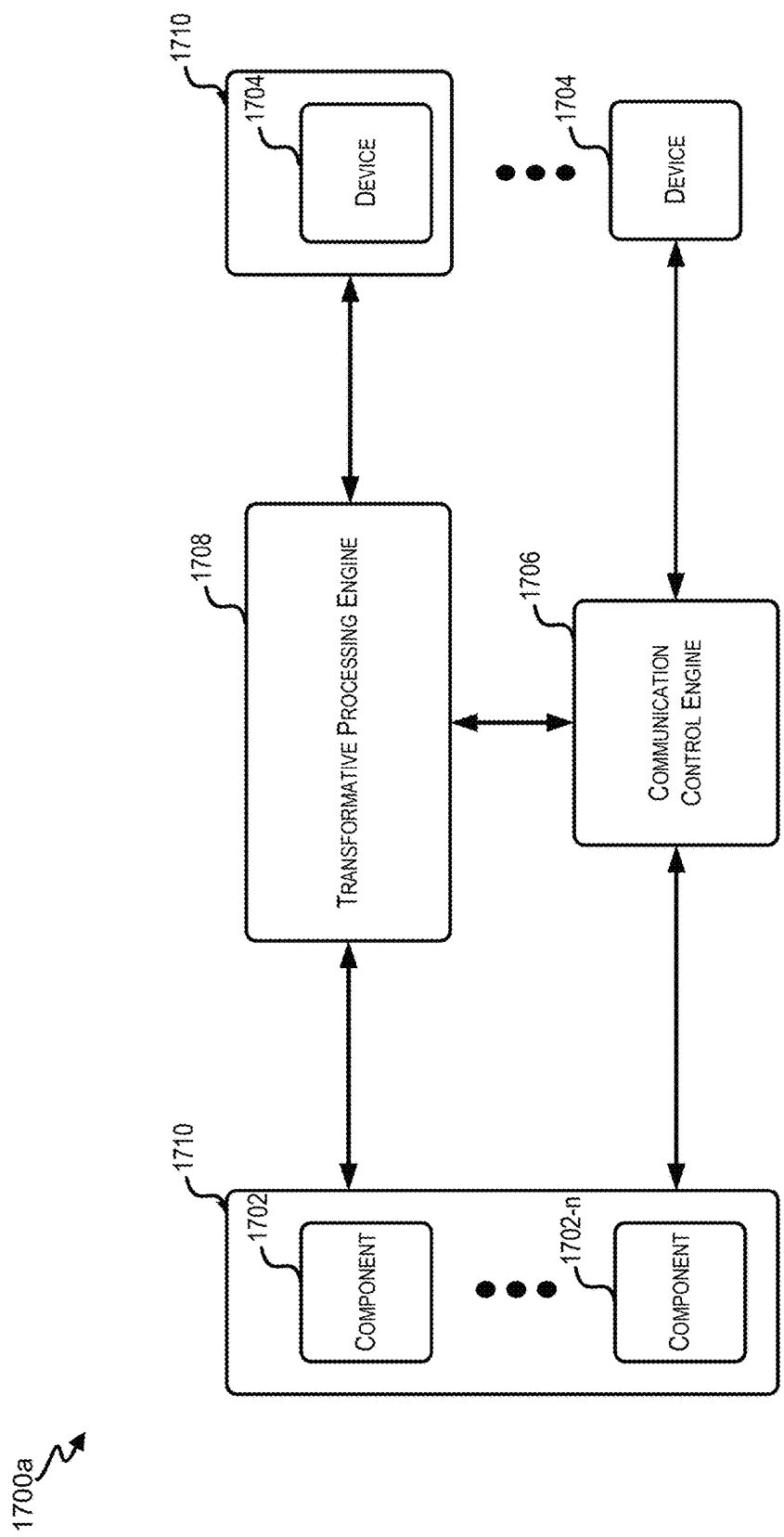
FIG. 17 illustrates a block diagram of an interaction system, in accordance with certain embodiments of the present disclosure.

Various embodiments will now be discussed in greater detail with reference to the accompanying figures, beginning with FIG. 17. Referring first to FIG. 17, a block diagram of an embodiment of an interaction system 1700a is illustrated. Generally, in interaction system 1700a, data can be generated at one or more system components 1702 and/or devices 1704. Communication control engine 1706 can control the flow of communications within interaction system. Transformative processing engine 1708 can receive, intercept, track, integrate, process and/or store such data.

The description herein with respect to FIG. 17, along with the description with respect to the remaining figures, disclose various aspects of various embodiments directed to facilitating controllable parameter modification of system components based on monitoring indicators of a caliber of process performance. This application hereby incorporates by reference the entire disclosures of the following applications, for all purposes, as if fully set forth herein: U.S. Non-Provisional patent application Ser. No. 14/304,604, filed Jun. 13, 2014; and U.S. Provisional Application No. 61/835,139, filed on Jun. 14, 2013. Accordingly, a data storage may include data sets for a plurality of cases. Each data set for each case of the plurality of cases may include identification data for the case, a type of a process performance executed, a check-point indicator, and a temporal identifier. The check-point indicator may indicate an attribute of the process performance executed or an attribute pertaining to a checkpoint during the process performance. An aggregator may identify a set of cases from amongst the plurality of cases, the set of cases having similar temporal identifiers and a same type of process performance. A population quantifier may generate a population check-point statistic based on the check-point indicators identified in the set of cases. A first engine may a first criterion pertaining to the check-point indicator and corresponding to a target value or range of values. A first result that indicates whether the first criterion is met may be determined based on the population check-point statistic. A second criterion pertaining to the check-point indicator may be accessed, the first criterion being different from the second criterion. A second result that indicates whether the second criterion is met may be determined based on a check-point indicator identified in a case. A second engine may facilitate transmission of the first result and the second result. When the first criterion or the second criterion is not met, one or more transmissions may be sent, the one or more transmission comprising an alert to alert a remote device and a transmission to facilitate causing at least one system component to automatically make a change to a controllable parameter to influence a corresponding check-point. Thus, systems, methods, and machine-readable media are provided to facilitate controllable parameter modification of system components based on monitoring indicators of a caliber of process performance.

Referring further to FIG. 17, data flowing in interaction system 1700a can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 1702 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected input received at a user interface of component 1702 and/or data in a corresponding communication received from a user device.

As another example, a device 1704 can be configured to detect input received at a user interface of the device. The input can include, for example, an identifier of an object or entity, an instruction, a characterization of an object or entity, an identification of an analysis to be performed, a specification of an aggregation or data processing to be performed, and/or an identification of a destination for a data-analysis report. User device 1704 can further be configured to detect input requesting particular data, to generate a request communication (e.g., to be sent to transformative processing engine), to receive the requested data and/or to present the received data.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 1702 and one or more devices 1704 are illustrated as communicating via transformative processing engine 1708 and/or control engine 1706, this specification is not so limited. For example, each of one or more components 1702 may communicate with each of one or more devices 1704 directly via other or the same communication networks.

A component 1702 can be configured to detect, process and/or receive data, such as environmental data, geophysical data, biometric data, chemical data (e.g., chemical composition or concentration analysis data), and/or network data. The data can be based on data detected, for example, via a sensor, received signal or input. A user device 1704 can include a device configured to receive data from a user and/or present data to a user. It will be appreciated that, in some instances, a component 1702 is also a user device 1704 and vice-versa. For example, a single device can be configured to detect sensor measurements, receive input and present output.

A component 1702 can be configured to generate a communication that is in one or more formats, some of which can be proprietary. For example, an imaging machine (e.g., one of one or more components 1702) manufactured by company A, located within a first premises (e.g., premises 1710), and belonging to a first client, may save and transfer data in a first format. An imaging machine (e.g., one of one or more components 1702) manufactured by company B, located within the first premises (e.g., premises 1710), and belonging to the first client, may save and transfer data in a second format. In some examples, data from certain components is transformed, translated, or otherwise adjusted to be recognizable by transformative processing engine 1708. Thus, continuing with the example from above, when the imaging machines manufactured by companies A and B are located within the first premises belonging to the first client, they may nevertheless save and transfer data in different formats. In some examples, one or more components 1702 communicate using a defined format.

In some examples, each of one or more components 1702 are each associated with one or more clients within a same or different interaction systems. For example, certain ones of one or more components 1702 may be associated with a first client, while other ones of one or more components 1702 may be associated with a second client. Additionally, each of one or more components 1702 may be associated with a premises 1710 (e.g., client premises). Each premises 1710 may correspond to a single location and/or processing focus. Exemplary types of premises include server farm premises, web-server premises, data-storage premises, technical-support premises, telecommunication premises, care premises and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 1702 to transformative processing engine 1708 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 1708. Each transmission can include, e.g., a single record pertaining to a single entity, object, procedure, or analysis or multiple records pertaining to multiple entities, objects, procedures, or analyses.

In some examples, at least some of one or more devices 1704 are associated with premises 1710. In some examples, at least some of one or more devices 1704 need not be associated with premises 1710 or any other premises. Similar to one or more components 1702, one or more devices 1704 may be capable of receiving, generating, processing and/or transmitting data. Examples of one or more devices 1704 include, for example, a computer, a mobile device, a smart phone, a laptop, an electronic badge, a set-top box, a thin client device, a tablet, a pager, and other similar user devices). One or more devices 1704 may be configured to run one or more applications developed for interacting with data collected by transformative processing engine 1708. For example, those user devices of one or more devices 1704 that are not associated with premises 1710 may be configured to run one or more third-party applications that may rely in part on the data gathered by transformative processing engine 1708.

Each of one or more components 1702 and one or more devices 1704 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 1702 and one or more devices 1704 may communicate with transformative processing engine 1708 and control engine 1706 via different information formats, different proprietary protocols, different encryption techniques, different languages, different machine languages, and the like. As will be discussed with reference to FIG. 18, transformative processing engine 1708 is configured to receive these many different communications from one or more components 1702, and in some examples from one or more devices 1704, in their native formats and transform them into any of one or more formats. The received and/or transformed communications can be transmitted to one or more other devices (e.g., control engine 1706, an entity device and/or a user device) and/or locally or remotely stored. In some examples, transformative processing engine 1708 receives data in a particular format (e.g., the HL7 format) or conforming to any other suitable format and/or is configured to transform received data to conform with the particular format.

One or more components 1702 of premises 1710 can include and/or has access to a local or remote memory for storing generated data. In some examples, the data is stored by one or more servers local to premises 1710. Such storage may enable premises 1710 to retain locally data pertaining to its premises prior to (or in conjunction with) the data being shared with transformative processing engine 1708 and/or control engine 1706. In some examples, the one or more servers of premises 1710 share data directly with a record service (not shown), and the record service makes the data available to transformative processing engine 1708 and/or control engine 1706. Once an electronic record is updated at premises 1710, an indication of the update may be provide to the record service. The record service may then update a corresponding record associated with the electronic record.

The record service can be granted access to the data generated and/or transmitted by one or more components 1702. In some examples, the record service includes a server or a plurality of servers arranged in a cluster or the like. These server(s) of the record service can process and/or store data generated by one or more components 1702. For example, one or more records can be generated for each entity (e.g., each record corresponding to a different entity or being shared across entities). Upon receiving a communication with data from an component (or premises), the record service can identify a corresponding record and update the record to include the data (or processed version thereof). In some examples, the record service provides data to transformative processing engine 1708.

Premises 1710 can include one at which a resource is located and/or service is provided. Irrespective of the type of premises, premises 1710 may update data, maintain data, and communicate data to transformative processing engine 1708. At least some of the data may be stored local to premises 1710.

A user interacting with a user device 1704 can include, for example, a client customer, client agent and/or a third party. A user may interact with user device 1704 and/or component 1702 so as to, for example, facilitate or initiate data collection (e.g., by a component 1702), provide data, initiate transmission of a data request, access data and/or initiate transmission of a data-processing or data-storage instruction. In some instances, one or more devices 1704 may operate according to a private and/or proprietary network or protocols. In other examples, one or more devices 1704 may operate on public networks. In any case, however, transformative processing engine 1708 can have access to the one or more components and can communicate with them via a public, private and/or proprietary network or protocols. The use of one or more private and/or proprietary protocols can promote secure transfer of data.

Figure 18:
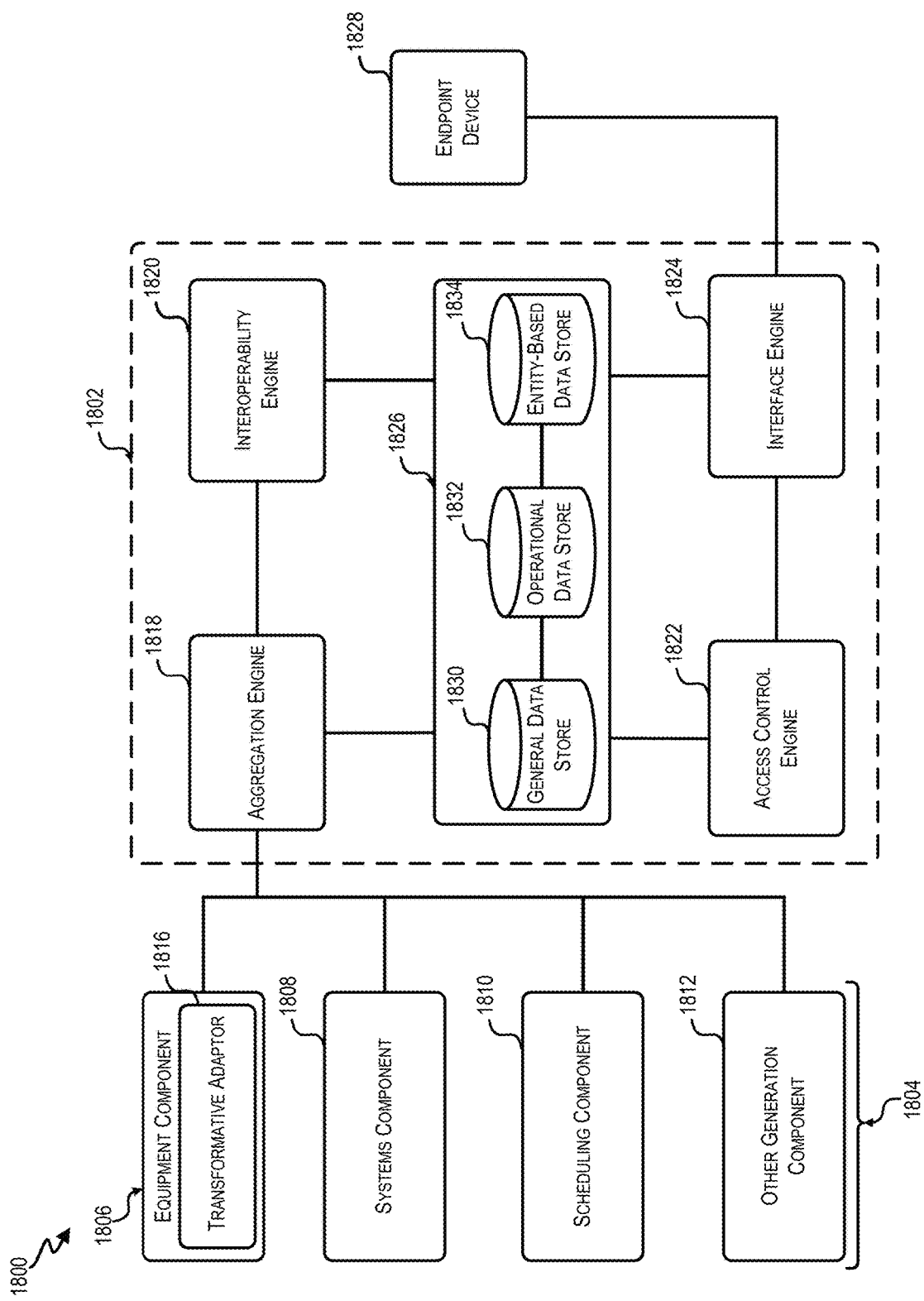
FIG. 18 illustrates a block diagram of an interaction system, in accordance with certain embodiments of the present disclosure.

Referring next to FIG. 18, a block diagram of an example of an interaction system 1800 is shown. Interaction system 1800 includes a transformative integration engine 1802. Transformative integration engine 1802 is an example of transformative processing engine 108 discussed with reference to FIG. 17. Interaction system 1800 also includes one or more generation components 1804. In particular, one or more generation components 1804 includes an equipment component 1806, a lab systems component 1808, a scheduling component 1810 and other generation component 1812. One or more generation components 1804 are examples of one or more components 1702 discussed with reference to FIG. 17.

Generally, one or more generation components 1804 includes any suitable device or system capable of generating data in the context of an interaction system. For example, the other generation component 1812 may include a sensor on a door, and equipment component 1806 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

Generally, one or more generation components 1804 includes any suitable device or system capable of generating data in the context of an interaction system. For example, the other generation component 1812 may include a sensor on a door, and equipment component 1806 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 1804 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative integration engine 1802 in accordance with techniques described herein may achieve this design—making large amounts of data, in many different originating formats available to various types of users, via one or more interfaces.

While one or more generation components 1804 are illustrated adjacent to each other, it is understood that each may be located within one premises or that the components may be spread out among many premises. In addition, in some examples, one or more generation components 1804 belong to different clients.

Turning now to equipment component 1806, this component includes any machine, contrivance, implant, or other similar related article, that is intended to aid in reaching a particular objective. In some instances, equipment component 1806 includes one or more sensors to detect environmental or other stimuli. Equipment component 1806 can include, for example, equipment to monitor a stimulus, detect stimulus changes, detect stimulus-indicative values, and so on. Exemplary equipment components 1806 include an imaging device, a device that detects and characterizes electrical signals, a device that detects pressure, and/or a device that detects concentration of one or more particular elements, compounds and/or gases.

As illustrated, equipment component 1806 includes transformative adaptor 1816. In some examples, transformative adaptor 1816 is a device that transforms, translates, converts, or otherwise adjusts output data from equipment component 1806. For example, an equipment component 1806 can be a scanner that outputs its results in format A, but the majority of other scanners in the interaction system output their results in format B. Transformative adaptor 1816 may be implemented to convert or otherwise adjust the results in format A to conform closer to format B. For example, the conversion from format A to format B may be performed using a conversion rule, which may be user-define or learned. Transformative integration engine 1802 may perform similar processes as it relates to all data generated within interaction system 1800. In this manner, transformative adaptor 1816 can perform an initial step in the process of transformation, translation, conversion, or adjustment of the output of equipment component 1806. In some examples, transformative adaptor 1816 is implemented in hardware, software, or any suitable combination of both. In some examples, other transformative adaptors (not shown) may be implemented within others of one or more generation components 1804. In some examples, equipment component 1806 may not include transformative adaptor 1816.

Lab systems component 1808 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 1802.

Scheduling component 1810 includes any suitable computing devices used for operations-related purposes with respect to interaction system 1800. For example, scheduling component 1810 can be configured to schedule a resource for allocation for a particular entity during a particular time slot. Scheduling component 1810 can monitor a schedule for the resource and can identify one or more available time slots that may be secured by a particular entity. Upon receiving a scheduling indication, scheduling component 1810 may update a schedule of a resource to reflect that a particular time slot is to be allocated for service of a particular entity.

Each of one or more generation components 1804 and the user device 1828 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 1802 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 1802. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 1802 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative integration engine 1802 includes an aggregation engine 1818, an interoperability engine 1820, an access control engine 1822, an interface engine 1824, and a data store 1826. Generally aggregation engine 1818 is configured to collect data from multiple communications. The data may be from one or multiple generation components 1804 and/or may be of a same or different formats. Aggregation engine 1818 may be configured to perform one or more operations on the collected data. For example, aggregation engine 1818 may tag data, log data, perform protocol conversion, and may support one-to-many communications. The collection may be asynchronous. In some examples, the data has been saved locally in connection with one or more generation components 1804 in many different formats having many different data structures.

Aggregation engine 1818 can identify data to be aggregated based on, for example, intra-communication activity, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 1818 can be configured to provide data from one or more communications to interoperability engine 1820. Interoperability engine 1820 can be configured to perform one or more operations on the received data and store it in data store 1826. For example, interoperability engine 1820 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 1820 may also include a high availability cache, an alerts engine and a rules engine. In some examples, interoperability engine 1820 operates synchronously.

From interoperability engine 1820, data flows to data store 1826. Data store 1826 (and any other data store discussed herein) may include one or more data stores, which may be distributed throughout two or more different locations (e.g., present on different devices, which can include devices of different entities and/or a cloud server). In some examples, data store 1826 includes a general data store 1830, an operational data store 1832, and an entity-based data store 1834. Within each of the data stores 1830, 1832, and 1834 is stored data. Depending on the structure of the particular data store, certain data stores may include rules for reading and writing. The data stores 1830, 1832, and 1834 may include records, tables, arrays, and the like, which may be relational or non-relational. Depending on the data store, records for individual entities, operational and analytics information, output data from one or more generation components 1804, and the like may be retained. The data within the data stores 1830, 1832, and 1834 include elements or tags such that a particular data (e.g., for a single entity, protocol, etc.) can be retrieved.

Access control engine 1822 is configured to control access to features of transformative integration engine 1802, including access to the data retained in data store 1826. For example, access control engine 1822 may verify that a user device such as user device 1828 is authorized to access data store 1826. To verify the user device 1828, access control engine 1822 may require that a user of the user device 1828 input a username and password, have a profile associated with the interaction system, have paid a subscription fee associated with access to data store 1826, and the like. Access control engine 1822 may also verify that the user device 1828 has an IP address or geographical location that corresponds to an authorized list, that the user device 1828 includes a plug-in for properly accessing data store 1826, that the user device 1828 is running certain applications required to access data store 1826, and the like.

Interface engine 1824 is configured to retrieve the data from data store 1826 and provide one or more interfaces for interacting with elements of transformative integration engine 1802. For example, interface engine 1824 includes an interface by which an application running on user device 1828 can access portions of data within data store 1826.

Turning next to FIG. 19, an architecture stack 1900 is shown. In some examples, techniques relating to control of data are implemented in accordance with architecture stack 1900. And while architecture stack 1900 is illustrated as having a particular structure, it is understood that other structures, including those with more or less layers than illustrated, is within the scope of this specification. In some examples, architecture stack 1900 is implemented across an interaction system having a plurality of systems belonging to the same client or spread across different clients. Thus, architecture stack 1900 can be used to integrate different systems of different entities and the like and to provide a fluid sharing of information among elements within the interaction system and without the interaction system. In some instances, a multi-layer part of architecture stack 1900 is implemented at a single system or device within an interaction system.

The different layers of architecture stack 1900 will be described generally with reference to FIG. 19 and in detail with reference to subsequent figures. Architecture stack 1900 includes a receiving layer 1902 as the bottom-most layer. Receiving layer 1902 includes receiving data from elements that share data with other elements within an aggregation layer 1904. For example, as detailed herein, receiving layer 1902 can include receiving data from generation components that generate data. As such, receiving layer 1902 is where data that has been created is received. In some examples, the data within receiving layer 1902 may be in its raw formats. The output may then be transmitted to aggregation layer 1904. In some examples, components of receiving layer 1902 may have complimentary layers to facilitate data transfer. For example, the components may include a data generation and/or a data transmission layer for providing data to receiving layer 1902.

Elements of aggregation layer 1904 aggregate the data generated by the elements of receiving layer 1902. For example, the elements of aggregation layer 1904 may include aggregation engines that collect data from generation components located within receiving layer 1902. Such aggregation may be performed periodically, in response to a user request, according to a schedule, or in any other suitable manner. In some examples, data of aggregation layer 1904 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 1900 includes an active unified data layer 1908. Elements of active unified data layer 1908 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 1908 may receive information collected or generated within aggregation layer 1904 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 1908.

Architecture stack 1900 also includes an access control layer 1910, which can include an audit/compliance layer 1912 and/or an agency layer 1914. Access control layer 1910 includes elements to control access to the data. For example, access control layer 1910 may include elements to verify user login credentials, IP addresses associated with a user device, and the like prior to granting the user access to data stored within active unified data layer 1908.

Audit/compliance layer 1912 includes elements to audit other elements of architecture stack 1900 and ensure compliance with operating procedures. For example, this may include tracking and monitoring the other elements of access control layer 1910.

Agency layer 1914 includes an access location (e.g., a virtual private network, a data feed, or the like) for elements of agencies that are interested in the operations of the interaction system in which architecture stack 1900 is implemented. For example, agency layer 1914 may allow a governmental entity access to some elements within architecture stack 1900. This may be achieved by providing the governmental entity a direct conduit (perhaps by a virtual private network) to the elements of access control layer 1910 and the data within active unified data layer 1908. Audit/compliance layer 1912 and agency layer 1914 are sub-layers of access control layer 1910.

Architecture stack 1900 also includes interface layer 1916. Interface layer 1916 provides interfaces for users to interact with the other elements of architecture stack 1900. For example, clients, entities, administrators, and others belonging to the interaction system may utilize one or more user devices (interacting within application/device layer 1920) to access the data stored within active unified data layer 1908. In some examples, the users may be unrelated to the interaction system and may use applications (not shown) to access the elements within architecture stack 1900 via one or more interfaces (e.g., to access data stored within active unified data layer 1908). Such applications may have been developed by the interaction system or by third-parties Finally, architecture stack 1900 includes application/device layer 1920. Application/device layer 1920 includes user devices and applications for interacting with the other elements of architecture stack 1900 via the elements of interface layer 1916. For example, the applications may be web-based applications, entity portals, mobile applications, widgets, and the like for accessing the data. These applications may run on one or more user devices. The user devices may be any suitable user device as detailed herein.

Figure 20:
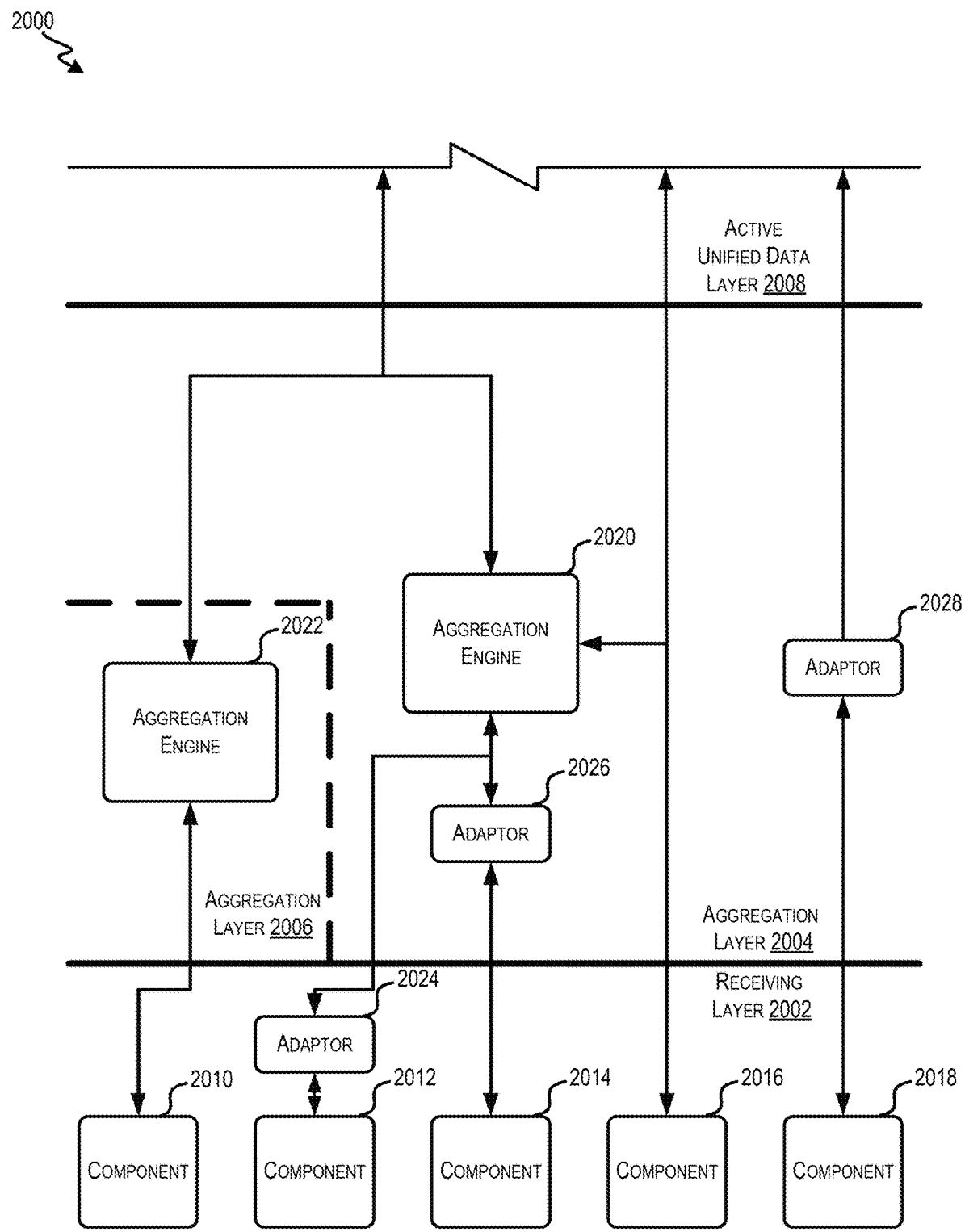
FIG. 20 illustrates a block diagram of a portion of the architecture stack, in accordance with certain embodiments of the present disclosure.

Turning next to FIG. 20, a diagram 2000 is shown that depicts a portion of architecture stack 1900 according to an embodiment of the invention. In particular, the diagram 2000 includes receiving layer 1902, aggregation layer 1904, aggregation layer 1906, and a portion of active unified data layer 1908. Receiving layer 1902 receives data from one or more components 2010-2018. Components 2010-2018 are examples of one or more generation components 204. Components 2010-2018 may be spread across multiple premises. In some examples, components 2010-2018 may include complimentary layers to facilitate data transmission. For example, components 2010-2018 may include a transmission layer, generation layer, and/or a receiving layer to communicate data at receiving layer 1902 and, in some examples, receive data from receiving layer 1902.

In some instances, two or more of components 2010-2018 generate data according to different formats. The data can then be transformed, translated, or otherwise adjusted before an aggregation engine 2020 (e.g., aggregation engine 218) or an aggregation engine 2022 (e.g., aggregation engine 1818) collects the data. In some examples, the adjustment takes place within receiving layer 1902. Thus, an adaptor 2024 is associated with component 2012 located in receiving layer 1902. Adaptor 2024 is an example of transformative adaptor 216. Adaptor 2024 is implemented, as appropriate, in hardware, software, or any suitable combination of both. For example, transformative adaptor 216 may be a bolt-on adaptor that adjusts data as such data leaves component 2012.

Other adaptors, such as adaptor 2026 and adaptor 2028, are implemented within aggregation layer 1904. These adaptors can function in a similar manner as adaptor 2024. In some examples, the data provided by component 2014 is transmitted through adaptor 2026 prior to being directed to aggregation engine 2020. The data provided by component 2016 is transmitted through aggregation layer 1904 and/or enters aggregation engine 2020 without having first traveled through an adaptor. The data provided by component 2018 is transmitted through aggregation layer 1904 and through adaptor 2028. In some examples, component 2018 provides for streaming of data. The data provided by component 2010 is transmitted directly to aggregation engine 2022.

Aggregation engine 2020 and aggregation engine 2022 function in a similar manner. In some examples, aggregation engine 2022 is operated by a different entity than the entity that operates aggregation engine 2020. This may be because the data collected by aggregation engine 2022 differs in some way from the data collected by aggregation engine 2020. In any event, aggregation engine 2020 is configured to perform integration of data, including generic integration. For example, aggregation engine 2020 performs one or more operations on data including tagging, logging, and protocol conversion. Aggregation engine 2020 also supports one-to-many communications of data. In some examples, data flows between aggregation engine 2020, the aggregation engine 2022, and some of components 2010-2018 and elements of active unified data layer 1908.

Figure 21:
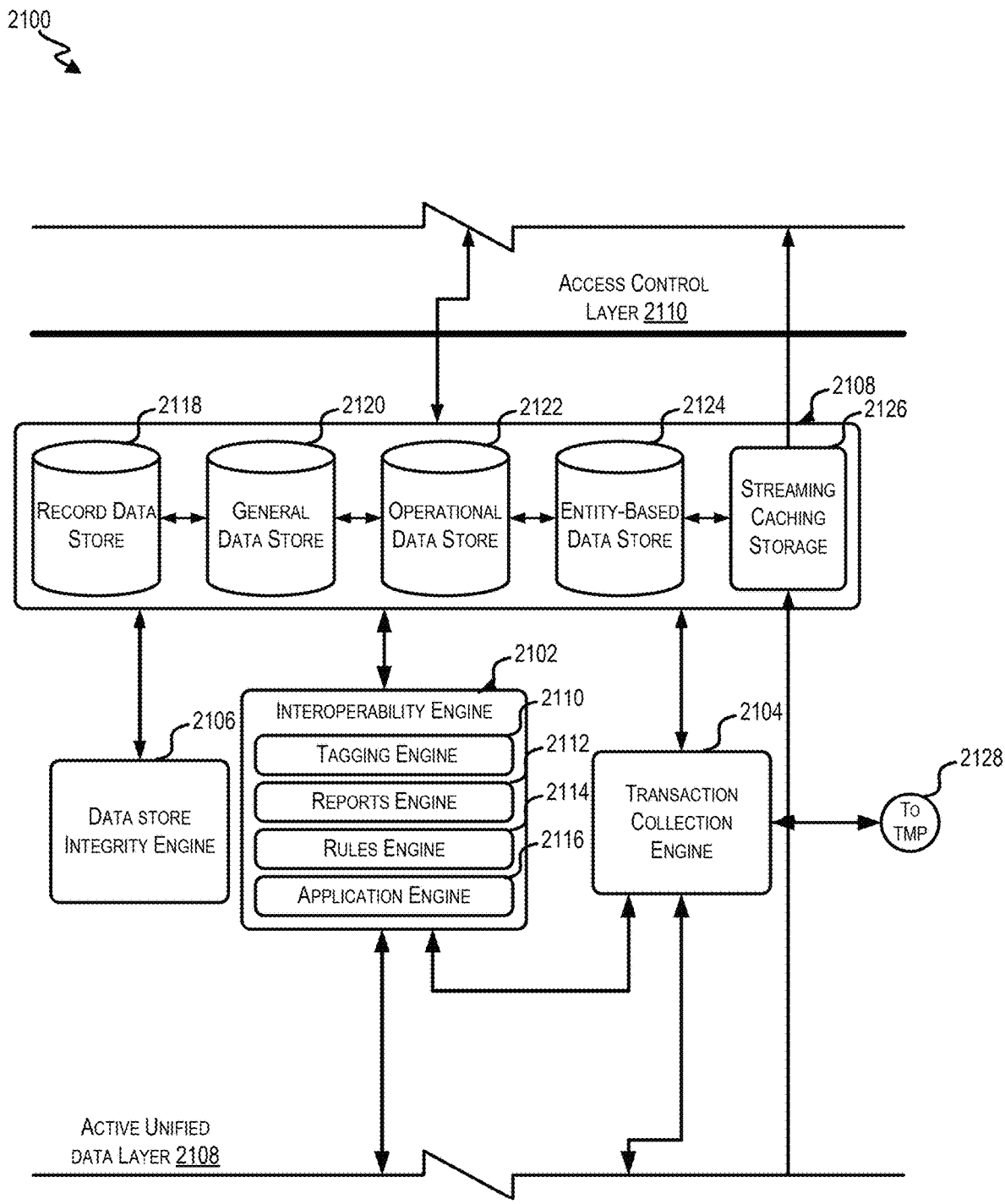
FIG. 21 illustrates a block diagram of a portion of the architecture stack, in accordance with certain embodiments of the present disclosure.

Referring next to FIG. 21, a diagram 2100 is shown that depicts a portion of architecture stack 1900 according to an embodiment of the invention. In particular, diagram 2100 includes active unified data layer 1908 and a portion of access control layer 1910. Active unified data layer 1908, as illustrated in diagram 2100, includes an interoperability engine 2102 (e.g., interoperability engine 220), a interaction control collection engine 2104, a data store integrity engine 2106, and a data store 2108 (e.g., data store 1826). Generally, interoperability engine 2102 receives data from elements within aggregation layer 1904 (e.g., from aggregation engine 2020) and performs one or more operations with respect to the data. Interoperability engine 2102 also facilitates storage of at least a portion of the processed information in data store 2108.

Interaction control collection engine 2104 is implemented as part of control engine 1706. Interaction control collection engine 2104 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a premises, a message type, and a message control identification (ID). The unique message identifier can also be the message control ID. The unique message identifier may be created as messages including data are transmitted from aggregation layer 1904. The table may be stored in association with the interaction control platform 2128.

In some examples, the table also includes information for tracking the progress of the message from an origination node to a destination node. For example, typically when a message (e.g., any communication of data) is first received by transformative processing engine 1708 (e.g., interoperability engine 2102), control engine 1706 (e.g., interaction control collection engine 2104 of control engine 1706) may generate a unique identifier for the message in order to track that message as it moves throughout the interaction system. The unique identifier may be included in the header of the message such that when the next node (e.g., component, device, server, etc.) after transformative processing engine 1708 receives the message, that node can report back to control engine 1706 that it saw the message. In this manner, control engine 1706 may enable end-to-end tracking of messages for the life of the message.

In one example, the messages are requests. The requests may be generated based om input at one of the components. The requests may be received by transformative processing engine 1708 and integrated into the system. In some examples, control engine 1706 may be notified that the requests have been received and may therefore be configured to generate message IDs for each request. These message IDs may then be associated with each of the requests. As the requests continue to move throughout the interaction system (e.g., away from transformative processing engine 1708), control engine 1706 may be track their movement using the message IDs. If one of the requests does not make it to its destination, control engine 1706 (or part of the interaction control platform 2128) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 1706 (e.g., interaction control collection engine 2104 of control engine 1706) may receive the message and/or message identifier directly from one of components 2010-2018. For example, one of components 2010-2018 may be configured to generate the unique message identifier and/or communicate directly with control engine 1706. The message also may travel via one or more intermediate nodes on its way to the destination node. In some examples, a node is a component such as components 2010-2018, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, interaction control collection engine 2104 provides unique message identifiers to other elements of the interaction system to monitor the messages as they move throughout the interaction system. Interaction control collection engine 2104 also provides a portion of the unique message identifiers to an interaction control platform (indicated by a circle 2128) for further analysis of the message identifiers. Such analysis may include reconciliation of lost messages, latency reporting, audit control and compliance, and other such analyses.

As mentioned previously, interoperability engine 2102 is configured to store data in data store 2108. A plurality of sub-engines 2110-2116 of interoperability engine 2102 are configured to perform operations relating to storing data in data store 2108.

Interoperability engine 2102 includes a tagging engine 2110 configured to perform semantic tagging and indexing of data. Tagging engine 2110 therefore is configured to receive data, read metadata associated with the data, semantically scan the content of the data, and associate one or more tags with the data. Tagging engine 2110 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 2110 may determine that the chart is for a type of entity by reading metadata indicating that an author field is populated with the name of another particular type of entity. Tagging engine 2110 may have access to other data to compare the analyzed metadata against. Other examples, of metadata that may be included in one or more fields include author, document type, creation time and date, last update time and date, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 2110 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 2110 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 2110 to determine one or more tags to associate with the data. The tags may be chosen, for example, based on values of particular fields in the data, detecting a frequency of one or more words in a document or metadata and/or of a set of related words. In this manner, tagging engine 2110 may also index portions of the data within one or more data stores of data store 2108. In some examples, such indexing may be based in part on the selected tags.

Interoperability engine 2102 also includes a reports engine 2112 configured to generate one or more reports or alerts based on data. For example, reports engine 2112 may generate reports when certain types of data are received or when data with certain characteristics is received. Reports engine 2112 may also generate alerts. The reports and/or alerts generated by reports engine 2112 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 2102 also includes a rules engine 2114 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 2102 includes an application engine 2116 configured to provide service-oriented architecture web services.

Data store 2108 includes an electronic record information data store 2118 ("record data store 2118"), a general data store 2120, an operational data store 2122, an entity-based data store 2124, and a streaming caching storage 2126. While data store 2108 is illustrated as including a fixed number of data stores and storage elements, it is understood that data store 2108 can include any suitable number of data stores and storage elements, including more than illustrated or less than illustrated.

In some examples, a data query script is provided to query a first data store and/or to obtain data for populating a data store. Such script could query a data store described herein (e.g., data store 2108) and/or could be used to obtain data to populate a data store described herein (e.g., data store 2108). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 2118 is retained data including electronic record information. In some examples, the information within record data store 2118 is organized according to entity identifying information. Thus, record data store 2118, in some examples, includes individually identifiable information. But it may also include de-identified information.

Within general data store 2120 is retained data. The data may be stored in a relational database format or in any other suitable format. Thus, the data within general data store 2120 may be retained in a data structure that includes one or more tables capable of accessing each other. In some examples, general data store 2120 includes a subset of the information that is included in operational data store 2122.

Within operational data store 2122 is retained data in a relational database format. Thus, the data within operational data store 2122 may be retained in a data structure that includes one or more data structures (e.g., tables) capable of accessing each other. Operational data store 2122 is an example of an operational data warehouse. In operational data store 2122 is joined many different types of data. In some examples, the operational data ware house 2122 includes data pertaining to decision making as discussed herein and other data typically used by conventional operational concerns.

Within entity-based data store 2124 is retained data in a non-relational database format. Thus, the data within entity-based data store 2124 may be retained in a structure other than tables. Such structure may be appropriate for large and complex data sets. In some examples, entity-based data store 2124 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 2124 can support data aggregation, data structuring, data indexing, data tagging and mapping to semantic standards, concept matching, concept extraction, machine learning algorithms, concept discovery, concept mining, and transformation of record information. In some examples, entity-based data store 2124 includes data pertaining to decision making (similar to general data store 2120) as discussed that is organized and accessed in a different manner. For example, the data within entity-based data store 2124 may be optimized for providing and receiving information over one or more information exchanges. In some examples, entity-based data store 2124 includes a subset of the information that is included in operational data store 2122.

Finally, in some examples, streaming caching storage 2126 is a streaming data cache data store. As discussed previously, certain components of components 2010-2018 may support streaming data to other components or user devices. Streaming caching storage 2126 is a location where streaming data can be cached. For example, assume that component 2018 is a piece of equipment operating at Location A and that a user using a computer in Location B desires to view a live of substantially live stream of outputs of the piece of equipment. Component 2018 can send a portion of data to streaming caching storage 2126 which can retain the portion of the data for a certain period of time (e.g., 1 day). Thus, streaming caching storage 2126 is configured to cache data that can be streamed.

Diagram 2100 also includes data store integrity engine 2106. In some examples, data store integrity engine 2106 is configured to ensure integrity of the information within data store 2108. For example, data store integrity engine 2106 applies one or more rules to decide whether information within all or part of data store 2108 should be scrubbed, removed, or adjusted. In this manner, confidence is increased that the information within data store 2108 is accurate and current.

Figure 22:
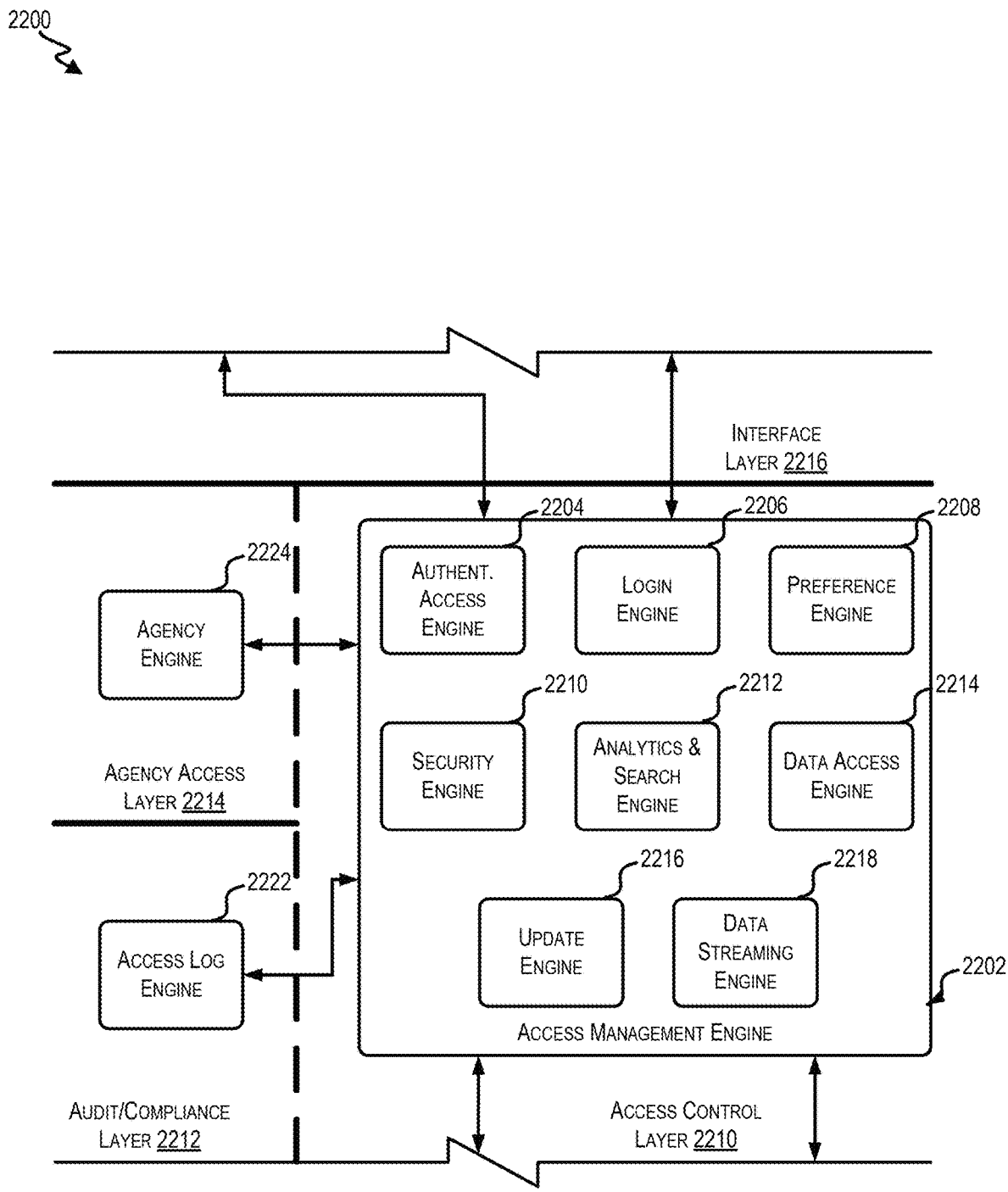
FIG. 22 illustrates a block diagram of a portion of the architecture stack, in accordance with certain embodiments of the present disclosure.

FIG. 22 shows a diagram 2200 which depicts a portion of architecture stack 1900 according to an embodiment of the invention. In particular, the diagram 2200 includes access control layer 1910, audit/compliance layer 1912, agency layer 1914, and a portion of interface layer 1916. Access control layer 1910, as illustrated in the diagram 2200, includes an access control engine 2202. Access control engine 2202 is an example of access control engine 1822. Generally, access control engine 2202 can be configured to control access to elements of transformative integration engine 1802 by different components, applications, and user devices.

Access control engine 2202 within access control layer 1910 also provides functionality similar to an operating system. For example, access control engine 2202 includes a plurality of engines configured to control different aspects of interacting with elements of the interaction system. For example, a user who desires to access portions of data retained in data store 2108, may do so by interacting with access control engine 2202 using one or more applications (not shown). Thus, access control engine 2202 includes a variety of engines to enable such interaction. The engines include, for example, an authentication access engine 2204, a login engine 2206, a user preference engine 2208, a security engine 2210, an analytics and search engine 2212, a data access engine 2214, an update engine 2216, and a streaming data engine 2218. The different engines of access control engine 2202 can define routines, protocols, standards, and the like for interacting with elements of the interaction system.

Beginning first with authentication access engine 2204, authentication access engine 2204 evaluates the rules and conditions under which users may access elements of the interaction system; in particular, the conditions under which users may access data within data store 2108. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 2204 authenticates an identity of the user.

Login engine 2206 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 2204 evaluates the rules to determine which users may access the interaction system, login engine 2206 evaluates the particular credentials, profiles, etc. of the users. For example, login engine 2206 can confirm that an entered username (e.g., and password), provided biometric data or code or identifier in a scanned tag or badge matches that in an authorized user data structure.

Login engine 2206 evaluates one or more user profiles associated with each authenticated user. In some examples, a user profile includes a username, password, and other information associated with the user. For example, a user profile may indicate characteristics about the user.

User preference engine 2208 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 2208, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 2210 evaluates the rules and conditions for ensuring the security of access to the elements of the interaction system. In some examples, these rules and conditions are determined by administrators of the interaction system. In some examples, security engine 2210 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 2210 may enforce a domain-based rule that protects certain sensitive information (e.g., identifying information).

Analytics and search engine 2212 evaluates the rules and conditions under which users can search for data within the interaction system and access analytics relating to the interaction system. In some examples, these rules and conditions are user-defined or learned over time in accordance with search engine optimization techniques. For example, analytics and search engine 2212 is used to search within data store 2108 for particular data. Analytics and search engine 2212 supports any conventional searching algorithms. For example, search engine 2212 can be used to search within various fields and potential field values. In some examples, search engine 2212 can provide analytics, such as statistics, graphs, distributions and/or comparative analysis pertaining to particular entities and/or characteristics. Such information may be selected by a user and presented on a user interface.

Data access engine 2214 evaluates the rules and conditions under which users may operation in order to access particular data within data store 2108. In some examples, these rules and conditions are user-defined or learned over time. For example, data access engine 2214 may indicate the routines, subroutines, or other logic needed for an application to access certain portions of data store 2108. For example, while authentication access engine 2204 and login engine 2206 may control which users can access parts of the interaction system, data access engine 2214 may control how authenticated users access data within data store 2108.

To this end, data access engine 2214 may enforce and/or evaluate certain rules managing how users access different components of the interaction system. In some examples, data access engine 2214 may be used to actually access data within data store 2108 (e.g., extract, download, or otherwise access). In some examples, data access engine 2214 may define procedures, protocols, and the like for accessing data. The protocols and procedures for accessing data access engine 2214 (like the other engines of access control engine 2202) may be provided to developers in the form of a software development kit (SDK). SDKs may enable developers write applications that can effectively communicate with elements (e.g., data store 2108) of the interaction system. In particular, applications that can access a portion of the data stored within active unified data layer 1908.

Update engine 2216 evaluates the rules and conditions for providing updates to other engines within access control engine 2202, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 2218 defines the rules and conditions for enabling streaming of data between components and user devices of the interaction system. For example, streaming data engine 2218 may enable component 2014 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 2218 may identify a streaming destination and a streaming origin. Next, streaming data engine 2218 may pair the two and enable streaming. This may include allocated bandwidth within one or more network devices associated with the interaction system. Streaming data engine 2218 may also adjust the quality of the streaming data based on the availability of bandwidth. In some examples, streaming data engine 2218 may receive incoming streams (and continuously present the stream or monitor for particular data (e.g., exceeding a threshold, exhibiting an above-threshold change, having a particular value)).

Within audit/compliance layer 1912 is located an access log engine 2222. Access log engine 2222 evaluates the rules and conditions for logging access to the interaction system by users, applications, devices, and the like. Logging access includes, in some examples, logging data conventionally collected by access log engines running in similar environments. Access log engine 2222 can use this data to generate and transmit reports, for example, to stakeholders of the interaction system such that they can make informed decisions regarding that is accessing the interaction system and for what purposes.

Within agency layer 1914 is located an agency engine 2224. Agency engine 2224 evaluates the rules and conditions under which agencies can access the interaction system. For example, agencies that may use agency engine 2224 include agencies to which the interaction system provides compliance, tracking, or other reporting information. For example, agency engine 2224 may be used to track one or more performance indicators identified by a government agency and/or to provide report instances of defined types of events. Thus, in some examples, a government agency uses agency engine 2224 to collect data pertaining to compliance of the interaction system with one or more statutes or regulations. In some examples, a university is an agency that uses agency engine 2224 to collect data pertaining to one or more studies. In some examples, agency engine 2224 can identify one or more entities (e.g., governmental agencies) that are to receive reports pertaining to operations or events and what types of data are to be reported to those entities. Agency engine 2224 can then collect the pertinent data, potentially format and/or analyze the data, and facilitate transmission of (e.g., raw, formatted and/or analysis of) the data to the appropriate agency.

Figure 23:
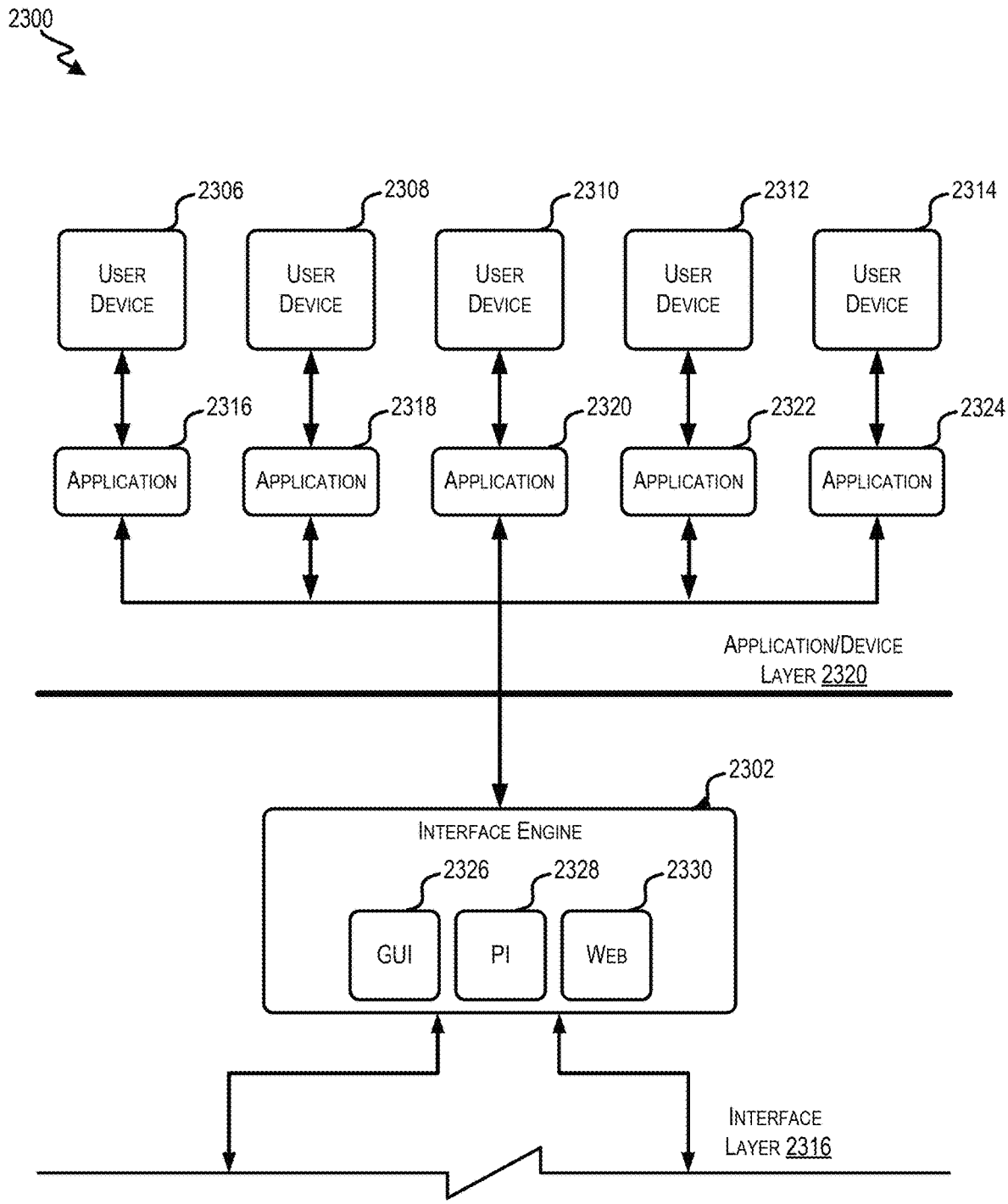
FIG. 23 illustrates a block diagram of a portion of the architecture stack, in accordance with certain embodiments of the present disclosure.

FIG. 23 shows a diagram 2300 which depicts a portion of architecture stack 1900 according to an embodiment of the invention. In particular, diagram 2300 includes interface layer 1916, and application/device layer 1920. Within interface layer 1916 is located interface engine 2302 (e.g., interface engine 1824). Interface engine 2302 is configured to generate one or more interfaces (e.g., graphical user interface 2326, programmatic interface 2328, and/or web interface 2330) to enable data to flow to user devices 2310, 2312, and 2314 via respective applications 2320, 2322, and 2324. In some examples, the interfaces of interface engine 2302 are embodied in hardware, software, or some combination of both. Within interface layer 1916 communications and inputs directed to interacting with elements of access control layer 1910 may be embodied.

Graphical user interface 2326 is any suitable graphical user interface configured to interact with elements of the interaction system. Programmatic interface 2328 includes an application programming interface, a programmatic user interface, and other similar interfaces for defining core functions for accessing elements of the interaction system. For example, programmatic interface 2328 may specify software components in terms of their operations. Web interface 2330 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 2306-2314. Output may be provided via one or more output devices (e.g., a display or speaker).

Interface engine 2302 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 1920, applications 2316-2324 which communicate with other elements of architecture stack 1900 using the interfaces generated by interface engine 2302 are defined. This includes detailing how applications 2316-2324 are to interact with the interfaces generated by interface engine 2302 for accessing data. For example, interacting may include accepting inputs at user devices 2316-2324 to access data and, in response, providing the data, prompts, or other types of interaction with one or more users of the user devices 2316-2324. Thus, applications 2316-2324 may be related to one or more of the interfaces generated by interface engine 2302. For example, application 2320 may be interact with a graphical user interface (whether generated by interface engine 2302 or otherwise) to interact with other elements of the interaction system. Interacting may include receiving inputs at the graphical user interface via application 2320, providing output data to the graphical user interface application 2320, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 2316-2324 running one of the other applications 2316-2324.

Turning now to the details of applications 2320, 2322, and 2324. In some examples, applications 2320, 2322, and 2324 include a variety of different applications that can be designed for particular users and/or uses. In one example, application 2320 includes dashboards, widgets, windows, icons, and the like that are customized for an particular entity. In some examples, application 2320 may present different data depending on a specialty associated with the entity and protected information associated with the entity. In this manner, application 2320 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 2320 may be configured to receive input, adjust presentations, present unprompted alerts, adjust display of content, move more relevant content to the foreground, move less relevant content to the background, populate forms for the entity.

In another example, application 2322 may be specific for nurses or types of nurses. In this example, application 2322 may include dashboards, widgets, windows, icons, and the like that are customized to individual nurses. Similar to the example discussed above pertaining to the doctor, in some examples, application 2324 may present different data depending on a position of the nurse. In this manner, application 2322 adapts and automatically adjusts depending on the context in which the nurse is using the application. For example, the nurse may receive data, such as test results.

In some examples, application 2324 may be a multi-role application for administrators and is used to control entities constitute the population of the entities within the interaction system. Similar to the other examples discussed, in some examples, application 2324 may present different data depending on a role of the user who is using application 2324. In this manner, application 2324 adapts and automatically adjusts depending on characteristics of the user who is using application 2324. In this manner, application 2324 can provide different data depending on the role of the user. For example, whether data presented includes identifiable or de-identified information may depend on a position of the user.

In some examples, application 2324 may be an operational intelligence application. In this example, application 2324 is used to display operational information generated by components of the interaction system. This operational information can be used for operations, programming, and forecasting. Such operational information may include data because such data may impact operations, programming, forecasting, and the like. Accordingly, application 2324 may present de-identified information in the form of one or more metrics, indicators, or the like as they pertain to operational intelligence.

Applications 2316 and 2318 shown in connection with interface engine 2302 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 2316 and 2318 may be limited. In some examples, an entity of the interaction system may use one of applications 2316, 2318 to access his or her own data. In this example, the identity of the entity may be verified in accordance with techniques described herein.

User devices 2306-2314 are any suitable user devices capable of running applications 2316-2324. User devices 2306-2314 are examples of the user device 1828. In some examples, the user devices include: mobile phones, tablet computers, laptop computers, wearable mobile devices, desktop computers, set-top boxes, pagers, and other similar user devices. In some examples, at least some of user devices 2306-2314 are the same devices as at least some of the one or more components 2010-2018. In some examples, user devices 2306-2314 may include complementary layers to application/device layer 1920 and/or receiving layer 1902. For example, user devices 2306-2314 may include a transmission layer, a generation layer, and/or a receiving layer to communicate data at application/device layer 1920 and at receiving layer 1902.

Figure 24:
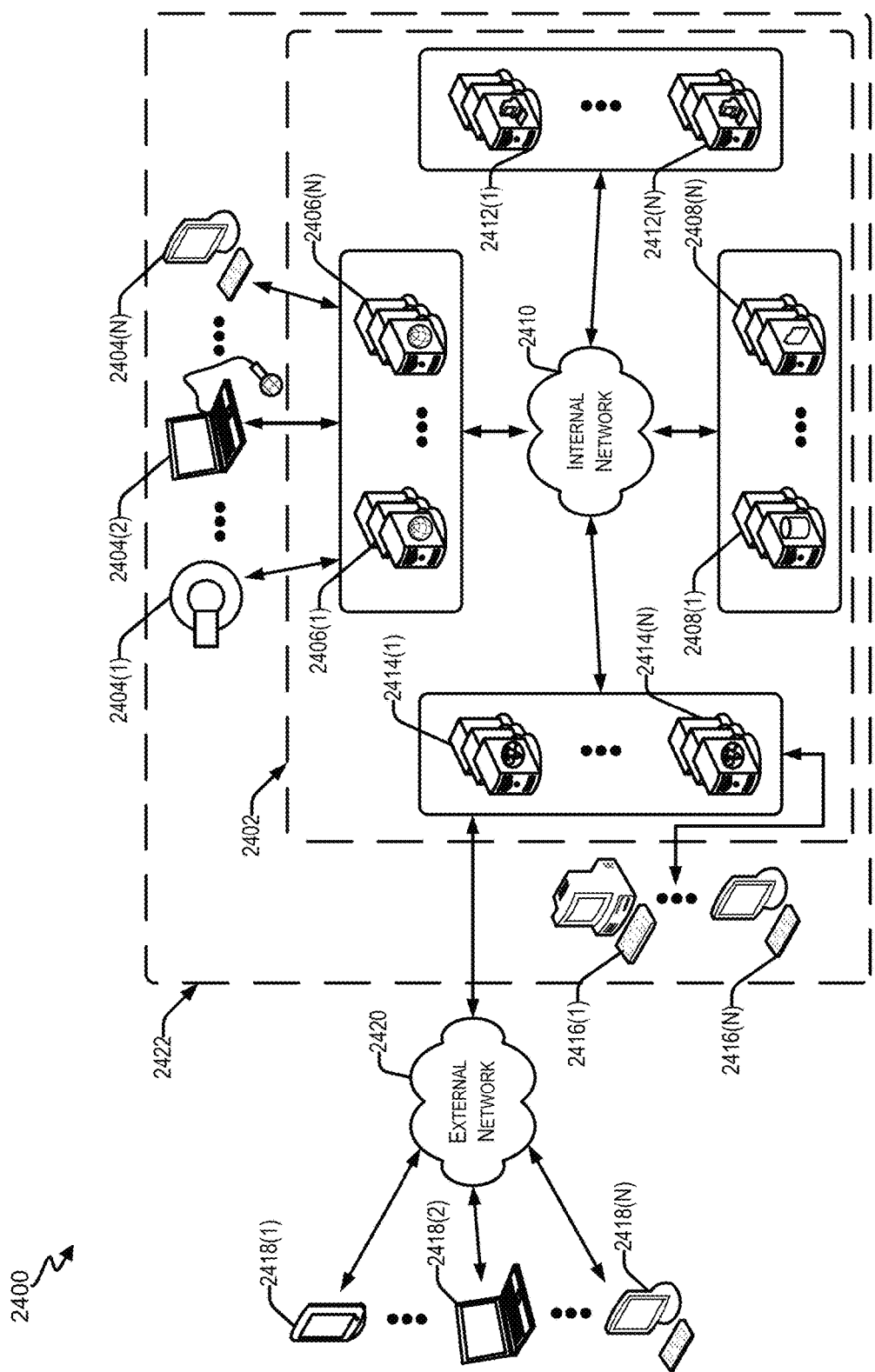
FIG. 24 illustrates a block diagram of an interaction system, in accordance with certain embodiments of the present disclosure.

Turning now to FIG. 24, an interaction system 2400 is shown in accordance with an embodiment of the invention. Interaction system 2400 includes an internal system 2422 including a transformative integration engine 2402. The transformative integration engine 2402 is an example of transformative integration engine 1802 previously discussed. Interaction system 2400 is illustrated as an example configuration for implementing the techniques described herein. In particular, a configuration of elements as illustrated in FIG. 24, at least in some examples, communicates according to the layers of architecture stack 1900. For example, internal system 2422 includes generation components 2404(1), 2404(2), and 2404(N) which provide data to aggregation servers 2406(1)-2406(N).

Generation components 2404(1), 2404(2), and 2404(N) operate in accordance with receiving layer 1902. In some examples, generation component 2404(1) is a piece of equipment, generation component 2404(2) is computer with a data collection device, a type of lab system, and generation component 2404(N) is a terminal. Aggregation servers 2406(1)-2406(N) operate in accordance with aggregation layer 1904. Aggregation servers 2406(1)-2406(N) share data with data storage servers 2408(1)-2408(N) via one or more internal network(s) 2410. In some examples, internal network 2410 is any suitable network capable of handling transmission of data. For example, internal network 2410 may be any suitable combination of wired or wireless networks. In some examples, internal network 2410 may include one or more secure networks. Data storage servers 2408(1)-2408(N) are configured to store data in accordance with active unified data layer 1908. Data storage servers 2408(1)-2408(N) include database servers, file storage servers, and other similar data storage servers.

Access control servers 2412(1)-2412(N) control access to the data retained in the data storage servers 2408(1)-2408 (N). Access control servers 2412(1)-2412(N) communicate with the other elements of interaction system 2400 via internal network 2410 and in accordance with access control layer 1910. Interface servers 2414(1)-2414(N) provide one or more interfaces applications to interact with the other elements of interaction system 2400. Interface servers 2414 (1)-2414(N) provide the one or more interfaces and communicate with the other elements of interaction system 2400 via internal network 2410 and in accordance with interface layer 1916. The interfaces generated by the interface servers 2414(1)-2414(N) can be used by internal user devices 2416 (1)-2416(N) and external user devices 2418(1), 2418(2), and 2418(N) to interact with elements of interaction system 2400.

Internal user devices 2416(1)-2416(N) are examples of user devices 2306-2314. In some examples, internal user devices 2416(1)-2416(N) run applications via the interfaces generated by interface servers 2414(1)-2414(N). As an additional example, external user devices 2418(1), 2418(2), and 2418(N) can run applications developed by third parties that access the other elements of interaction system 2400 via the interfaces generated by interface servers 2414(1)-2414(N).

External user devices 2418(1), 2418(2), and 2418(N) access the interfaces via external network 2420. In some examples, external network 2420 is an unsecured network such as the Internet. External user devices 2418(1), 2418(2), and 2418(N) are examples of user devices 2306-2314. External user device 2418(1) is a mobile device. In some examples, the mobile device may be configured to run an application to access interaction system 2400. Similarly, the other external user devices 2418(2)-2418(N) run applications that enable them to access interaction system 2400. While interaction system 2400 is shown as implemented using discrete servers, it is understood that it may be implemented using virtual computing resources and/or in a web-based environment.

It will also be appreciated that presentations disclosed and/or illustrated herein can be configured to provide various types of interaction capabilities and/or presentation types. For example, presentations can identify whether and/or an extent to which a variable exceeds or misses a target threshold and/or how the variable may be changing over time. Presentations can be presented in a manner such that entities associated with particular data are identified, anonymized and/or conditionally identified (e.g., depending on a reviewer). Presentations can be dynamic such that new data may be routinely reflected in the presentation and/or interactive such that a variable selection, constraint identification, degree of summarization and entity representation can be modified in response to particular user input.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it may be noted that the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be to be clearly understood that this description may be made only by way of example and not as limitation on the scope of the disclosure.

What is claimed:

1. A system comprising:
a data storage that stores data sets for a plurality of cases, each data set for each case of the plurality of cases comprising:
identification data for the case;
a type of a process executed;
a checkpoint indicator; and
a temporal identifier;
where each checkpoint indicator indicates an attribute of the process executed or an attribute pertaining to a checkpoint during execution of the process;
one or more processing devices configured to perform operations comprising:
identifying a set of cases from amongst the plurality of cases, the set of cases having similar temporal identifiers and a same type of process executed;
identifying a set of checkpoint indicators identified in the set of cases;
generating a population checkpoint statistic based on the set of checkpoint indicators identified in the set of cases; and
for each checkpoint indicator of the set of checkpoint indicators:
accessing a particular criterion pertaining to the checkpoint indicator;
determining whether the particular criterion is not met based on the population checkpoint statistic; and
when the particular criterion is not met, causing one or more transmissions comprising an alert to alert a remote device to one or more of a corresponding case in the set of cases, the checkpoint indicator, the determination that the particular criterion is not met based on the population checkpoint statistic, a controllable parameter to influence a corresponding checkpoint, and/or a potential change to the controllable parameter.

2. The system as recited in claim 1, the operations further comprising:
determining that each checkpoint of the set of checkpoint indicators is predictive of one or more process results.

3. The system as recited in claim 2, where the determining that each of the checkpoint indicators is predictive of the one or more process results comprises:
accessing a set of one or more potential checkpoint indicators and a set of one or more result variables from each data set for each case of the set of cases from amongst the plurality of cases;
inputting the set of one or more potential checkpoint indicators and the set of one or more result variables into a model; and
executing the model to determine, for each potential checkpoint indicator from the sets of one or more potential checkpoint indicators, whether the potential checkpoint indicator is predictive of at least one process result of the one or more process results.

4. The system as recited in claim 1, where the set of cases is identified from amongst the plurality of cases in real time.

5. The system as recited in claim 1, where the identifying the set of cases is based on the set of cases involves instances of process performance within a recent time period.

6. The system as recited in claim 1, the operations further comprising:
identifying the controllable parameter as controllable to influence the checkpoint indicator of the corresponding checkpoint.

7. The system as recited in claim 6, where the identifying the controllable parameter comprises selecting the controllable parameter from amongst a set of controllable parameters, each controllable parameter in the set of controllable parameter identified as controllable to influence the checkpoint indicator, and the selection being based on the population checkpoint statistic.

8. One or more non-transitory, machine-readable media having instructions stored thereon, which, when executed by one or more processing devices of a system, cause the system to perform operations comprising:
accessing a data storage that stores data sets for a plurality of cases, each data set for each case of the plurality of cases comprising:
identification data for the case;
a type of a process executed;
a checkpoint indicator; and
a temporal identifier;
where each checkpoint indicator indicates an attribute of the process executed or an attribute pertaining to a checkpoint during execution of the process;
identifying a set of cases from amongst the plurality of cases, the set of cases having similar temporal identifiers and a same type of process executed;
identifying a set of checkpoint indicators identified in the set of cases;
generating a population checkpoint statistic based on the set of checkpoint indicators identified in the set of cases; and
for each checkpoint indicator of the set of checkpoint indicators:
accessing a particular criterion pertaining to the checkpoint indicator;
determining whether the particular criterion is not met based on the population checkpoint statistic; and
when the particular criterion is not met, causing one or more transmissions comprising an alert to alert a remote device to one or more of a corresponding case in the set of cases, the checkpoint indicator, the determination that the particular criterion is not met based on the population checkpoint statistic, a controllable parameter to influence a corresponding checkpoint, and/or a potential change to the controllable parameter.

9. The one or more non-transitory, machine-readable media as recited in claim 8, the operations further comprising:
determining that each checkpoint of the set of checkpoint check point indicators is predictive of one or more process results.

10. The one or more non-transitory, machine-readable media as recited in claim 9, where the determining that each of the checkpoint check point indicators is predictive of the one or more process results comprises:
accessing a set of one or more potential checkpoint indicators and a set of one or more result variables from each data set for each case of the set of cases from amongst the plurality of cases;
inputting the set of one or more potential checkpoint indicators and the set of one or more result variables into a model; and
executing the model to determine, for each potential checkpoint indicator from the sets of one or more potential checkpoint indicators, whether the potential checkpoint indicator is predictive of at least one process result of the one or more process results.

11. The one or more non-transitory, machine-readable media as recited in claim 8, where the set of cases is identified from amongst the plurality of cases in real time.

12. The one or more non-transitory, machine-readable media as recited in claim 8, where the identifying the set of cases is based on the set of cases involves instances of process performance within a recent time period.

13. The one or more non-transitory, machine-readable media as recited in claim 8, the operations further comprising:
    identifying the controllable parameter as controllable to influence the checkpoint indicator of the corresponding checkpoint.

14. The one or more non-transitory, machine-readable media as recited in claim 13, where the identifying the controllable parameter comprises selecting the controllable parameter from amongst a set of controllable parameters, each controllable parameter in the set of controllable parameter identified as controllable to influence the checkpoint indicator, and the selection being based on the population checkpoint statistic.

15. A method comprising:
    accessing a data storage that stores data sets for a plurality of cases, each data set for each case of the plurality of cases comprising:
        identification data for the case;
        a type of a process executed;
        a checkpoint indicator; and
        a temporal identifier;
        where each checkpoint indicator indicates an attribute of the process executed or an attribute pertaining to a checkpoint during execution of the process;
    identifying a set of cases from amongst the plurality of cases, the set of cases having similar temporal identifiers and a same type of process executed;
    identifying a set of checkpoint indicators identified in the set of cases;
    generating a population checkpoint statistic based on the set of checkpoint indicators identified in the set of cases; and
    for each checkpoint indicator of the set of checkpoint indicators:
        accessing a particular criterion pertaining to the checkpoint indicator;
        determining whether the particular criterion is not met based on the population checkpoint statistic; and
        when the particular criterion is not met, causing one or more transmissions comprising an alert to alert a remote device to one or more of a corresponding case in the set of cases, the checkpoint indicator, the determination that the particular criterion is not met based on the population checkpoint statistic, a controllable parameter to influence a corresponding checkpoint, and/or a potential change to the controllable parameter.

16. The method as recited in claim 15, further comprising:
    determining that each checkpoint of the set of checkpoint indicators is predictive of one or more process results.

17. The method as recited in claim 16, where the determining that each of the checkpoint indicators is predictive of the one or more process results comprises:
    accessing a set of one or more potential checkpoint indicators and a set of one or more result variables from each data set for each case of the set of cases from amongst the plurality of cases;
    inputting the set of one or more potential checkpoint indicators and the set of one or more result variables into a model; and
    executing the model to determine, for each potential checkpoint indicator from the sets of one or more potential checkpoint indicators, whether the potential checkpoint indicator is predictive of at least one process result of the one or more process results.

18. The method as recited in claim 15, where the set of cases is identified from amongst the plurality of cases in real time.

19. The method as recited in claim 15, where the identifying the set of cases is based on the set of cases involves instances of process performance within a recent time period.

20. The method as recited in claim 15, further comprising:
    identifying the controllable parameter as controllable to influence the checkpoint indicator of the corresponding checkpoint.

\* \* \* \* \*

UNITED STATES PATENT AND TRADEMARK OFFICE
CERTIFICATE OF CORRECTION

| | |
|---|---|
| PATENT NO. | : 11,237,937 B1 |
| APPLICATION NO. | : 17/061850 |
| DATED | : February 1, 2022 |
| INVENTOR(S) | : Ravi S. Chari, Jenny F. Barber and Dawn A. Winans |

It is certified that error appears in the above-identified patent and that said Letters Patent is hereby corrected as shown below:

In the Claims

In Claim 9, Column 56, Line 50, please delete "check point"

In Claim 10, Column 56, Line 54, please delete "check point"

Signed and Sealed this
Twenty-second Day of August, 2023

*Katherine Kelly Vidal*

Katherine Kelly Vidal
*Director of the United States Patent and Trademark Office*